(12) United States Patent
Kimura et al.

(10) Patent No.: US 11,212,025 B2
(45) Date of Patent: Dec. 28, 2021

(54) TRANSMITTING APPARATUS, RECEIVING APPARATUS, METHOD, AND RECORDING MEDIUM

(71) Applicant: SONY CORPORATION, Tokyo (JP)

(72) Inventors: Ryota Kimura, Tokyo (JP); Hiroki Matsuda, Tokyo (JP); Naoki Kusashima, Kanagawa (JP); Yifu Tang, Kanagawa (JP); Yukitoshi Sanada, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 28 days.

(21) Appl. No.: 16/611,933

(22) PCT Filed: Mar. 14, 2018

(86) PCT No.: PCT/JP2018/009921
§ 371 (c)(1),
(2) Date: Nov. 8, 2019

(87) PCT Pub. No.: WO2018/211800
PCT Pub. Date: Nov. 22, 2018

(65) Prior Publication Data
US 2021/0152272 A1 May 20, 2021

(30) Foreign Application Priority Data
May 18, 2017 (JP) .............................. JP2017-099299

(51) Int. Cl.
*H04J 11/00* (2006.01)
*H04L 27/26* (2006.01)
(52) U.S. Cl.
CPC .......... *H04J 11/003* (2013.01); *H04L 27/261* (2013.01); *H04L 27/2666* (2013.01)

(58) Field of Classification Search
CPC ... H04J 11/003; H04L 27/261; H04L 27/2666
See application file for complete search history.

(56) References Cited

U.S. PATENT DOCUMENTS

2011/0110456 A1* 5/2011 Hastings, III ......... H04L 7/0331
375/295
2012/0014417 A1 1/2012 Heath et al.
(Continued)

FOREIGN PATENT DOCUMENTS

JP 2008-219671 A 9/2008
JP 2013-537738 A 10/2013
(Continued)

OTHER PUBLICATIONS

International Search Report and Written Opinion of PCT Application No. PCT/JP2018/009921, dated May 29, 2018, 06 pages of ISRWO.
(Continued)

*Primary Examiner* — Minh Trang T Nguyen
(74) *Attorney, Agent, or Firm* — Chip Law Group

(57) ABSTRACT

[Object] Provided is a mechanism for enhancing resistance against an interference that possibly occur due to non-orthogonality of a resource in a communication system holding communication with a mixture of a plurality of communication parameter sets. [Solving Means] A transmitting apparatus holding communication using a plurality of communication parameter sets in a unit resource, and including a processing section that transmits a data signal and a reference signal generated using the parameter sets different between the data signal and the reference signal to a receiving apparatus.

19 Claims, 31 Drawing Sheets

(56) References Cited

U.S. PATENT DOCUMENTS

| | | | | |
|---|---|---|---|---|
| 2015/0010105 A1* | 1/2015 | Kim | ................ | H04L 27/261 |
| | | | | 375/295 |
| 2017/0078973 A1* | 3/2017 | Ohwatari | ............ | H04W 52/325 |
| 2017/0201317 A1 | 7/2017 | Lee et al. | | |
| 2017/0237587 A1* | 8/2017 | Hildinger | ............ | H04L 25/4975 |
| | | | | 370/201 |
| 2018/0219700 A1* | 8/2018 | strom | .................. | H04L 5/0048 |

FOREIGN PATENT DOCUMENTS

| | | |
|---|---|---|
| KR | 10-2013-0061715 A | 6/2013 |
| KR | 10-2016-0028818 A | 3/2016 |
| WO | 2016/036106 A1 | 3/2016 |
| WO | 2017/056796 A1 | 4/2017 |

OTHER PUBLICATIONS

Kim, et al., "Introduction to QAM-FBMC: from Waveform Optimization to System Design", IEEE, Communications Magazine, vol. 54, No. 11, Nov. 2016, pp. 66-73.

Extended European Search Report of EP Application No. 18802219.8, dated Jul. 21, 2020, 11 pages.

Kim, et al., "Introduction to QAM-FBMC: From Waveform Optimization to System Design", IEEE, Communications Magazine, vol. 54, No. 11, XP011634344, Nov. 2016, pp. 66-73.

Partial European Search Report of EP Application No. 18802219.8, dated Apr. 15, 2020, 14 pages.

\* cited by examiner

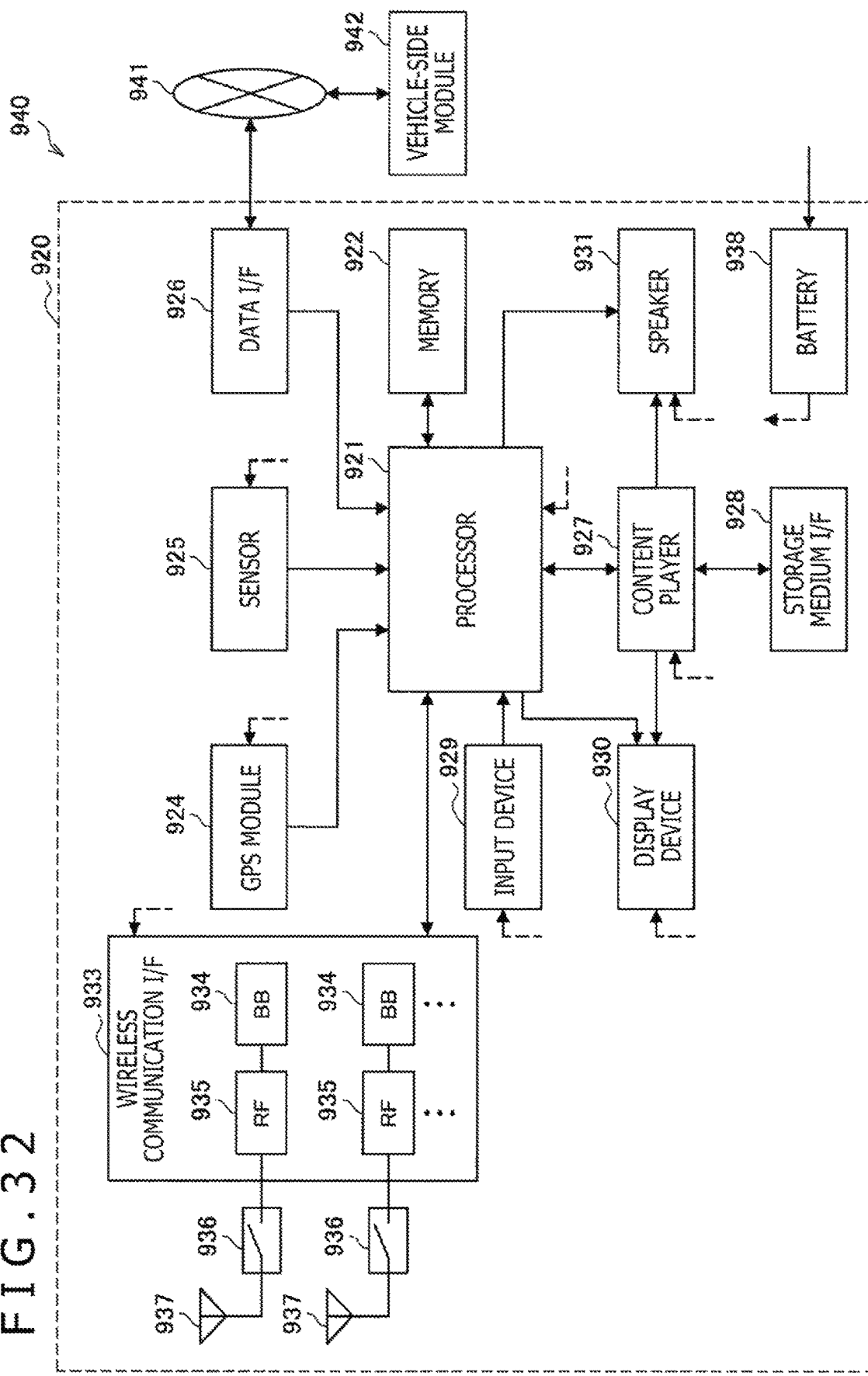

TRANSMITTING APPARATUS, RECEIVING APPARATUS, METHOD, AND RECORDING MEDIUM

CROSS REFERENCE TO RELATED APPLICATIONS

This application is a U.S. National Phase of International Patent Application No. PCT/JP2018/009921 filed on Mar. 14, 2018, which claims priority benefit of Japanese Patent Application No. JP 2017-099299 filed in the Japan Patent Office on May 18, 2017. Each of the above-referenced applications is hereby incorporated herein by reference in its entirety.

TECHNICAL FIELD

The present disclosure relates to a transmitting apparatus, a receiving apparatus, methods, and recording media.

BACKGROUND ART

Recently, as representative techniques of the multicarrier modulation technique (that is, multiplexing technique or multiple access technique), OFDM (Orthogonal Frequency Division Multiplexing) and OFDMA (Orthogonal Frequency Division Multiple Access) have been put into practical use in diverse wireless systems. Practical examples of the OFDM and OFDMA include digital broadcasting, a wireless LAN, and a cellular system. The OFDM exhibits multipath resistance and can avoid occurrence of an intersymbol interference arising from multipath delay waves by adopting a CP (Cyclic Prefix). On the other hand, disadvantages of the OFDM include high level out-of-band radiation. In addition, the disadvantages of the OFDM include tendency to have a high PAPR (Peak-to-Average Power Ratio) and vulnerability to a distortion generated in a transmitting/receiving apparatus.

Examples of a method of reducing the PAPR that is one disadvantage of the OFDM and ensuring the multipath resistance include adoption of SC-FDE that is a combination of SC (Single-Carrier) modulation and FDE (Frequency Domain Equalization). The SC-FDE is often referred to as "SC-FDMA (Single Carrier. Frequency Division Multiple Access)" or "DFT-S-OFDMA (Discrete Fourier Transform)—Spread OFDMA)."

Furthermore, a new modulation technique capable of suppressing the out-of-band radiation that is the disadvantage of the OFDM has emerged. The present modulation technique is intended to suppress the out-of-band radiation by applying a Pulse Shape Filter to symbols after S/P (Serial-to-Parallel) conversion in the OFDM. Symbols as an object to be filtered may include those in an entire band, those corresponding to a predetermined number of subcarriers (for example, per resource block in LTE), those per subcarrier, and the like. The present modulation technique is variously referred to as, for example, UF-OFDM (Universal Filtered-OFDM), UFMC (Universal Filtered Multi-Carrier), FBMC (Filter Bank Multi-Carrier), GOFDM (Generalized OFDM), and GFDM (Generalized Frequency Division Multiplexing). The present modulation technique will be referred to as "GFDM" in the present specification; however, needless to say, the nominal designation GFDM is not used in a narrow sense.

As an example of a GFDM-related technique, PTL 1 discloses, for example, a technique related to a communication system that holds communication by a mixture of a plurality of communication parameter sets so that the communication system can accommodate a terminal compatible with GFDM and a legacy terminal incompatible with GFDM. Specifically, PTL 1 discloses the technique related to the communication system that enables a mixture of a plurality of subcarrier spacings and a plurality of subsymbol periods.

CITATION LIST

Patent Literature

[PTL 1]
PCT Patent Publication No. WO2017/056796

SUMMARY

Technical Problem

A communication system, such as one compatible with GFDM, using a mixture of a plurality of communication parameter sets including subcarrier spacings and symbol lengths as in the GFDM-compliant system often loses orthogonality of resources. An interference possibly occurs between signals transmitted using such resources. However, the technique described in PTL 1 insufficiently deals with measures against such an interference.

The present disclosure, therefore, provides a communication system holding communication using a mixture of a plurality of communication parameter sets and capable of enhancing resistance against an interference that possibly occurs due to non-orthogonality of resources.

Solution to Problem

According to the present disclosure, provided is a transmitting apparatus holding communication using a plurality of communication parameter sets in a unit resource, and including a processing section that transmits a data signal and a reference signal generated using the communication parameter sets different between the data signal and the reference signal to a receiving apparatus.

Furthermore, according to the present disclosure, provided is a receiving apparatus holding communication using a plurality of communication parameter sets in a unit resource, and including a processing section that performs a receiving process for receiving a data signal and a reference signal generated using the communication parameter sets different between the data signal and the reference signal.

Moreover, according to the present disclosure, provided is a method executed by a transmitting apparatus holding communication using a plurality of communication parameter sets in a unit resource, and including transmitting a data signal and a reference signal generated using the communication parameter sets different between the data signal and the reference signal to a receiving apparatus.

Furthermore, according to the present disclosure, provided is a method executed by a receiving apparatus holding communication using a plurality of communication parameter sets in a unit resource, and including performing a receiving process for receiving a data signal and a reference signal generated using the communication parameter sets different between the data signal and the reference signal.

Moreover, according to the present disclosure, provided is a recording medium recording a program for causing a computer to: hold communication using a plurality of communication parameter sets in a unit resource; and function as a processing section that transmits a data signal and a reference signal generated using the communication parameter sets different between the data signal and the reference signal to a receiving apparatus.

Furthermore, according to the present disclosure, provided is a recording medium recording a program for causing a computer to: hold communication using a plurality of communication parameter sets in a unit resource; and function as a processing section that performs a receiving process for receiving a data signal and a reference signal generated using the communication parameter sets different between the data signal and the reference signal.

Advantageous Effect of Invention

As described above, the present disclosure provides a communication system holding communication using a mixture of a plurality of communication parameter sets and capable of enhancing resistance against an interference that possibly occurs due to non-orthogonality of resources. It is noted that advantages of the present disclosure are not always limited to the advantages described above and the present disclosure may exhibit any of advantages described in the present specification or other advantages that can be grasped from the present specification in addition to or as an alternative to the above advantages.

BRIEF DESCRIPTION OF DRAWINGS

FIG. 32 is a block diagram depicting an example of a schematic configuration of a car navigation system.

DESCRIPTION OF EMBODIMENT

A preferred embodiment of the present disclosure will be described hereinafter in detail with reference to the accompanying drawings. In the present specification and the drawings, constituent elements having substantially the same functional configuration are denoted by the same reference signs to omit repetitive description.

Furthermore, in the present specification and the drawings, constituent elements having substantially the same functional configuration are often described while different alphabets are added after the same reference sign to distinguish the constituent elements. For example, a plurality of elements having substantially the same functional configuration are distinguished by being denoted by terminal apparatuses 200A, 200B, and 200C as needed. It is noted, however, that a plurality of elements having substantially the same functional configuration are denoted only by the same reference sign in a case of no need to distinguish the plurality of elements. For example, in the case of no need to particularly distinguish the terminal apparatuses 200A, 200B, and 200C, the terminal apparatuses are simply denoted by 200.

It is noted that the present disclosure will be described in the following order.
1. Introduction
   1.1. Waveform modulation scheme
   1.2. Physical layer parameter
   1.3. Technical problem
2. Configuration example
   2.1. Overall configuration
   2.2. Configuration of base station
   2.3. Configuration of terminal apparatus
3. Technical features
   3.1. GFDM
   3.2. Mixture of communication parameter sets
   3.3. Control over transmitted signal process
   3.4. Deployment of reference signals
   3.5. Notification of setting information
   3.6. Process flow
4. Simulation result
5. Application example
6. Conclusion

1. INTRODUCTION

The technique associated with one embodiment of the present disclosure will be described hereinafter.

1.1. Waveform Modulation Scheme

Figure 1:
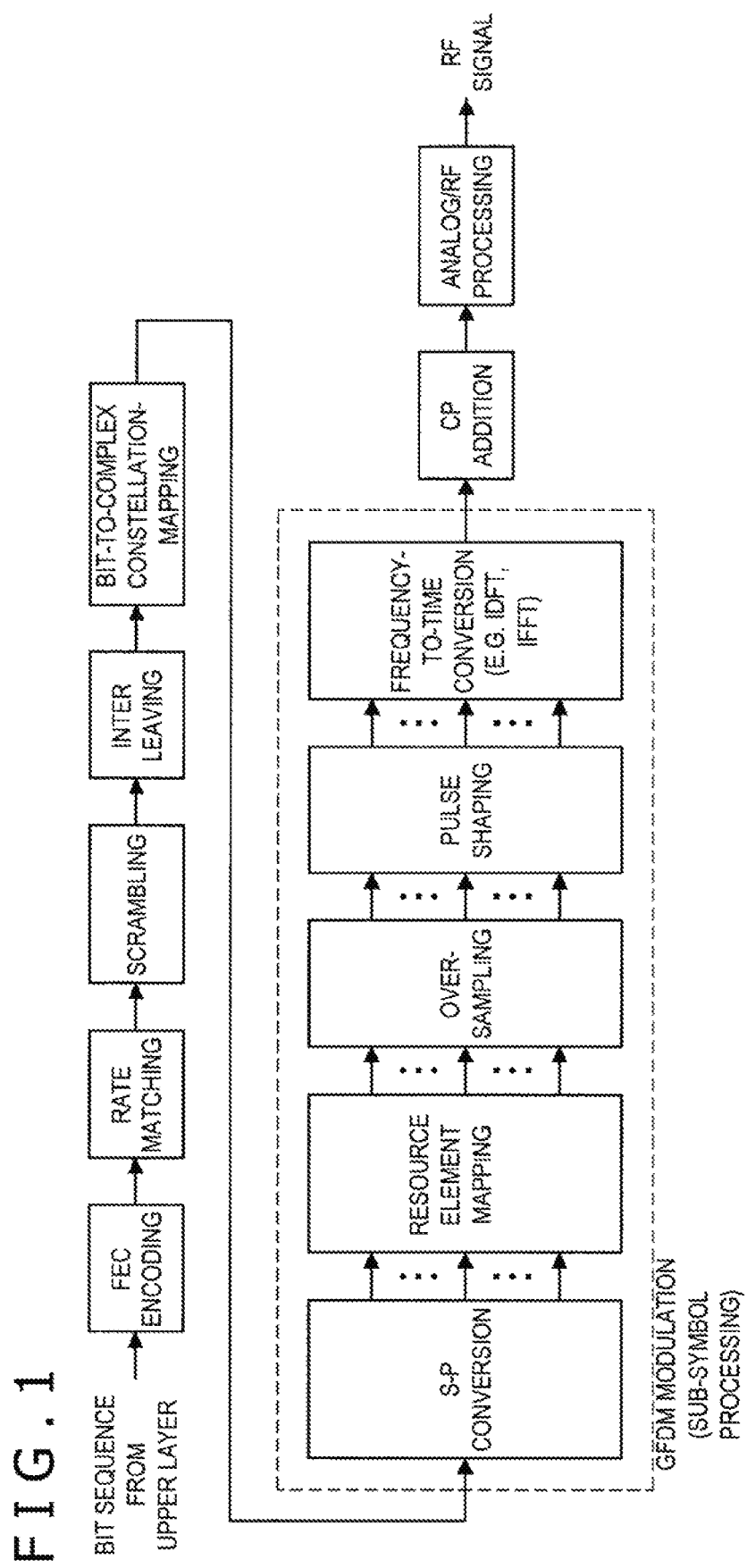
FIG. 1 is an explanatory diagram for explaining an example of a configuration of a transmitting apparatus that supports GFDM.

As examples of a waveform modulation scheme, GFDM, OFDM, and SC-FDE will be described hereinafter.
(GFDM)
FIG. 1 is an explanatory diagram for explaining an example of a configuration of a transmitting apparatus that supports GFDM. With reference to FIG. 1, a bit sequence (for example, transport block) from an upper layer is processed and an RF (radio frequency) signal is output. As depicted in FIG. 1, FEC (Forward Error Correction) encoding, rate matching, scrambling, interleaving, and mapping from a bit sequence to symbols (which may be, for example, complex symbols and can be also referred to as "signal point") (Bit-to-Complex Constellation Mapping) are performed on the bit sequence, and modulation is then performed. In the mapping from the bit sequence to the symbols, various constellations such as BPSK, QPSK, 8PSK, 16QAM, 64QAM, and 256QAM can be used. In the modulation, S/P conversion is performed first, a plurality of signals obtained by division are each subjected to resource element mapping, oversampling, and pulse shaping, and then frequency-to-time conversion (for example, IDFT (Inverse Discrete Fourier Transform) or IFFT (Inverse Fast Fourier Transform)), thereby combining the plurality of signals into one time domain signal (that is, time waveform). After the modulation, a CP (Cyclic Prefix) is added to the signal, and an analog process and an RF process are performed on the signal.

In GFDM, symbols on subcarriers are subjected to oversampling for performing filtering (that is, pulse shaping) in predetermined units. The symbols after oversampling are then subjected to filtering. The frequency-to-time conversion is performed on the filtered symbols. The GFDM can suppress, by filtering, out-of-band radiation that is one disadvantage of the OFDM. Furthermore, combining the GFDM with MIMO (multiple-input and multiple-output) or the like also enables the receiving apparatus to perform all processes in a frequency domain. It is noted, however, that the receiving apparatus uses an interference canceller because of occurrence of an intersymbol interference to each element due to an influence of the filtering. In this respect, the OFDM and the SC-FDE can realize suppression of an interference by simple FDE.

Figure 2:
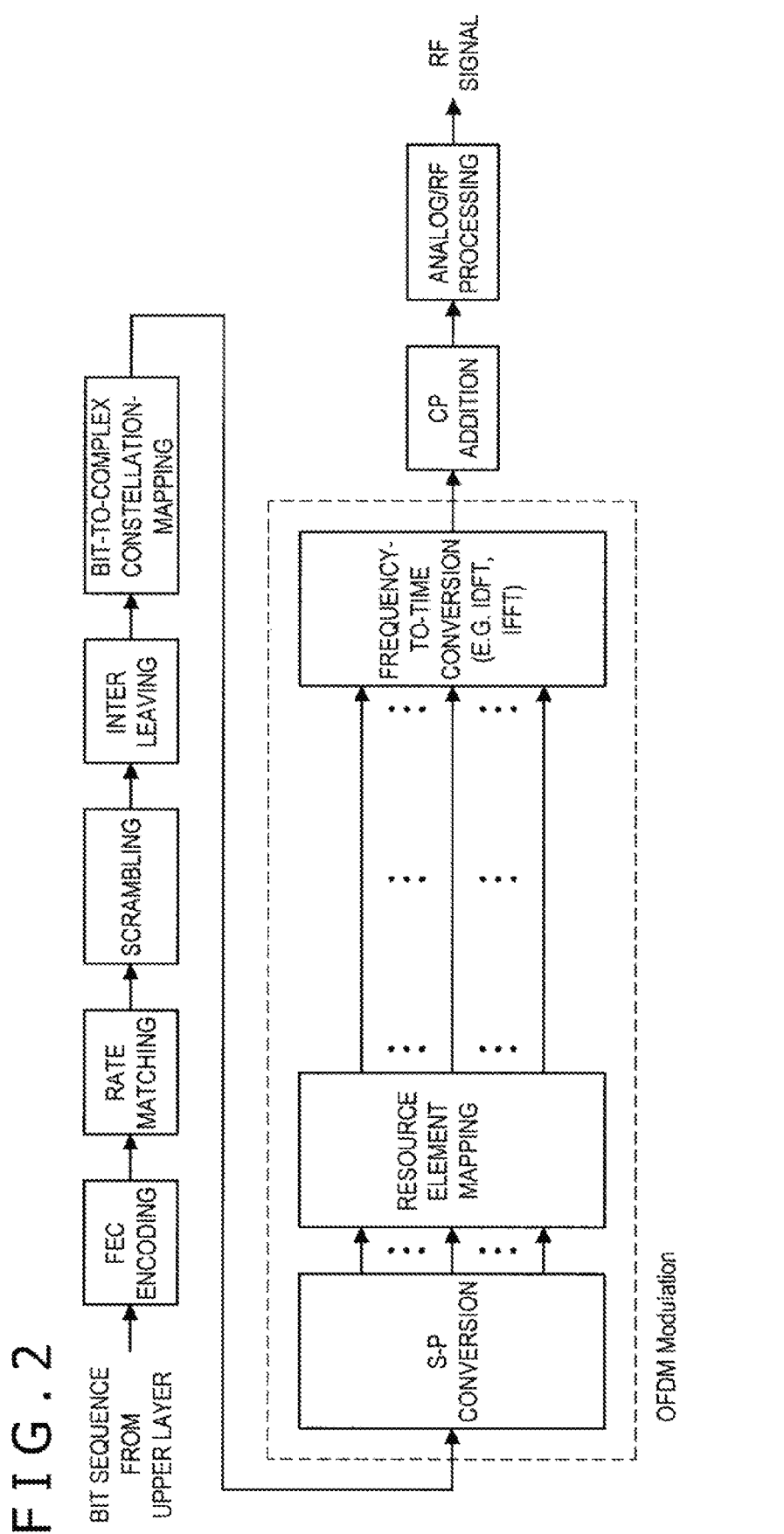
FIG. 2 is an explanatory diagram for explaining an example of a configuration of a transmitting apparatus that supports OFDM.

In this way, the GFDM has a problem that the receiving apparatus is complicated as a trade-off with overcoming the disadvantage of the out-of-band radiation. Such a problem could be fatal in respect to an apparatus desirably holding communication at a low cost and low power consumption such as an MTC (Machine Type Communication) apparatus and an IoT (Internet of Things) apparatus.
(OFDM)
FIG. 2 is an explanatory diagram for explaining an example of a configuration of a transmitting apparatus that supports OFDM. With reference to FIG. 2, the transmitting apparatus that supports OFDM differs in a modulation part surrounded by a broken line from the transmitting apparatus that supports GFDM described with reference to FIG. 1. This difference will be described. First, S/P conversion is performed and a plurality of signals obtained by division are each subjected to resource element mapping. The symbols are thereby deployed on predetermined subcarriers. The frequency-to-time conversion (e.g., IDFT or IFFT) is performed on a predetermined number of subcarriers, thereby combining the signals into one time domain signal.

Figure 3:
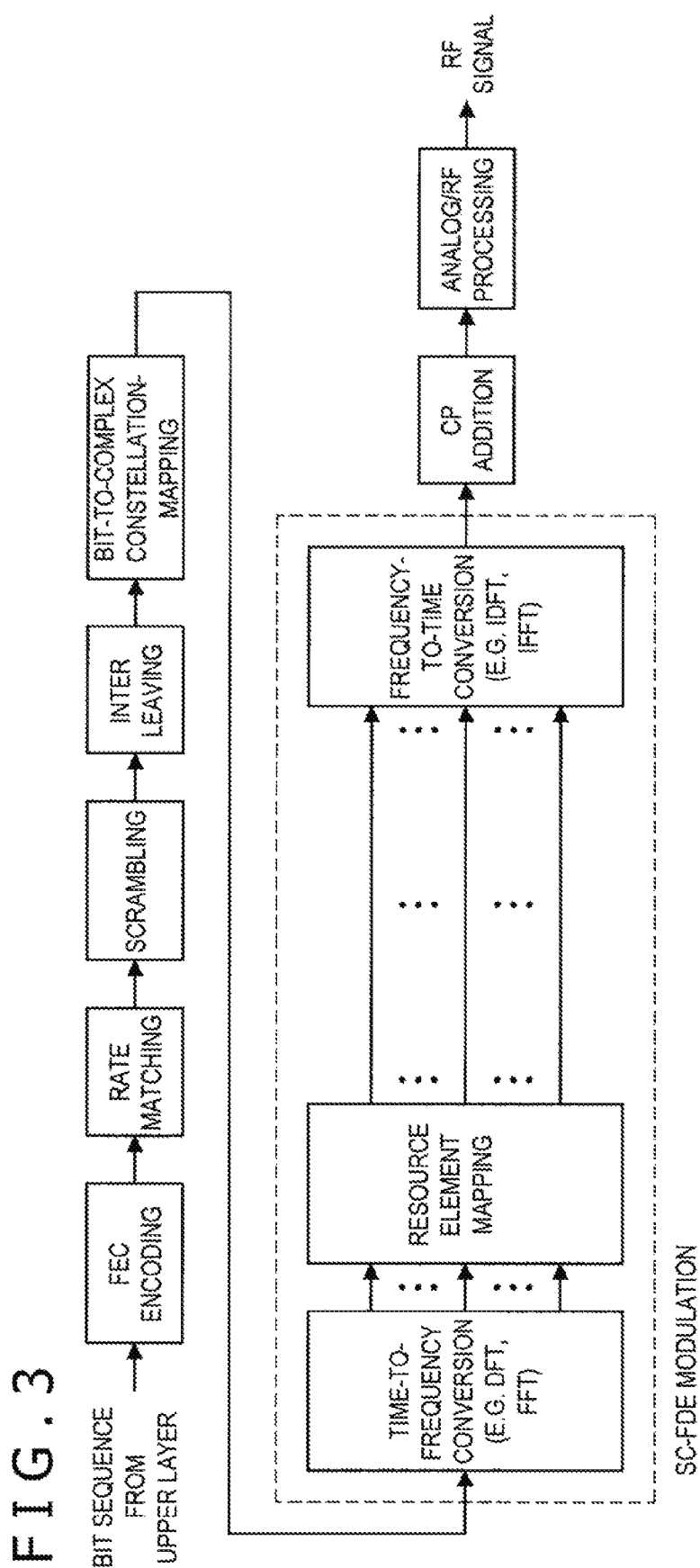
FIG. 3 is an explanatory diagram for explaining an example of a configuration of a transmitting apparatus that supports SC-FDE.

As described above, the OFDM has the multipath resistance and can avoid occurrence of the intersymbol interference arising from multipath delay waves. On the other hand, the disadvantages of the OFDM include the high level out-of-band radiation. The disadvantages of the OFDM also include tendency to have a high PAPR and vulnerability to a distortion generated in a transmitting/receiving apparatus.
(SC-FDE)
FIG. 3 is an explanatory diagram for explaining an example of a configuration of a transmitting apparatus that supports SC-FDE. With reference to FIG. 3, the transmitting apparatus that supports SC-FDE differs in a modulation part surrounded by a broken line from the transmitting apparatus that supports GFDM described with reference to FIG. 1. This difference will be described. First, time-to-frequency conversion (e.g., DFT (Discrete Fourier Transform) or FFT (Inverse Fast Fourier Transform)) is performed. Subsequently, resource element mapping is performed in the frequency domain, and frequency-to-time conversion is performed, thereby combining the signals into one time domain signal. A CP is then added to the signal; thus, the receiving apparatus can easily perform FDE.

As described above, the SC-FDE can exhibit multipath resistance while achieving a reduction in the PAPR. On the other hand, in a case of combining the SC-FDE with the MIMO, the SC-FDE has a disadvantage of making complicated a decoding process performed by the receiving apparatus (for example, turbo equalization and iterative interference cancellation are performed).

1.2. Physical Layer Parameters

A plurality of physical layer parameters (also referred to as "Numerologies") associated with waveforms are present in the communication system. Examples of such physical layer parameters include a Subcarrier Spacing (SCS), a Symbol Length, a Frame Length (Transmission Time Interval (TTI)), a Slot Length, a Cyclic Prefix (CP) Length, and a Guard Interval (GI) Length.

Before 4G, one default value is basically defined as each of these parameter values and one or a plurality of other values are defined as optional values.

On the other hand, communication systems compatible with 5G and subsequent communication systems are required to accommodate a plurality of use cases having different requirement conditions therein. Examples of such use cases include eMBB (Enhanced mobile broadband), mMTC (Massive machine type communications), and URLLC (Ultra reliable and low latency communications). PTL 1 discloses the technique that makes it possible to simultaneously accommodate/support a plurality of subcarrier spacings and a plurality of subsymbol periods in one frequency channel and in one time resource in the light of such a requirement. According to the technique, it is possible to construct a GFDM system capable of simultaneously accommodating data services having diverse communication qualities (throughputs, delays, movement resistances, and the like). For example, it is possible to simultaneously support communications such as IoT and M2M in addition to a general data download service and a general streaming service.

1.3. Technical Problem

The communication system that can simultaneously accommodate/support a plurality of waveforms and values of a plurality of physical layer parameters in one resource has a problem that channel estimation accuracy in a receiving process is possibly deteriorated by an interference. The deterioration in the channel estimation accuracy in the receiving process causes a deterioration in accuracy at a time of demodulating/decoding a received signal after estimation. To address the problem, the present disclosure proposes a generation process for generating a reference signal having high interference resistance and a channel estimation process in the communication system that simultaneously accommodate/supports a plurality of waveforms and values of a plurality of physical layer parameters in one resource.

2. CONFIGURATION EXAMPLE

2.1. Overall Configuration

Figure 4:
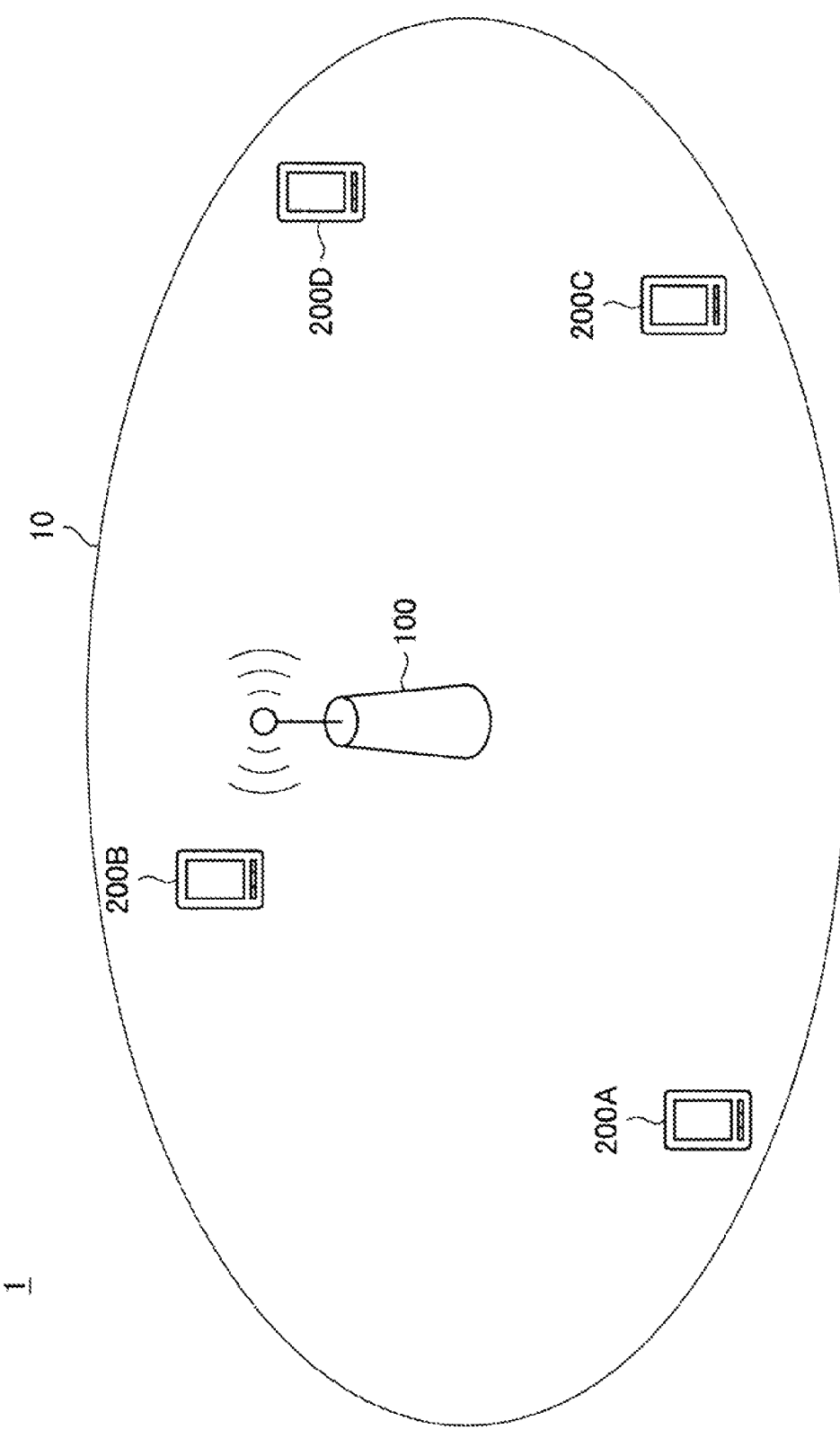
FIG. 4 is an explanatory diagram depicting an example of a schematic configuration of a system according to an embodiment of the present disclosure.

A schematic configuration of a system 1 according to one embodiment of the present disclosure will next be described with reference to FIG. 4. FIG. 4 is an explanatory diagram depicting an example of a schematic configuration of the system 1 according to the embodiment of the present disclosure. With reference to FIG. 4, the system 1 has a base station 100 and a terminal apparatus 200. The terminal apparatus 200 refers herein to a communication apparatus also referred to as "user." The user can be also referred to as user equipment (UE). The UE may be herein UE defined in LTE or LTE-A or may signify a more general communication apparatus.

(1) Base Station 100

The base station 100 is a communication apparatus that functions as a base station of a cellular system (or mobile communication system). The base station 100 holds wireless communication with a terminal apparatus located within a cell 10 of the base station 100 (for example, terminal apparatus 200). For example, the base station 100 transmits a downlink signal to the terminal apparatus and receives an uplink signal from the terminal apparatus.

(2) Terminal Apparatus 200

The terminal apparatus 200 can hold communication in the cellular system (or mobile communication system). The terminal apparatus 200 holds wireless communication with a base station (for example, base station 100) of the cellular system. For example, the terminal apparatus 200 receives a downlink signal from the base station and transmits an uplink signal to the base station.

(3) Multiplexing/Multiple Access

Particularly in the embodiment of the present disclosure, the base station 100 holds wireless communication with a plurality of terminal apparatuses by orthogonal multiple access/non-orthogonal multiple access. More specifically, the base station 100 holds wireless communication with a plurality of terminal apparatuses 200 by multiplexing/multiple access using the GFDM.

For example, the base station 100 holds wireless communication with the plurality of terminal apparatuses 200 by multiplexing/multiple access using the GFDM in downlink. More specifically, the base station 100 multiplexes signals to the plurality of terminal apparatuses 200 using, for example, the GFDM. In this case, for example, each terminal apparatus 200 removes one or more other signals as an interference from a multiplexed signal containing a desired signal (that is, signal to the terminal apparatus 200), and decodes the desired signal.

It is noted that the base station 100 may hold wireless communication with the plurality of terminal apparatuses by multiplexing/multiple access using the GFDM in uplink as an alternative to or in addition to downlink. In this case, the base station 100 may decode each of the signals from a multiplexed signal including a signal transmitted from the plurality of terminal apparatuses.

(4) Supplementation

The present technique is also applicable to a multicell system such as a HetNet (Heterogeneous Network) or SCE (Small Cell Enhancement). Furthermore, the present technique is also applicable to an MTC apparatus, an IoT apparatus, and the like.

2.2. Configuration of Base Station

Figure 5:
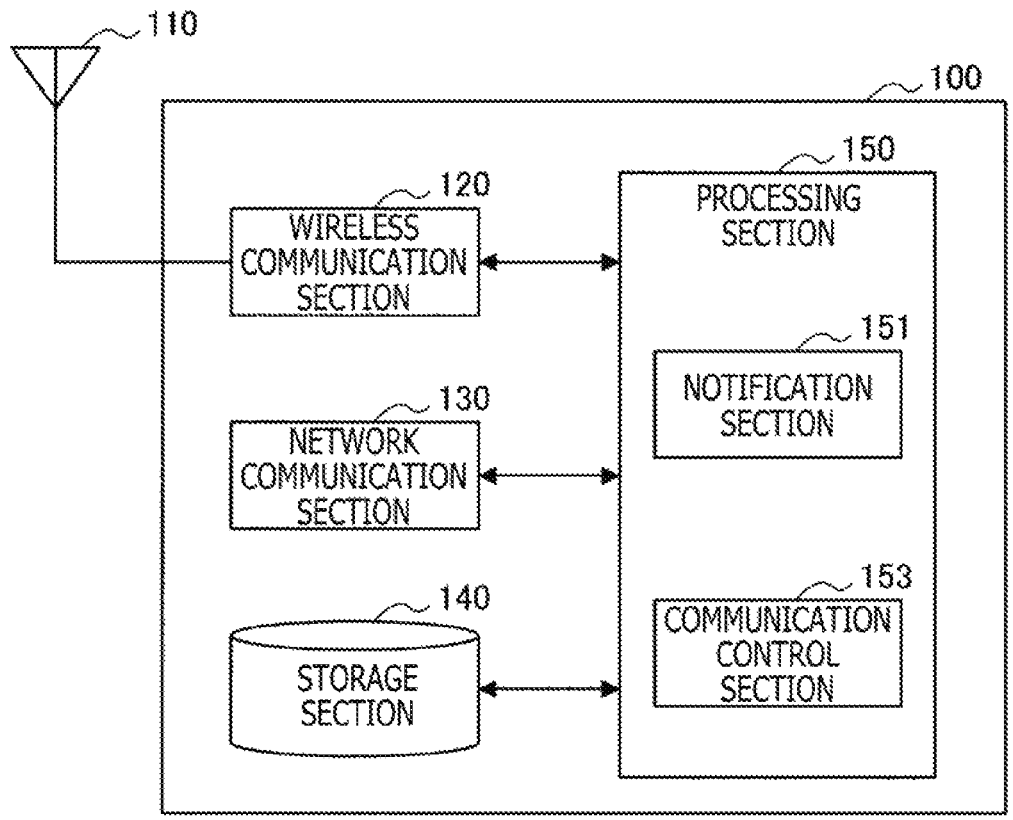
FIG. 5 is a block diagram depicting an example of a configuration of a base station according to the embodiment of the present disclosure.

FIG. 5 is a block diagram depicting an example of a configuration of the base station 100 according to the embodiment of the present disclosure. With reference to FIG. 5, the base station 100 includes an antenna section 110, a wireless communication section 120, a network communication section 130, a storage section 140, and a processing section 150.

(1) Antenna Section 110

The antenna section 110 radiates a signal output from the wireless communication section 120 into a space as a radio wave. In addition, the antenna section 110 converts a radio wave in the space into a signal and outputs the signal to the wireless communication section 120.

(2) Wireless Communication Section 120

The wireless communication section 120 transmits and receives signals. For example, the wireless communication section 120 transmits a downlink signal to one terminal apparatus and receives an uplink signal from the terminal apparatus.

(3) Network Communication Section 130

The network communication section 130 transmits and receives information. For example, the network communication section 130 transmits information to another node and receives information from another node. Examples of another node include another base station and a core network node.

(4) Storage Section 140

The storage section 140 stores a program and various data for the base station 100 to operate either temporarily or permanently.

(5) Processing Section 150

The processing section 150 provides various functions of the base station 100. The processing section 150 has a notification section 151 and a communication control section 153. The notification section 151 has a function to notify each terminal apparatus 200 of setting information related to a signal transmitted by the base station 100. This setting information contains information that indicates communication parameters related to resources, deployment of a reference signal, and communication parameter sets used in each of the reference signal and a data signal. The communication control section 153 has a function to control a transmission process (that is, a transmitted signal process) for transmitting the data signal and the reference signal to the terminal apparatus 200 on the basis of such setting information. It is noted that the processing section 150 can further include constituent elements other than these constituent elements. In other words, the processing section 150 can perform operations other than those performed by these constituent elements.

2.3. Configuration of Terminal Apparatus

Figure 6:
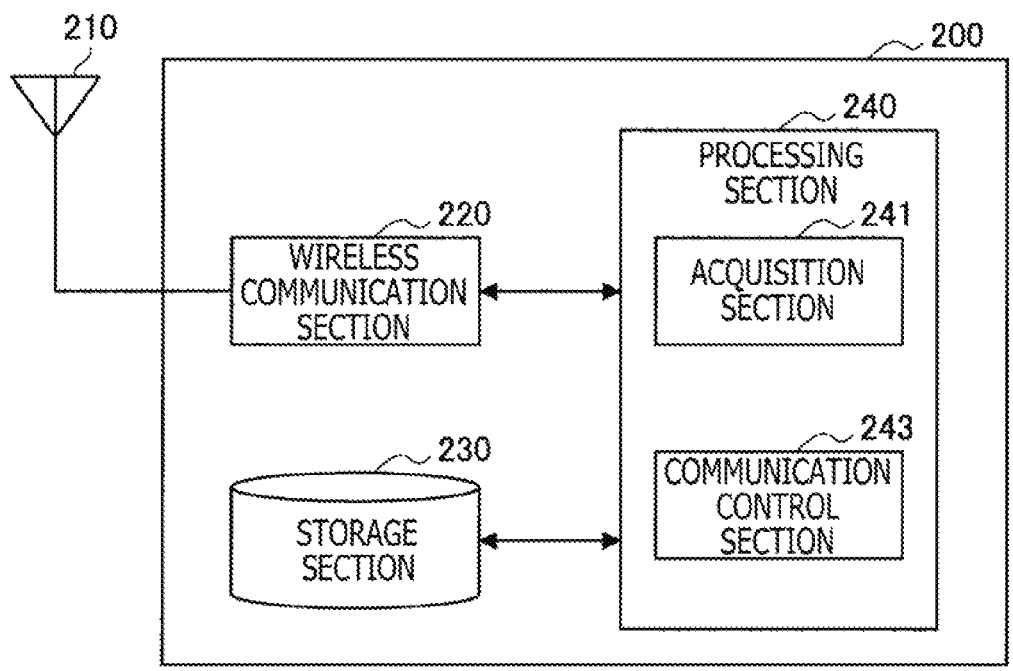
FIG. 6 is a block diagram depicting an example of a configuration of a terminal apparatus according to the embodiment of the present disclosure.

FIG. 6 is a block diagram depicts an example of a configuration of the terminal apparatus 200 according to the embodiment of the present disclosure. With reference to FIG. 6, the terminal apparatus 200 includes an antenna section 210, a wireless communication section 220, a storage section 230, and a processing section 240.

(1) Antenna Section 210

The antenna section 210 radiates a signal output from the wireless communication section 220 into the space as a radio wave. In addition, the antenna section 210 converts a radio wave in the space into a signal and outputs the signal to the wireless communication section 220.

(2) Wireless Communication Section 220

The wireless communication section 220 transmits and receives signals. For example, the wireless communication section 220 receives a downlink signal from the base station and transmits an uplink signal to the base station.

(3) Storage Section 230

The storage section 230 stores a program and various data for the terminal apparatus 200 to operate either temporarily or permanently.

(4) Processing Section 240

The processing section 240 provides various functions of the terminal apparatus 200. The processing section 240 has an acquisition section 241 and a communication control section 243. The acquisition section 241 has a function to acquire the setting information from the base station 100. The communication control section 153 has a function to control a receiving process (that is, received signal process) for receiving the data signal and the reference signal transmitted from the base station 100 on the basis of such setting information. It is noted that the processing section 240 can further include constituent elements other than these constituent elements. In other words, the processing section 240 can perform operations other than those performed by these constituent elements.

3. TECHNICAL FEATURES

Technical features of the system 1 will next be described. More specifically, the technical features related to a transmitting apparatus and a receiving apparatus included in the system 1 will be described. While the technical features will be described on the assumption of downlink and on the assumption that the transmitting apparatus is the base station 100 and the receiving apparatus is each terminal apparatus 200, the same thing is true for a case of assumption of uplink.

3.1. GFDM

(1) Radio Resource

Figure 7:
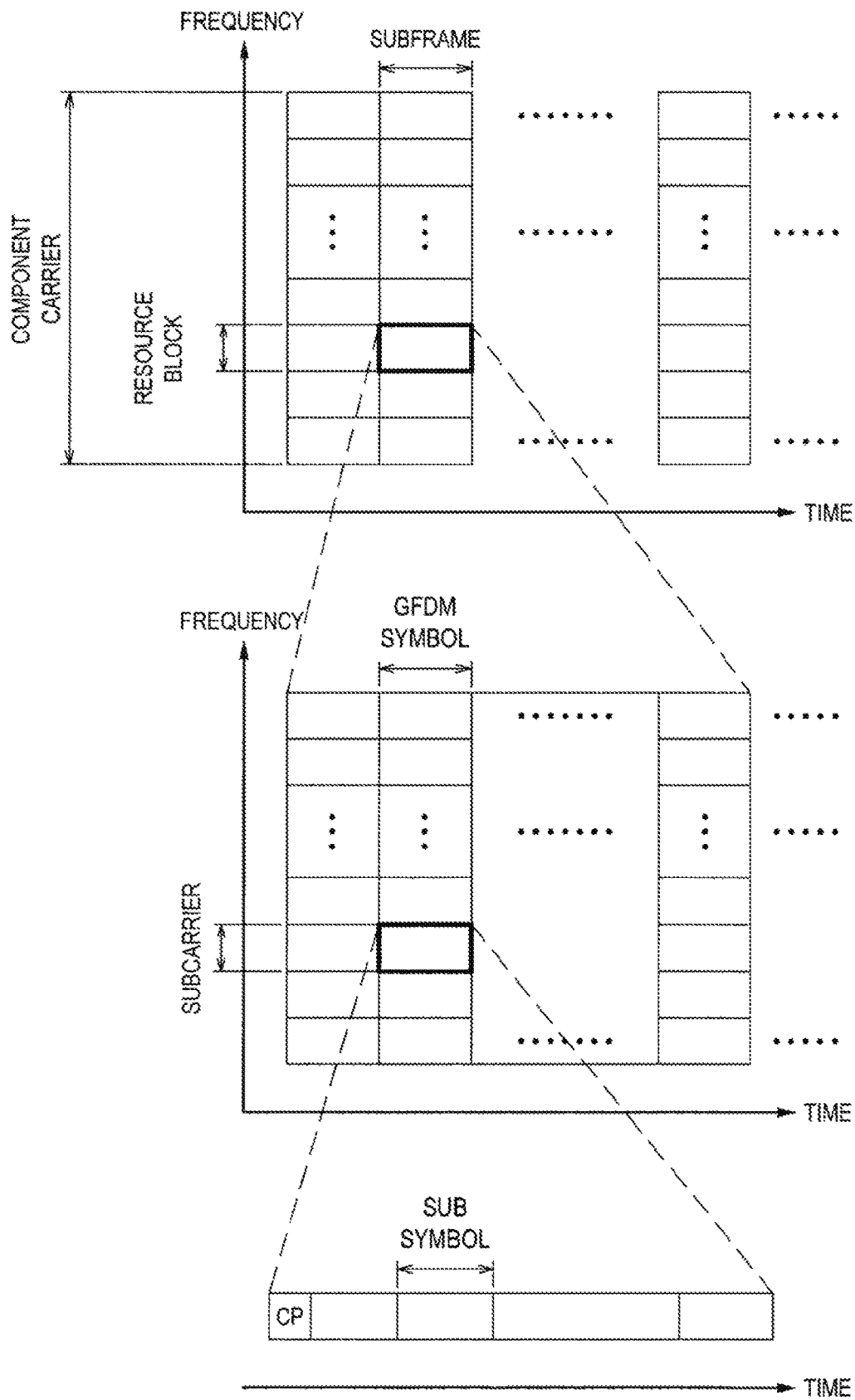
FIG. 7 is an explanatory diagram for explaining an example of a configuration of a frequency resource and a time resource in the GFDM according to the present embodiment.

FIG. 7 is an explanatory diagram for explaining an example of a configuration of a frequency resource and a time resource in the GFDM according to the present embodiment. It is assumed that a component carrier (CC) depicted in FIG. 7 is allocated to the system 1 according to the present embodiment. It is assumed that a bandwidth of the component carrier is Bcc. The component carrier may be herein a component carrier defined in LTE or LTE-A or may signify a more general unit frequency band. In this component carrier, a frequency resource is divided into $N_{RB}$ blocks referred to as "resource blocks (RBs)" and each having a predetermined bandwidth $B_{RB}$. In a case of realizing multiple access, it is desirable to allocate the frequency resource to each user with this resource block assumed as a unit. Each resource block is further divided into units called subcarriers.

It is noted that in ordinary GFDM (or OFDM), a fixed value is set to a spacing between the subcarriers (hereinafter, also referred to as "subcarrier spacing") in a system of interest. For example, in the OFDM of LTE, 15 kHz is fixedly set as the subcarrier spacing. A subcarrier bandwidth may be regarded as the subcarrier spacing.

In this respect, one feature of the present embodiment is that the transmitting apparatus can variably set the subcarrier spacing. Furthermore, another feature of the present embodiment is that different values can be set to the subcarrier spacing depending on the resource blocks within the component carrier or that different values can be further set to the subcarrier spacing within the resource block. By so setting, it is possible to set an appropriate subcarrier spacing for a propagation path. Furthermore, in a case in which the transmitting apparatus communicates with a plurality of receiving apparatuses, it is possible to set an appropriate subcarrier spacing in response to a performance and a requirement of each receiving apparatus. Owing to this, the system 1 can accommodate variety types of receiving apparatuses.

Moreover, as for a resource in a time direction, a unit called subframe is set as a reference unit. The subframe may be herein a subframe defined in LTE or LTE-A or may signify more general unit time. Basically, it is desired that a length of this subframe is set to a fixed value. The subframe is further demarcated into units called GFDM symbols. A CP is added to each GFDM symbol. Basically, it is also desired that a GFDM symbol length is set to a fixed value. The GFDM symbol is then further demarcated into units called subsymbols. A time length of this subsymbol (hereinafter, also referred to as "subsymbol period") is set to a fixed value in the ordinary GFDM.

In this respect, one feature of the present embodiment is that the transmitting apparatus can variably set the subsymbol period. Furthermore, another feature of the present embodiment is, similarly to the case of the subcarrier, that different values can be set to the subsymbol period depending on the resource blocks or that different values can be further set to the subsymbol period within the resource block.

Here, the transmitting apparatus can set parameters for ensuring compatibility to OFDM or SC-FDE. For example, the transmitting apparatus can ensure backward compatibility by making setting of the subcarrier spacing and the subsymbol period similar to setting of those in the OFDM or SC-FDE. The system 1 can thereby accommodate therein a legacy terminal incompatible with the GFDM.

(2) Transmitted Signal Process

A transmitted signal process in a case of setting variable the subcarrier spacing and the subsymbol time length will be described. The transmitting apparatus refers herein to, for example, the wireless communication section 120 that operates under control of the communication control section 153. In addition, a receiving apparatus refers herein to, for example, the wireless communication section 220 that operates under control of the communication control section 243. Furthermore, a multicell system such as HetNet and SCE is supposed as the system 1.

It is to be noted that an index corresponding to a subframe is omitted without otherwise specified. Moreover, indexes i or u of a transmitting apparatus i or a receiving apparatus u may indicate an ID of a cell to which the apparatus belongs or may indicate an ID of a cell managed by the apparatus.

It is assumed that a bit sequence transmitted from the transmitting apparatus i to the receiving apparatus u in one subframe t is $b_{i,u}$. The bit sequence $b_{i,u}$ may configure one transport block. Furthermore, while a case in which the transmitting apparatus i transmits one bit sequence to the receiving apparatus u is described below, the transmitting apparatus i may transmit a plurality of bit sequences to the

TABLE 1

Example of parameters related to resources

| Parameter | Value | Remarks for reference |
|---|---|---|
| $B_{CC}$ Component carrier bandwidth | 1, 4, 3, 5, 10, 15, 20 MHz | |
| $N_{RB}$ Number of resource blocks per component carrier | 6, 15, 25, 50, 75, 100 | Fixed number for component carrier bandwidth or subcarrier spacing |
| $B_{RB}$ RB bandwidth | $180 \times 2^n$ kHz | Increase or decrease in proportion to subcarrier spacing, where n is positive or negative integer |
| $N_{SC}$ Number of subcarriers per RB | 12 | Positive integer |
| $B_{SC}$ Subcarrier spacing | $15 \times 2^n$ kHz | *n is a positive or negative integer |
| $T_{SF}$ Subframe (SF) length | 1 msec | Fixed |
| $T_{GFDM}$ GFDM symbol length | 66.7 microseconds | CP length not inclusive |
| $N_{GFDM}$ Number of GFDM symbols per subframe | 12, 14 | Positive integer |
| $T_{SS}$ Subsymbol period | Variable | $T_{GFDM}/N_{SS}$ |
| $N_{SS}$ Number of subsymbols per GFDM symbols | Variable | Positive integer |
| $T_{CP}$ CP length | $4.7/(2^n)$ μsec, $16.67/(2^n)$ μsec | Increase or decrease in inverse proportion to subcarrier spacing, where n is positive or negative integer | receiving apparatus u and the bit sequences may configure a plurality of transport blocks at that time.

(2.1) First Example

FIGS. 8 to 11 are explanatory diagrams for explaining an example of a configuration of a first transmitting apparatus that supports GFDM according to the present embodiment. First, the transmitting apparatus performs a process depicted in FIG. 8 and then a process depicted in FIG. 9 per user. The transmitting apparatus then performs processes depicted in FIGS. 10 and 11 per transmit antenna port. These drawings depict an example of a configuration in a case of supposing that the transmitting apparatus transmits a GFDM signal to one or more users by multi-antenna transmission. In other words, the number of users (or number of receiving apparatuses) is $N_u \geq 1$, and the number of transmit antenna ports (or number of transmit antennas) is $N_{AP} \geq 1$. It is noted that the number of users is denoted by U and the number of transmit antenna ports is denoted by P in the drawings.

In a first example, an OFDM transmitted signal process depicted in FIG. 2 is extended to realize a GFDM transmitted signal process. A transmission process will be described hereinafter with reference to FIGS. 8 to 11.

Figure 8:
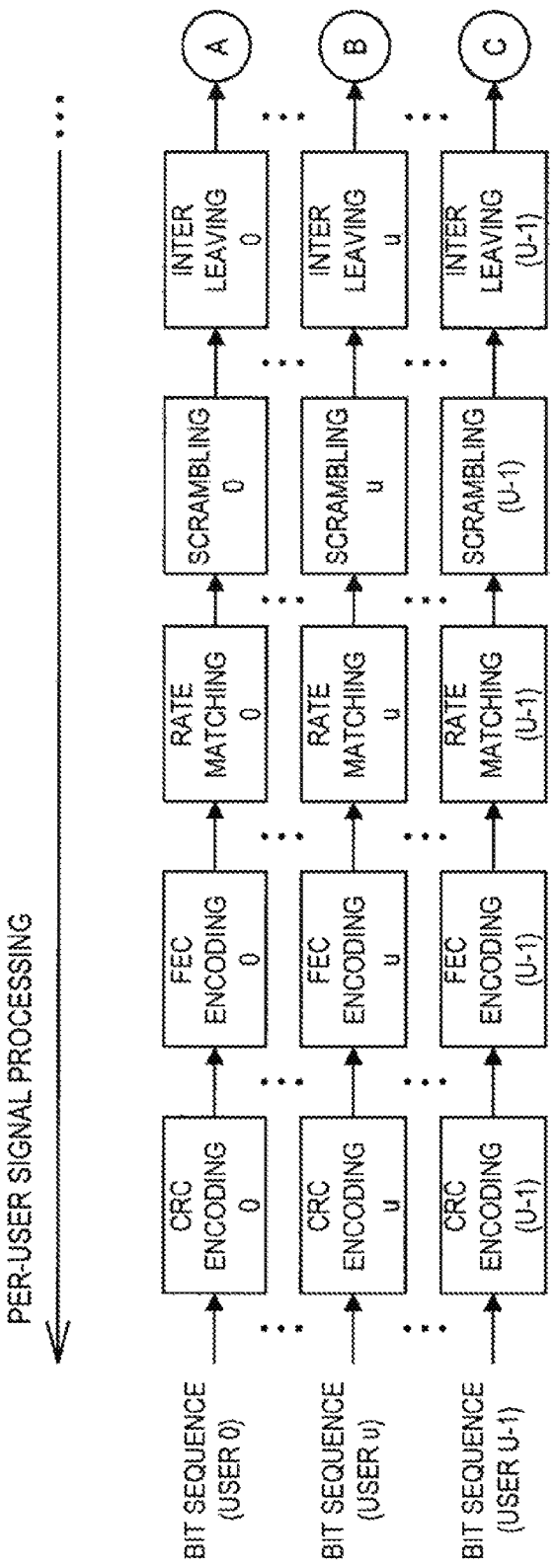
FIG. 8 is an explanatory diagram for explaining an example of a configuration of a first transmitting apparatus that supports GFDM according to the present embodiment.

As depicted in FIG. 8, first, the transmitting apparatus performs, on each bit sequence to be transmitted, CRC encoding, FEC encoding (for example, convolution encoding, turbo encoding, or LDPC encoding), rate matching for adjusting an encoding rate, bit scrambling, and bit interleaving, and the like. These processes are expressed by the following Expression.

[Math. 1]

$$b_{CRC,i,u} = CRC_{ENC}(b_{i,u}, u, i, t)$$

$$b_{FEC,i,u} = FEC_{ENC}(b_{CRC,i,u}, u, i, t)$$

$$b_{RM,i,u} = RM(b_{FEC,i,u}, u, i, t)$$

$$b_{SCR,i,u} = SCR(b_{RM,i,u}, u, i, t)$$

$$b_{INT,i,u} = \pi(b_{SCR,i,u}, u, i, t) \quad (1)$$

Process configurations of the processes may change depending on the receiving apparatus u, the transmitting apparatus i, or a subframe t. It is noted, in the above Expression (1), that each process is regarded as a function and a process result in a former stage is dealt with as an argument of a process of a later stage.

Figure 9:
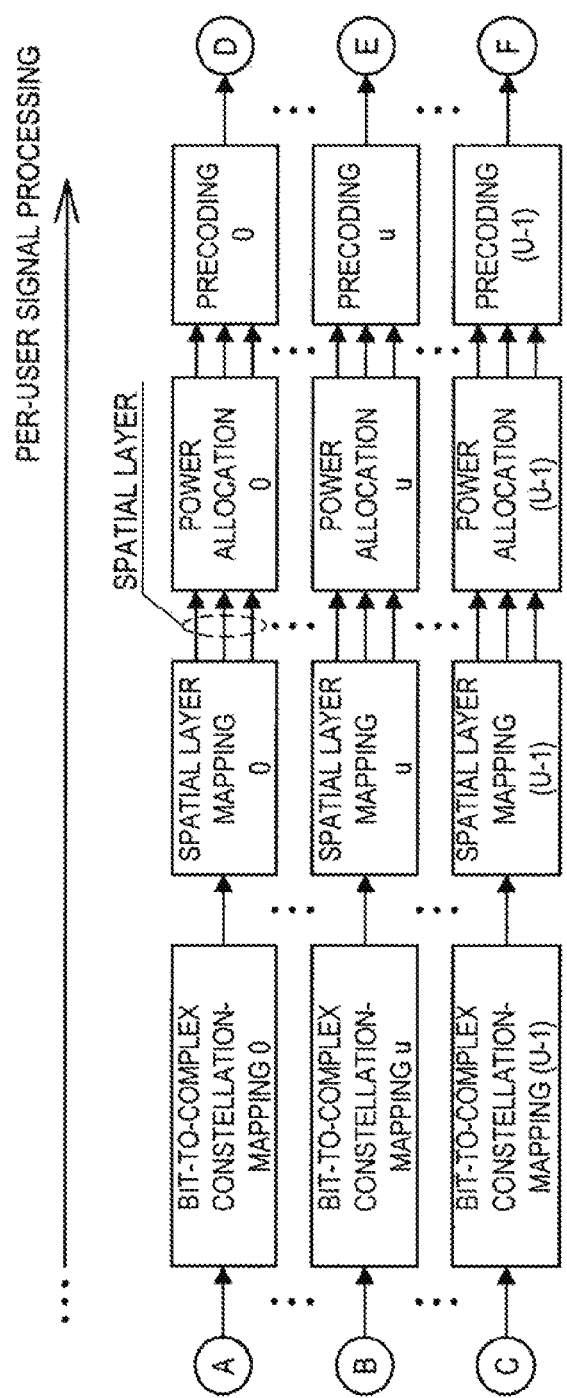
FIG. 9 is an explanatory diagram for explaining the example of the configuration of the first transmitting apparatus that supports GFDM according to the present embodiment.

Next, as depicted in FIG. 9, after a bit process, the transmitting apparatus maps (that is, converts) each bit sequence onto (into) complex symbols s and further maps the complex symbols s onto spatial layers 1. These processes are expressed by the following Expression.

[Math. 2]

$$s_{i,u} = \begin{bmatrix} s_{i,u,0} \\ \vdots \\ s_{i,u<N_{SL,i,u}-1} \end{bmatrix} \quad (2)$$

$$s_{i,u,l} = [ s_{i,u,l,0} \quad \cdots \quad s_{i,u,l,N-1} ]$$

Here, in the mapping onto the complex symbols s, various constellations such as BPSK, QPSK, 8PSK, 16QAM, 64QAM, and 256QAM can be used. In addition, $N_{SL,i,u}$ denotes the number of spatial layers for the receiving apparatus u.

After mapping onto the spatial layers, the transmitting apparatus performs power allocation and precoding on the symbols as expressed by the following Expression.

[Math. 3]

$$x_{i,u} = W_{i,u} P_{i,u} s_{i,u}$$

$$= \begin{bmatrix} x_{i,u,0,0} & \cdots & x_{i,u,0,N_{EL,TTL}-1} \\ \vdots & \ddots & \vdots \\ x_{i,u,N_{AP}-1,0} & \cdots & x_{i,u,N_{AP}-1,N_{EL,TTL}-1} \end{bmatrix}$$

$$= \begin{bmatrix} x_{i,u,0} \\ \vdots \\ x_{i,u,N_{AP}-1} \end{bmatrix}$$

[Math. 4]

$$x_{i,u,p} = [ x_{i,u,p,0} \quad \cdots \quad x_{i,u,p,N_{EL,TTL}-1} ] \quad (4)$$

[Math. 5]

$$W_{i,u} = \begin{bmatrix} W_{i,u,0,0} & \cdots & W_{i,u,0,N_{SL,i,u}-1} \\ \vdots & \ddots & \vdots \\ P_{i,u,N_{AP,i}-1,0} & \cdots & W_{i,u,N_{AP,i}-1,N_{SL,i,u}-1} \end{bmatrix} \quad (5)$$

[Math. 6]

$$P_{i,u} = \begin{bmatrix} P_{i,u,0,0} & \cdots & P_{i,u,0,N_{SL,i,u}-1} \\ \vdots & \ddots & \vdots \\ P_{i,u,N_{SL,i,u}-1,0} & \cdots & P_{i,u,N_{SL,i,u}-1,N_{SL,i,u}-1} \end{bmatrix} \quad (6)$$

In Expressions, $N_{AP,i}$ denotes the number of transmit antenna ports (or transmit antennas) of the transmitting apparatus i, and it is desirable that $N_{AP,i}$ basically satisfies a relationship of $N_{SL,i,u} \leq N_{AP,i}$. $N_{EL,TLL}$ denotes the number of elements to be described later. W is a precoding matrix and elements in the precoding matrix W are desirably either complex numbers or real numbers. P is a power allocation matrix, and it is desired that elements in the power allocation matrix P are real numbers and configure a diagonal matrix as expressed by the following Expression.

[Math. 7]

$$P_{i,u} = \begin{bmatrix} P_{i,u,0,0} & 0 & \cdots & 0 \\ 0 & P_{i,u,1,1} & \ddots & \vdots \\ \vdots & \ddots & \ddots & 0 \\ 0 & \cdots & \cdots & P_{i,u,N_{SL,u}-1,N_{SL,u}-1} \end{bmatrix} \quad (7)$$

After power allocation and precoding, the transmitting apparatus multiplexes signals per transmit antenna port as expressed by the following Expression. Examples of signal multiplexing that can be adopted include superimposed multiplex, SPC (Superposition Coding), MUST (Multiuser Superposition Transmission), or NOMA (Non-Orthogonal Multiple Access).

[Math. 8]

$$x_i = \sum_{u \in U_i} x_{i,u} \qquad (8)$$

In Expression (8), $U_i$ denotes a set of indexes of the receiving apparatuses u for which the transmitting apparatus i multiplexes the signals.

Figure 11:
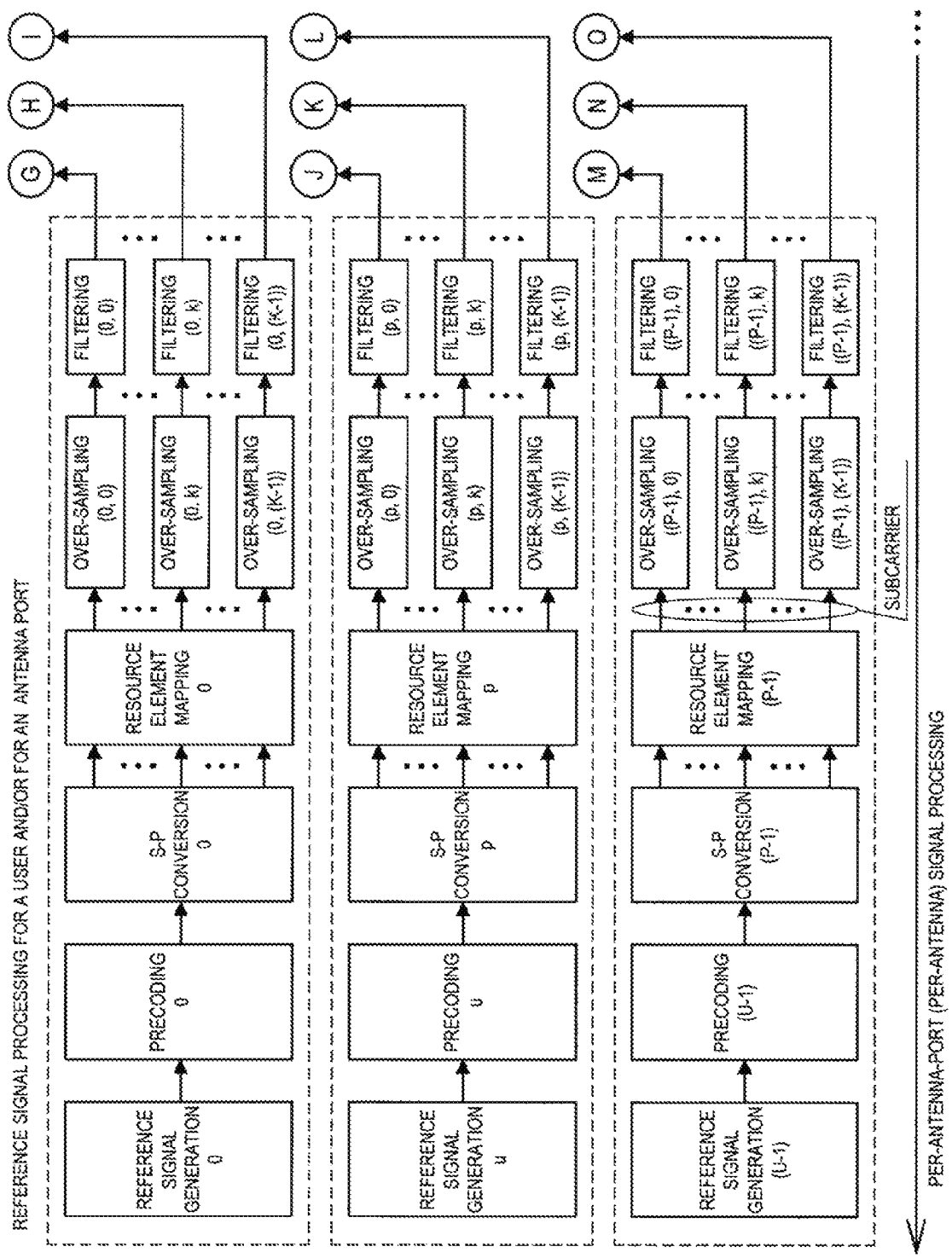
FIG. 11 is an explanatory diagram for explaining the example of the configuration of the first transmitting apparatus that supports GFDM according to the present embodiment.

The subsequent processes are signal processes per transmit antenna port p and per GFDM symbol g. As depicted in FIG. 11, first, the transmitting apparatus expands the symbols in a frequency direction by S/P conversion, and deploys the symbols onto elements of predetermined subcarriers and predetermined subsymbols by resource element mapping. A rule of this deployment may be either determined by the transmitting apparatus i or by the receiving apparatus u for which the signals are multiplexed.

The elements deployed in the subcarriers within each resource block r ($0 \leq r < N_{RB}$) as a result of the resource element mapping will be described.

The number of subcarriers in the intended resource block and the intended GFDM symbol is denoted by $N_{SC,r,g}$ and the number of subsymbols is denoted by $N_{SS,r,g}$. In this case, the number of elements in the GFDM symbol of interest is expressed by $N_{EL,r,g} = N_{SC,r,g} \times N_{SS,r,g}$.

The elements deployed in a subcarrier $k_{r,g}$ and a subsymbol $m_{r,g}$ is denoted by $x_{p,k_{r,g},m_{r,g}}$. The transmitting apparatus first performs oversampling on the elements (that is, those for subcarriers and those for subsymbols) at a sampling rate $N_{SR,r,g}$, and then filtering thereon at a filter factor $h_{p,k_{r,g},m_{r,g}}(n)$. n is an index of a sample. It is noted that k in FIGS. 10 and 11 denotes an index of a subcarrier and K denotes a total number of subcarriers.

The sample after filtering is expressed by the following Expression. It is noted that an oversampling effect is contained in a term of the filter factor.

[Math. 9]

$$d_{p,k_{r,g},m_{r,g}} = [d_{p,k_{r,g},m_{r,g}}(0) \ldots d_{p,k_{r,g},m_{r,g}}(N_{SS,r,g}N_{SS,r,g}-1)]$$

$$d_{p,k_{r,g},m_{r,g}}(n) = x_{p,k_{r,g},m_{r,g}} h_{p,k_{r,g},m_{r,g}}(n - m_{r,g}N_{SR,r,g}) \qquad (9)$$

After filtering, the transmitting apparatus modulates the symbols at a frequency f(k) for each subcarrier and multiplexes the symbols. When a set of subcarrier indexes contained in the resource block r and the GFDM symbol g is denoted by $k_{r,g}$, a GFDM symbol c(n) after multiplexing is expressed by the following Expression.

[Math. 10]

$$c_{p,g} = [c_{p,g}(0) \cdots c_{p,g}(N_{SS,g}N_{SR,g}-1)]$$

$$c_{p,g}(n) = \sum_{r=0}^{N_{RB}-1} \sum_{m_{r,g}=0}^{N_{SS,r,g}-1} \sum_{k \in K_{r,g}} d_{p,k,m_{r,g}}(n) \exp\left\{j2\pi f(k)n \frac{T_{SS,r,g}}{N_{SR,r,g}}\right\} \qquad (10)$$

Figure 10:
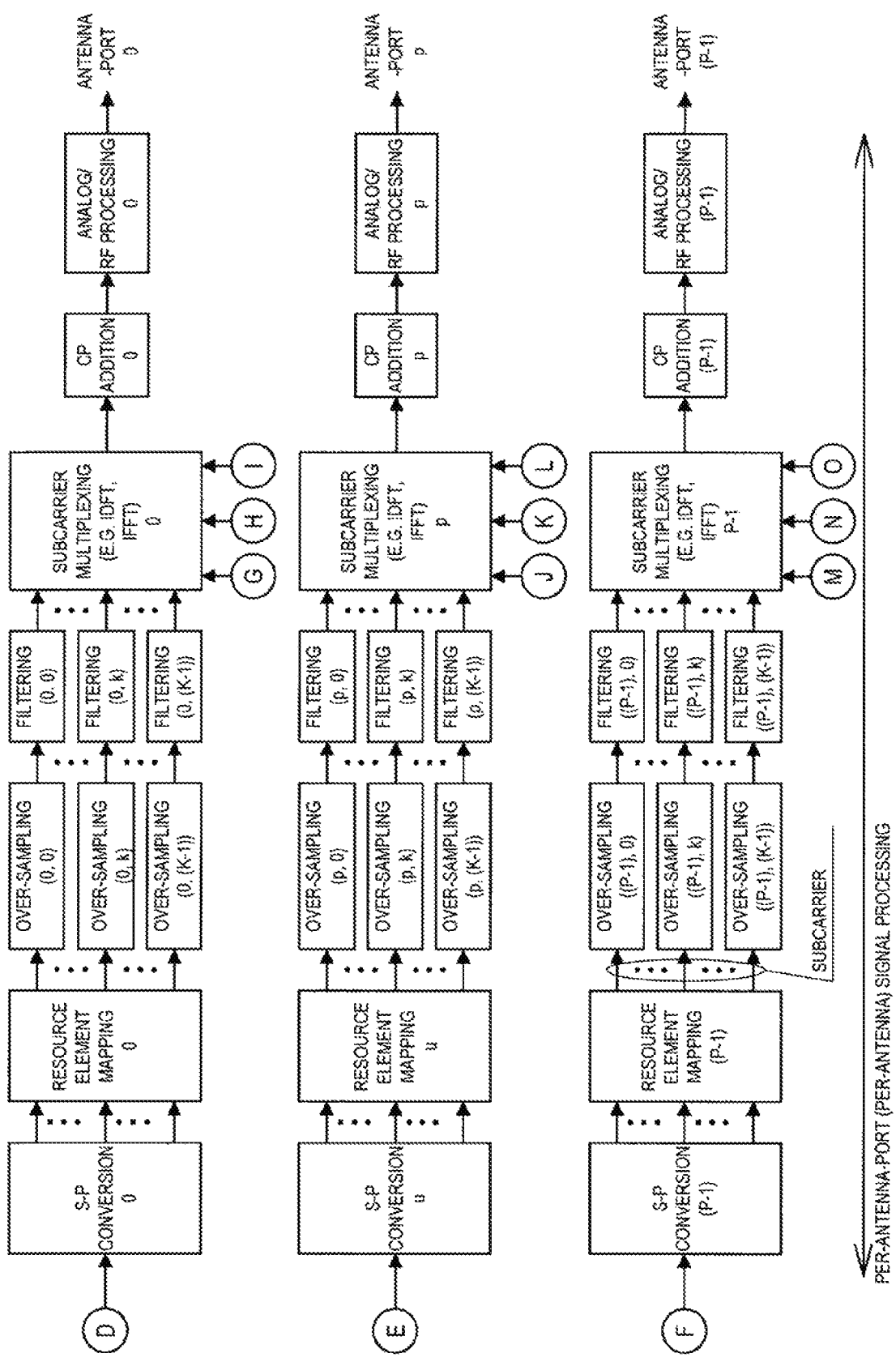
FIG. 10 is an explanatory diagram for explaining the example of the configuration of the first transmitting apparatus that supports GFDM according to the present embodiment.

As depicted in FIG. 11, the transmitting apparatus performs similar processes to those after precoding in the transmitted signal process described above on a reference signal. First, in the transmitted signal process, upon generating a reference signal, the transmitting apparatus performs precoding, S/P conversion, and resource element mapping, and then performs oversampling and filtering on each element. Subsequently, as depicted in FIG. 10, the transmitting apparatus multiplexes the elements of the reference signal after filtering with each GDFM symbol.

The transmitting apparatus adds a CP and a CS (Cyclic Sufix) to each GFDM symbol after multiplexing. The GFDM symbols after addition of the CP and CS are expressed by the following Expression.

[Math. 11]

$$c_{CP,p,g} = [c_{p,g}(N_{SS,g}N_{SR,g}-N_{CP,g}) \cdots c_{p,g}(N_{SS,g}N_{SR,g}-1)c_{p,g}(0) \ldots c_{p,g}(N_{SS,g}N_{SR,g}-1)] \qquad (11)$$

In Expression (11), $N_{CP,g}$ denotes the number of CP samples added to the GFDM symbols g.

(2.2) Second Example

Figure 12:
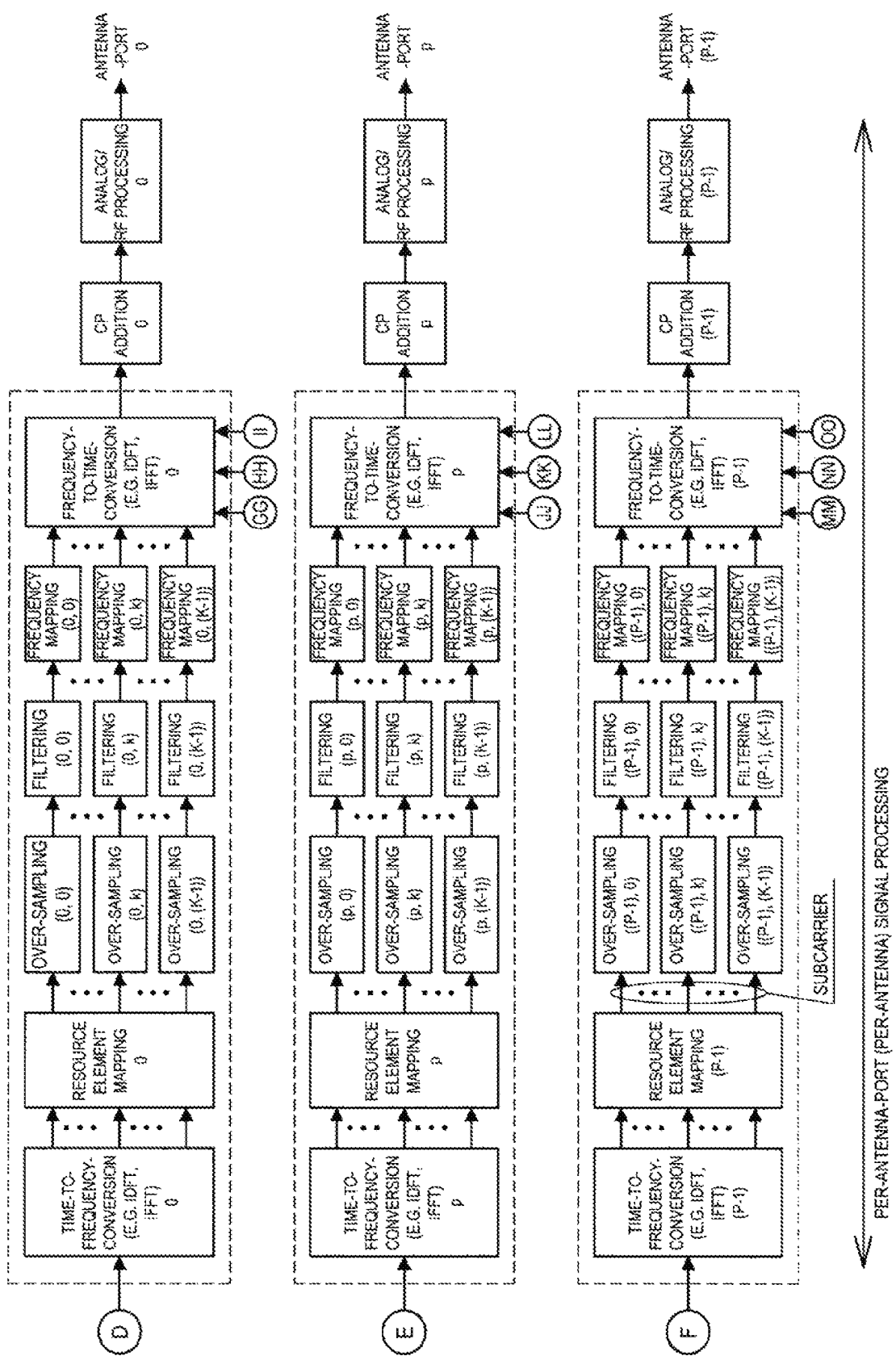
FIG. 12 is an explanatory diagram for explaining an example of a configuration of a second transmitting apparatus that supports GFDM according to the present embodiment.
Figure 13:
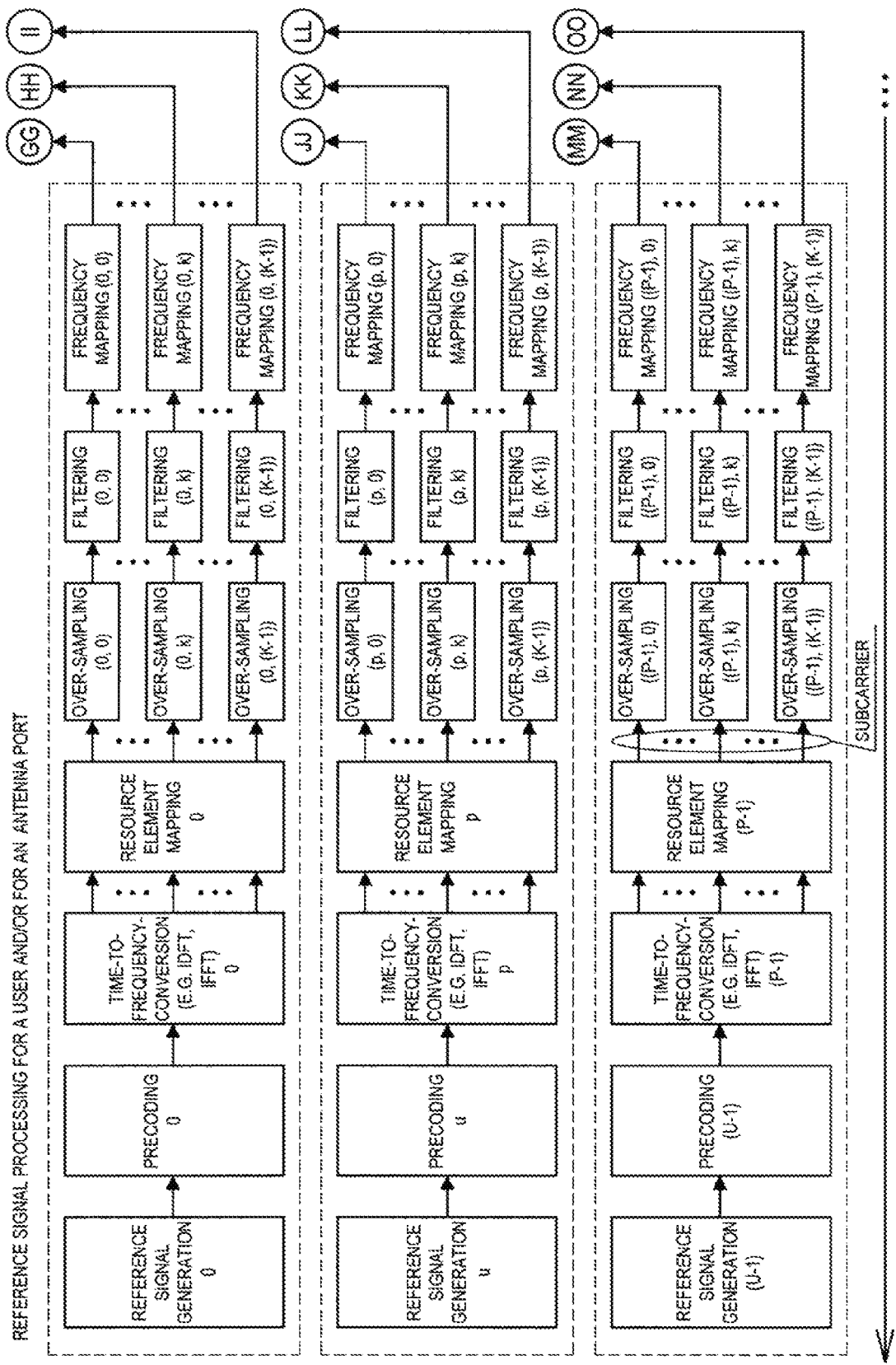
FIG. 13 is an explanatory diagram for explaining the example of the configuration of the second transmitting apparatus that supports GFDM according to the present embodiment.

FIGS. 12 and 13 are explanatory diagrams for explaining an example of a configuration of a second transmitting apparatus that supports GFDM according to the present embodiment. Similarly to the first example, the transmitting apparatus according to a second example performs the process depicted in FIG. 8 and the process depicted in FIG. 9 per user. The transmitting apparatus according to the second example then performs processes depicted in FIGS. 12 and 13 per transmit antenna port. A difference of the second example from the first example is that domains of signal processing are in order of time, frequency, and time domains. Specifically, a part regarded as the process per user in the first example is a process in the time domain in the second example.

In the second example, an SC-FDE transmitted signal process depicted in FIG. 3 is extended to realize the GFDM transmitted signal process. The present transmitted signal process is particularly characterized in that a process for converting a time domain signal to be processed into a frequency domain signal before oversampling. The transmission process will be described below with reference to FIGS. 12 and 13.

As depicted in FIG. 12, the transmitting apparatus first performs time-to-frequency conversion (for example, DFT or FFT) on a time symbol sequence to convert the time symbol sequence into a frequency component. When the time symbol sequence allocated to the subcarrier k and the GFDM symbol g in the resource block r is denoted by $x_{p,r,g}$, a frequency component after the frequency conversion

[Math. 12]

$$\bar{x}_{p,r,k,g} \qquad (12)$$

is expressed by the following Expressions.

[Math. 13]

$$\bar{x}_{p,r,k,g} = F_{N_{SS,r,k,g}} x_{p,r,g}^T$$

$$= [\bar{x}_{p,r,k,g,0} \cdots \bar{x}_{p,r,k,g,N_{SS,r,k,g}-1}]^T \qquad (13)$$

[Math. 14]

$$x_{p,r,g} = [x_{p,r,g,0} \cdots x_{p,r,g,N_{SS,r,k,g}-1}]^T \qquad (14)$$

[Math. 15]

$$F_N = \begin{bmatrix} \exp\left(-j2\pi\frac{0\cdot 0}{N}\right) & \cdots & \exp\left(-j2\pi\frac{0\cdot(N-1)}{N}\right) \\ \vdots & \ddots & \vdots \\ \exp\left(-j2\pi\frac{(N-1)0}{N}\right) & \cdots & \exp\left(-j2\pi\frac{(N-1)\cdot(N-1)}{N}\right) \end{bmatrix} \quad (15)$$

In Expression (15), $F_N$ denotes a Fourier transform matrix at a size of N.

After the conversion into the frequency component, the transmitting apparatus performs oversampling per subcarrier. Since an oversampling process corresponds to repetition of the frequency component in the frequency domain, the frequency component after the frequency conversion is expressed by the following Expressions.

[Math. 16]

$$\begin{aligned}\overline{x}_{p,r,k,g} &= I_{OS,N_{SS,r,k,g},N_{SR,r,k,g}} \overline{x}^T_{p,r,k,g} \\ &= [\,\overline{x}_{p,r,k,g,0} \;\cdots\; \overline{x}_{p,r,k,g,N_{SS,r,k,g}N_{SR,r,k,g}-1}\,]^T \\ &= \left[\underbrace{\overline{x}_{p,r,k,g,0}\;\cdots\;\overline{x}_{p,r,k,g,N_{SS,r,k,g}-1}}_{o\text{-}th} \;\cdots\; \underbrace{\overline{x}_{p,r,k,g,0}\;\cdots\;\overline{x}_{p,r,k,g,N_{SS,r,k,g}-1}}_{(N_{SR,r,k,g}-1)\text{-}th}\right]\end{aligned} \quad (16)$$

[Math. 17]

$$I_{OS,N,M} = \left[\,\underbrace{I_N}_{0\text{-}th}\;\cdots\;\underbrace{I_N}_{(M-1)\text{-}th}\,\right]^T \quad (17)$$

In Expression (17), a matrix $I_N$ is a unit matrix at the size N. In other words, $I_{OS,N,M}$ is a matrix in which M matrices IN are aligned.

After the oversampling, the transmitting apparatus performs filtering per predetermined number of subcarriers. For example, the transmitting apparatus realize filtering by multiplying each frequency component by a frequency filter factor. It is noted that the predetermined number may be either 1 or an arbitrary number equal to or greater than 1. The arbitrary number equal to or greater than 1 may be, for example, the number of subcarriers contained in a unit resource to be described later. A signal after filtering is expressed by the following Expression.

[Math. 18]

$$\begin{aligned}\overline{d}_{p,r,k,g} &= \Gamma_{p,r,k,g}\overline{x}_{p,r,k,g} \\ &= [\,\overline{d}_{p,r,k,g}(0) \;\cdots\; \overline{d}_{p,r,k,g}(N_{SS,r,k,g}N_{SR,r,k,g}-1)\,]^T\end{aligned} \quad (18)$$

$$\Gamma_{p,r,k,g} = \begin{bmatrix} \overline{\gamma}_{p,r,k,g,0,0} & \cdots & \overline{\gamma}_{p,r,k,g,0,N_{SS,p,r,k,g}N_{SR,p,r,k,g}-1} \\ \vdots & \ddots & \vdots \\ \overline{\gamma}_{p,r,k,g,N_{SS,p,r,k,g}N_{SR,p,r,k,g}-1,0} & \cdots & \overline{\gamma}_{p,r,k,g,N_{SS,p,r,k,g}N_{SR,p,r,k,g}-1,N_{SS,p,r,k,g}N_{SR,p,r,k,g}-1} \end{bmatrix}$$

In Expression (18), a matrix $\Gamma$ denotes the filter factor. This matrix can be normally set as a diagonal matrix. In other words, the matrix $\Gamma$ may be expressed by the following Expression.

[Math. 19]

$$\Gamma_{p,r,k,g} = \begin{bmatrix} \overline{\gamma}_{p,r,k,g,0,0} & 0 & \cdots & 0 & 0 \\ 0 & \ddots & \ddots & \ddots & 0 \\ \vdots & \ddots & \ddots & \ddots & \vdots \\ 0 & \ddots & \ddots & \ddots & 0 \\ 0 & 0 & \cdots & 0 & \overline{\gamma}_{p,r,k,g,N_{SS,p,r,k,g}N_{SR,p,r,k,g}-1,N_{SS,p,r,k,g}N_{SR,p,r,k,g}-1} \end{bmatrix} \quad (19)$$

After filtering, the transmitting apparatus performs mapping on the frequency component in accordance with a predetermined rule and performs frequency-to-time conversion (for example, IDFT or IFFT). The processes are expressed by the following Expressions.

[Math. 20]

$$\bar{d}_{p,r,g} = \sum_{k \in K_{r,g}} \bar{A}_{p,r,k,g} \bar{d}_{p,r,k,g} \quad (20)$$

$$= [\bar{d}_{p,r,g}(0) \cdots \bar{d}_{p,r,g}(N_{IDFT}-1)]^T$$

[Math. 21]

$$c_{p,g} = F_{N_{IDFT}}^H \sum_{r=0}^{N_{RB}-1} \bar{d}_{p,r,g} \quad (21)$$

$$= [c_{p,g}(0) \cdots c_{p,g}(N_{IDFT}-1)]^T$$

In Expression (21), $F^H$ denotes an Hermitian matrix of F. In addition, A denotes a frequency mapping matrix at a size of $N_{IDFT} \times N_{SS,r,k,g} \times N_{SR,r,k,g}$. In a case in which a frequency component k' after filtering per subcarrier is deployed on a final frequency component k, component (k,k') in the frequency mapping matrix A is 1. In a case in which the frequency component k' after filtering per subcarrier is not deployed in the final frequency component k, the component (k,k') in the frequency mapping matrix A is 0. It is desirable that a sum of elements in rows in the frequency mapping matrix A is equal to or smaller than 1 and a sum of elements in columns therein is equal to or smaller than 1.

As depicted in FIG. 13, the transmitting apparatus performs similar processes to those after precoding in the transmitted signal process described above on the reference signal. First, in the transmitted signal process, upon generating the reference signal, the transmitting apparatus performs precoding, time-to-frequency conversion, and resource element mapping, and then performs oversampling, filtering, and frequency mapping on each element. Subsequently, as depicted in FIG. 12, the transmitting apparatus multiplexes the elements of the reference signal after frequency mapping with each GDFM symbol.

The transmitting apparatus adds a CP to each GFDM symbol after having been subjected to the frequency-to-time conversion. The GFDM symbols after addition of the CP are expressed by the following Expression.

[Math. 22]

$$c_{CP,p,g} = [c_{p,g}(N_{SS,g}N_{SR,g}-N_{CP,g}) \cdots c_{p,g}(N_{SS,g}N_{SR,g}-1)c_{p,g}(0) \cdots c_{p,g}(N_{SS,g}N_{SR,g}-1)] \quad (22)$$

In Expression (22), $N_{CP,g}$ denotes the number of CP samples added to the GFDM symbols g.

(2.3) Comparison of First Example with Second Example

It may be said that the transmitting apparatuses according to the first and second examples generate the same waveforms in theory. However, in a case of multiplexing subsymbols at different lengths and/or subcarriers having different spacings, there is a difference between the first and second example in simplicity of implementation, as described hereinafter.

Specifically, in the first example, in a case of a mixture of subcarriers having different spacings, it is difficult to use fast computing such as IDFT or IFFT to multiplex subcarriers. This is due to difficulty in inputting signals that are not fixed in resolution in the IDFT and IFFT.

On the other hand, in the second example, appropriately setting parameters makes it possible to use fast computing such as IDFT or IFFT for frequency-to-time conversion. In other words, the transmitting apparatus according to the second example is more useful than that according to the first example from the viewpoint of simplicity of implementation.

(3) Parameter Setting

Parameter setting made by the transmitting apparatus according to the present embodiment will be described hereinafter.

(3.1) Setting of Filtering Parameters

Figure 14:
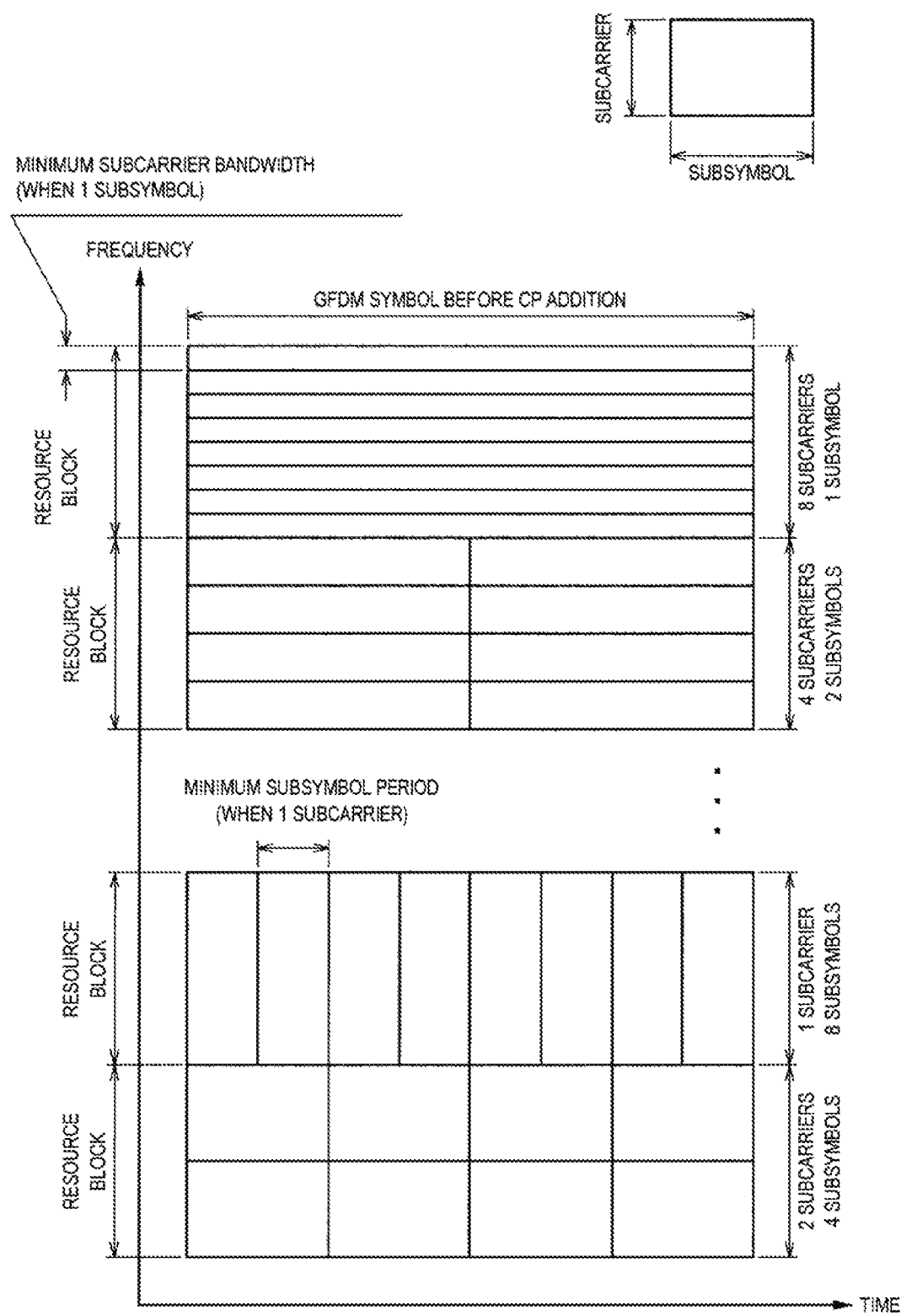
FIG. 14 is a diagram depicting an example of a resource configuration according to the present embodiment.

The transmitting apparatus according to the present embodiment variably sets at least either the spacing of subcarriers or the time length of subsymbols contained in the unit resource including one or more subcarriers or one or more subsymbols. The unit resource may be herein a frequency resource unit (for example, resource block or component carrier), a time resource unit (for example, GFDM symbol or subframe), or a unit of a combination of the frequency resource and the time resource. The transmitting apparatus then performs filtering on the basis of this setting. Specifically, the transmitting apparatus variably sets a bandwidth of a filter on the basis of the set subcarrier spacing. With the first or second configuration described above, the transmitting apparatus can perform filtering on a predetermined number of subcarriers; thus, it is possible to realize a resource configuration realizing the variably set subcarrier spacing and the variably set subsymbol time length. For example, the transmitting apparatus according to the present embodiment can multiplex subsymbols at different time lengths and/or subcarriers at different spacings within the same GFDM symbol time period. FIG. 14 depicts an example of a configuration of such GFDM symbols.

As depicted in FIG. 14, the transmitting apparatus can set different values to the subsymbol period and the subcarrier spacing depending on unit resources. It is noted, however, that the transmitting apparatus sets the same values to the subcarrier spacing and the subsymbol period within the unit resource. For example, in the example depicted in FIG. 14, the same subcarrier spacing and the same subsymbol period are set within each resource block. In a case of using the resource block as a unit of allocating the frequency resource in a multiuser system, such setting makes it possible to set predetermined values to the subsymbol period and the subcarrier spacing for one user. This makes a transmission process and a receiving process simple. Furthermore, the transmitting apparatus can set different values to the subsymbol period and the subcarrier spacing depending on the GFDM symbol unit or the subframe unit.

It is also desirable that a value of a product between the number of subcarriers and the number of subsymbols is the same among the different unit resources. For example, in the example depicted in FIG. 14, the product between the number of subcarriers and the number of subsymbols is equally eight in a plurality of resource blocks multiplexed within the same GFDM symbol time period. By so setting, it is possible to simplify configurations of the transmitting apparatus and the receiving apparatus (that is, the transmission process and the receiving process) in a case of introducing variable parameters.

The transmitting apparatus can variably set the subcarrier spacing. For example, the transmitting apparatus can set the subcarrier spacing to an integer multiple of a minimum value that can be set and specified in the system 1. In addition, the transmitting apparatus can set the subcarrier spacing to a value by which the bandwidth of the unit resource is divisible. Setting in this way enables the transmitting apparatus to make full use of all available frequency resources without waste. It is noted that the minimum value of the subcarrier spacing is desirably equal to the subcarrier spacing in a case in which the number of subsymbols within the GFDM symbol is one.

The transmitting apparatus can variably set the subsymbol period. For example, the transmitting apparatus can set the subsymbol period to an integer multiple of a minimum value that can be set and specified in the system 1. In addition, the transmitting apparatus can set the subsymbol period to a value by which the time length of the unit resource is divisible. Setting in this way enables the transmitting apparatus to make full use of all available time resources without waste. It is noted that the minimum value of the subsymbol period is desirably equal to the subsymbol period in a case in which the number of subcarriers within the resource block is one.

The following table depicts an example of a range of parameters related to resources that can be taken in the system 1 according to the present embodiment.

TABLE 2

Example of range of parameters related to resources

| Parameter | | Value | Remarks for reference |
|---|---|---|---|
| Subsymbol period | Minimum value | Equal to the subsymbol period when the number of subcarriers is 1 | |
| | Maximum value | Equal to the GFDM symbol length | |
| Number of subsymbols | Minimum value | 1 | Value of the product between the number of subsymbols and the number of subcarriers is constant |
| | Maximum value | Maximum value of the number of subcarriers | Value of the product between the number of subsymbols and the number of subcarriers is constant |
| Subcarrier spacing | Minimum value | Equal to the subcarrier spacing when the number of subsymbols is 1 | |
| | Maximum value | Equal to the resource block bandwidth (or equal to the value of the product between the resource block bandwidth and a total number of resource blocks allocated to an intended signal) | |

It is noted that FIG. 14 depicts a state before addition of a CP. The transmitting apparatus adds a CP of the same time length to one or more unit resources to which the CP is to be added.

(3.2) Setting of Oversampling Parameters

Oversampling parameters may be set in response to the transmission process.

For example, with respect to the first transmitting apparatus depicted in FIGS. 8 to 11, it is desirable that a sampling rate $N_{SR,r,g}$ is equal to or higher than the total number of subcarriers. Furthermore, in a case in which the subsymbol period and the subcarrier spacing are variable, an actual number of subcarriers may be set to the total number of subcarriers (that is, a guard interval may be ignored). Alternatively, the number of subcarriers in a case in which all subcarrier spacings are set to the minimum value that can be taken in the system 1 (that is, the largest number of subcarriers that can be taken by the system 1) may be set to the total number of subcarriers. Furthermore, in a case of multiplexing subcarriers by IDFT or IFFT, a size of the IDFT or a size of the IFFT may be set to an oversampling parameter $N_{SR,r,g}$.

For example, in a case of the second transmitting apparatus depicted in FIGS. 12 and 13, smaller values than those in the case of the first transmitting apparatus can be set to the oversampling parameters. For example, in a case of adopting a transmission filter factor corresponding to an RC filter (Raised-Cosine filter) or an RRC filter (Root-Raised-Cosine Filter), it may be said that an oversampling factor is two at the greatest. Needless to say, the oversampling factor may be two or more even in that case.

3.2. Mixture of Communication Parameter Sets

The base station 100 and each terminal apparatus 200 can hold communication using a plurality of communication parameter sets each containing one or more communication parameters in a unit resource. In other words, the base station 100 can communicate with each terminal apparatus 200 using a mixture of a plurality of communication parameter sets in the unit resource.

The unit resource is a resource including a predetermined number of frequency resources and a predetermined number of time resources. The unit resource includes, for example, one or a plurality of component carriers, resource blocks, or subcarriers, and one or a plurality of frames, subframes, slots, or symbols.

(1) Example of Communication Parameter Sets

Various communication parameters are considered to be contained in communication parameter sets. For example, each communication parameter set contains a waveform parameter and a physical layer parameter. More specifically, the communication parameter set can contain communication parameters related to any of at least precoding, filtering, oversampling, waveforms, resource setting, or transmission power.

Precoding

Example of a communication parameter related to precoding include a precoding factor. Examples of the precoding factor include a precoding matrix and a precoding weight.

Filtering

Examples of a communication parameter related to filtering include a filter form and a filter factor. Examples of the filter form include the Raised-Cosine Filter and the Root-Raised-Cosine Filter.

Oversampling

Examples of a communication parameter related to oversampling include the oversampling factor. Examples of the oversampling factor include the sampling rate.

Waveforms

Examples of a communication parameter related to waveforms include such modulation schemes as OFDMA, DFT-S-OFDMA (SC-FDMA), and GFDMA described above. It is noted that the OFDMA, the DFT-S-OFDMA (SC-FDMA), and the GFDMA are techniques normally classified into the modulation scheme or a multiple access scheme. In the present specification, attention is paid to waveforms generated by these techniques and these techniques are regarded as waveforms.

Resource Setting

Examples of a communication parameter related to resource setting include the subcarrier spacing and a slot length.

(2) Mixture of Communication Parameter Sets

The base station 100 holds communication using a plurality of communication parameter sets in the unit resource. At that time, the base station 100 demarcates the unit resource by, for example, at least either a frequency range or a time range, and can hold communication using different communication parameter sets in the demarcated unit resources.

As an example, the communication parameter sets may vary in a predetermined frequency range (for example, resource block) within a frequency channel (for example, component carrier). In addition, the communication parameter sets may vary in a predetermined time range (for example, subframe). Furthermore, different communication parameter sets may be used between the reference signal and the data signal. This respect will be described hereinafter.

3.3. Control Over Transmitted Signal Process

The base station 100 applies different transmitted signal processes between the reference signal and the data signal. More specifically, the base station 100 transmits the data signal and the reference signal generated using the communication parameter sets different between the data signal and the reference signal to the terminal apparatus 200. On the other hand, the terminal apparatus 200 performs a receiving process for receiving the data signal and the reference signal generated using the communication parameter sets different between the data signal and the reference signal. The reference signal means herein a reference signal for use in demodulation on a receiving side and is, for example, a DM-RS (Demodulation Reference Signal). Applying different transmitted signal processes between the reference signal and the data signal makes it possible to reduce an influence of an interference that occurs in a case of a mixture of different subcarrier spacings and different symbol lengths on the reference signal and channel estimation accuracy. Accordingly, it is possible to suppress deteriorations in demodulation accuracy and decoding accuracy for a received signal in the terminal apparatus 200.

In FIGS. 8 to 13, a processing block for the data signal and that for the reference signal are independent of each other. The base station 100 applies the different transmitted signal processes to the data signal and the reference signal by using different communication parameter sets between the processing blocks for the data signal and the reference signal. Table 3 below depicts an example of a combination of transmitted signal processes applied to the data signal and the reference signal.

TABLE 3

Example of combination of transmitted signal processes applied to data signal and reference signal

| Case | Precoding factor (Precoding Weight, Precoding Matrix) | Oversampling factor | Filter factor |
|---|---|---|---|
| C1 | Use common factor to data signal and reference signal | Use independent factors for data signal and reference signal | Use independent factors for data signal and reference signal |
| C2 | Use common factor to data signal and reference signal | Oversampling not performed on reference signal | Filtering not performed on reference signal |
| C3 | Use common factor to data signal and reference signal | Use independent factors for data signal and reference signal | Make band limiting of filtering for reference signal sharper than that of filtering for the data signal (make roll-off rate for reference signal lower than that for data signal) |
| C4 | Use common factor to data signal and reference signal | Use independent factors for data signal and reference signal | Make band limiting of filtering for reference signal gentler than that of filtering for data signal (make roll-off rate for reference signal higher than that for data signal) |
| C5 | Use common factor to data signal and reference signal | Use independent factors for data signal and reference signal | Further add a process to filtering (transmitting side interference cancelling) for reference signal |
| C6 | Use common factor to data signal and reference signal | Use independent factors for data signal and reference signal | Replace filtering by transmitting side interference canceller for reference signal |

TABLE 3-continued

Example of combination of transmitted signal processes
applied to data signal and reference signal

| Case | Precoding factor (Precoding Weight, Precoding Matrix) | Oversampling factor | Filter factor |
|---|---|---|---|
| C7 | Use independent factors for data signal and reference signal | Use independent factors for data signal and reference signal | Use independent factors for data signal and reference signal |
| C8 | Use independent factors for data signal and reference signal | Oversampling not performed on reference signal | Filtering not performed on reference signal |
| C9 | Use independent factors for data signal and reference signal | Use independent factors for data signal and reference signal | Make band limiting of filtering for reference signal sharper than that of filtering for the data signal (make roll-off rate for reference signal lower than that for data signal) |
| C10 | Use independent factors for data signal and reference signal | Use independent factors for data signal and reference signal | Make band limiting of filtering for reference signal gentler than that of filtering for data signal (make roll-off rate for reference signal higher than that for data signal) |
| C11 | Use independent factors for data signal and reference signal | Use independent factors for data signal and reference signal | Further add a process to filtering (transmitting side interference cancelling) for reference signal |
| C12 | Use independent factors for data signal and reference signal | Use independent factors for data signal and reference signal | Replace filtering by transmitting side interference canceller for reference signal |

Precoding

It is desirable to apply a common process to precoding to the data signal and the reference signal. In other words, it is desirable to use a common factor (precoding matrix or precoding weight) to the data signal and the reference signal. In Table 3 above, cases C1 to C6 are desirable. Needless to say, different processes may be applied to the data signal and the reference signal. In that case, however, the receiving apparatus performs channel estimation, an equalization process, a decoding process, and a demodulation process reflective of a difference in precoding between the data signal and the reference signal, possibly resulting in a heavier processing load.

Filtering

It is desirable to apply different processes to filtering between the data signal and the reference signal.

The base station 100 may use filters of the same form and different filter factors for the data signal and the reference signal. In a case of adopting, for example, Raised-Cosine Filter as the filter form, the base station 100 adopts different roll-off rates between the data signal and the reference signal. Specifically, the base station 100 may make the roll-off rate for the reference signal lower than that for the data signal, that is, may make the band limiting of filtering sharper for the reference signal than that for the data signal. Alternatively, the base station 100 may make higher the roll-off rate of the reference signal, that is, may make gentler the band limiting of filtering for the reference signal. According to a simulation result to be described later, it can be said that the former is more desirable since a better error rate characteristic can be obtained.

The base station 100 use filters of different forms between the data signal and the reference signal. As a first example, the base station 100 may apply a Raised-Cosine Filter to the data signal and apply a Root-Raised-Cosine Filter to the reference signal. Alternatively, the base station 100 may apply the Root-Raised-Cosine Filter to the data signal and apply the Raised-Cosine Filter to the reference signal. Furthermore, as a second example, the base station 100 may apply a band limiting filter (Raised-Cosine Filter, Root-Raised-Cosine Filter, or the like) to the data signal and apply a transmitting side interference cancellation filter to the reference signal. Such a difference makes it possible to reduce the influence of the interference particularly on the reference signal. Moreover, as a third example, the base station 100 may perform filtering on the data signal while omit (that is, skip) filtering on the reference signal. This may be interpreted as a change in waveform modulation scheme (that is, waveform) between the data signal and the reference signal. For example, the base station 100 may transmit the data signal by GFDM, Filtered-OFDM, or FBMC (Filter-Bank Multicarrier), while transmitting the reference signal by OFDM. Such a difference in waveform also makes it possible to reduce the influence of the interference on the reference signal.

Oversampling

It is desirable to perform a process in response to the difference in filtering described above for oversampling. For example, in a case of performing filtering on the data signal and omitting filtering on the reference signal, the base station 100 performs oversampling on the data signal and omits oversampling on the reference signal.

Waveforms

The difference in waveform described above may be interpreted as a difference as to whether or not a waveform has a feature of a single carrier waveform. Table 4 below depicts an example of waveforms with and without the feature of the single carrier waveform.

TABLE 4

Example of waveforms with and without
feature of single carrier waveform.

| | |
|---|---|
| Example of waveform with feature of single carrier waveform | SC-FDMA<br>DFT-S-OFDMA<br>GFDMA (GFDMA using DFT-Spread on transmitting side) |
| Example of waveform without feature of single carrier waveform | OFDMA<br>Filtered OFDMA<br>UF-OFDMA<br>FBMC<br>GFDMA (GFDMA not using DFT-Spread on transmitting side) |

An example of a criterion as to whether or not a waveform has the feature of a single carrier includes whether or not the transmitting side performs DFT spread or FFT spread. The transmitting apparatus depicted in, for example, FIGS. 3, 12, and 13 performs DFT spread or FFT spread in the time-to-frequency conversion process. Owing to this, a waveform subjected to SC-FDMA, DFT-S-OFDMA, or GFDMA (GFDMA using DFT spread) can be interpreted as a waveform with the feature of the single carrier waveform. On the other hand, a waveform not subjected to DFT spread or FFT spread can be interpreted as a waveform without the feature of the single carrier waveform.

It is desirable that the base station 100 uses a waveform having a common feature as to whether or not a waveform has the feature of a single carrier waveform, to the data signal and the reference signal. For example, the base station 100 may use the waveform with the feature of the single carrier waveform or the waveform without the feature of the single carrier waveform to both the data signal and the reference signal. Needless to say, the base station 100 may use different waveforms with and without the feature of the single carrier waveform to the data signal and the reference signal.

Furthermore, the difference in waveform described above may be regarded as a difference as between a waveform with a feature of an orthogonal waveform and a waveform with a feature of a non-orthogonal waveform. Table 5 below depicts an example of waveforms with the feature of the orthogonal waveform and those with the feature of the non-orthogonal waveform.

TABLE 5

Example of waveforms with feature of orthogonal waveform and waveforms with feature of non-orthogonal waveform

| | |
|---|---|
| Example of waveforms with feature of orthogonal waveform (example of waveforms without feature of non-orthogonal waveform) | SC-FDMA<br>DFT-S-OFDMA<br>OFDMA |
| Example of waveforms with feature of non-orthogonal waveform | Filtered OFDMA<br>UF-OFDMA<br>FBMC<br>GFDMA<br>FTN |

As depicted in Table 5, examples of waveforms with the feature of the orthogonal waveform include those by SC-FDMA, DFT-S-OFDMA, and OFDMA. These can be said as waveforms characterized by not subjected to oversampling and filtering in the transmitted signal process as described above with reference to FIGS. 2 and 3.

On the other hand, as depicted in Table 5, examples of the waveforms with the feature of the non-orthogonal waveform include Filtered OFDMA, UF (Universal Filtered)—OFDMA, FBMC (Filterbank Multicarrier), GFDMA (Generalized Frequency Division Multiple Access), and FTN (Faster-Than-Nyquist). These can be said as waveforms characterized by being subjected to oversampling and filtering in the transmitted signal process as described with reference to FIGS. 1 and 8 to 12.

For example, the base station 100 uses the non-orthogonal waveform for the data signal and the orthogonal waveform for the reference signal. In this case, it is possible to keep high channel estimation since the interference in at least the reference signal is reduced. It is noted that the base station 100 may also use the orthogonal waveform for the data signal.

It is noted that the difference in waveform can be restated as a difference in transmission process or a difference in receiving process. Example of the former difference include a difference in subcarrier spacing, a difference in CP length or presence/absence of CP length, presence/absence of DFT conversion process, presence/absence of a filter bank, presence/absence of a subband filtering process, presence/absence of subcarrier spacing, and presence/absence of a Faster-Than-Nyquist process. Examples of the latter difference include presence/absence of interference canceller setting.

Resource Setting

The base station 100 may make at least any one of the subcarrier spacing or the symbol length different between the data signal and the reference signal. For example, the base station 100 makes at least any one of the subcarrier spacing or the symbol length of the reference signal shorter than that of the data signal. This can reduce overhead related to transmission of the reference signal and improve a data carrying amount per resource, that is, frequency utilization efficiency. Such resource setting will be described later with reference to FIGS. 18 and 19. Alternatively, the base station 100 makes, for example, at least any one of the subcarrier spacing or the symbol length of the reference signal longer than that of the data signal. This can improve channel estimation accuracy. Such resource setting will be described later with reference to FIGS. 20 and 21.

Transmission Power

The base station 100 may make transmission power different between the data signal and the reference signal. For example, the base station 100 sets the transmission power for the reference signal equal to or higher than that of the data signal (that is, data symbol). In other words, the base station 100 sets a power ratio of the reference signal to the data signal to one or equal to or higher than one. This makes it possible to keep high the channel estimation accuracy.

3.4. Deployment of Reference Signals

In a typical communication system, the receiving apparatus performs estimation (channel estimation or the like) of a radio wave propagation path response (Channel Response). For the estimation, the transmitting side transmits, to the receiving side, known signals/sequences (Reference Signals/Sequences, Known Signals/Sequences, Pilot Signals/Sequences, Training Signals/Sequences, or the like) for channel estimation. The known signals/sequences are, for example, DM-RS (Demodulation Reference Signals/Sequences).

In a case of mixture of a plurality of communication parameter sets (for example, subcarrier spacings or symbol lengths) in relation to transmission of the reference signal and the data signal, it is desirable to consider the channel estimation accuracy and a ratio of the reference signal in the resource (overhead of the reference signal). Since the reference signal cannot be used to carry information per se, a smaller reference signal amount is advantageous for the frequency utilization efficiency.

Examples of deployment of reference signals will be described with reference to FIGS. 15 to 21. FIGS. 15 to 21 depicts examples in which the communication parameter sets are variably used for resource blocks.

Figure 15:
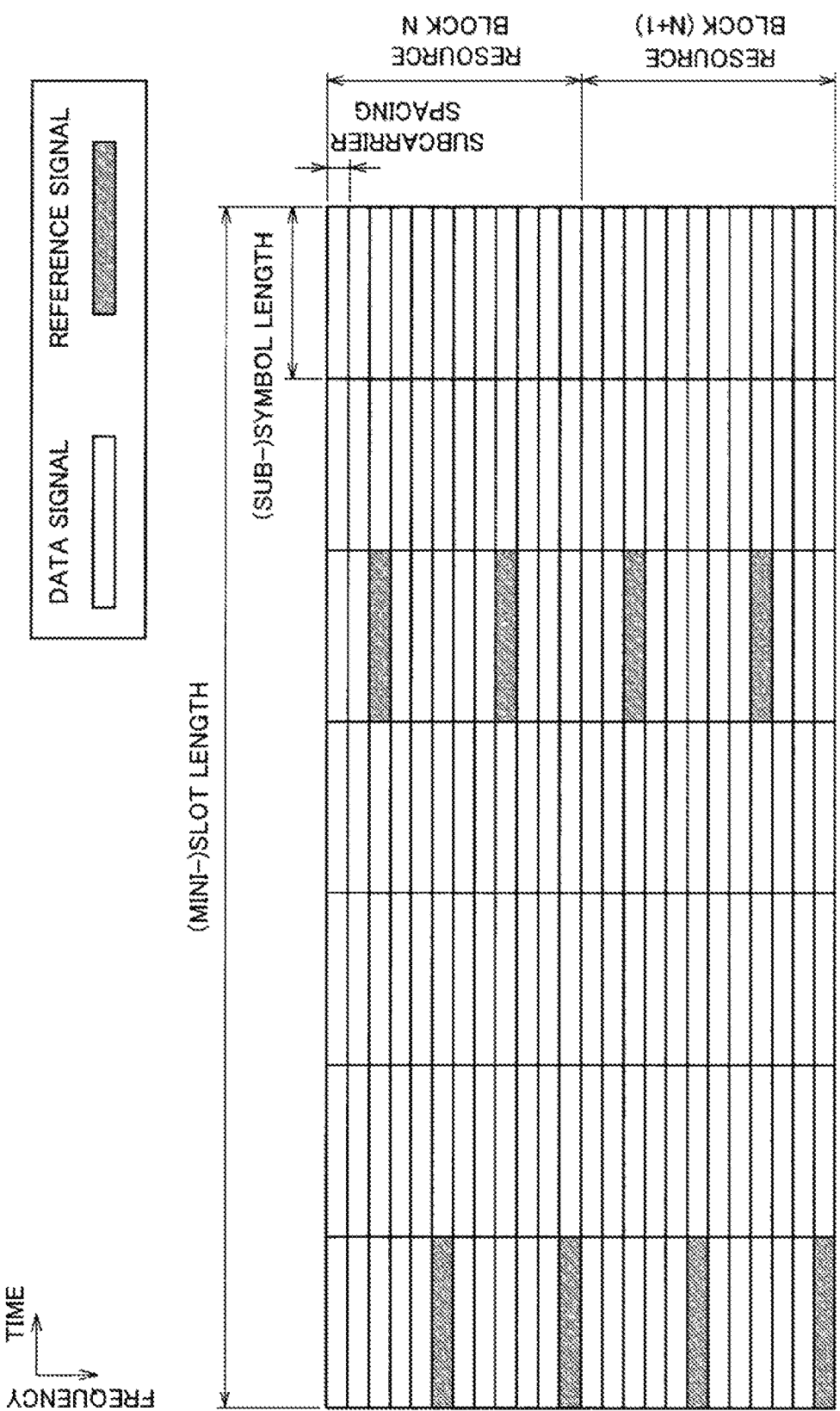
FIG. 15 is a diagram depicting a first deployment example of reference signals according to the present embodiment.

FIG. 15 is a diagram depicting a first deployment example of reference signals according to the present embodiment. In FIG. 15, the same subcarrier spacing and the same symbol length are set to the resource blocks. In FIG. 15, a reference signal is transmitted in a hatched resource and a data signal is transmitted in an unhatched resource. The same thing is true for subsequent drawings. The present resource setting is similar to existing resource setting in the LTE. In this case, the reference signals may be deployed similarly to known deployment in the LTE.

Figure 16:
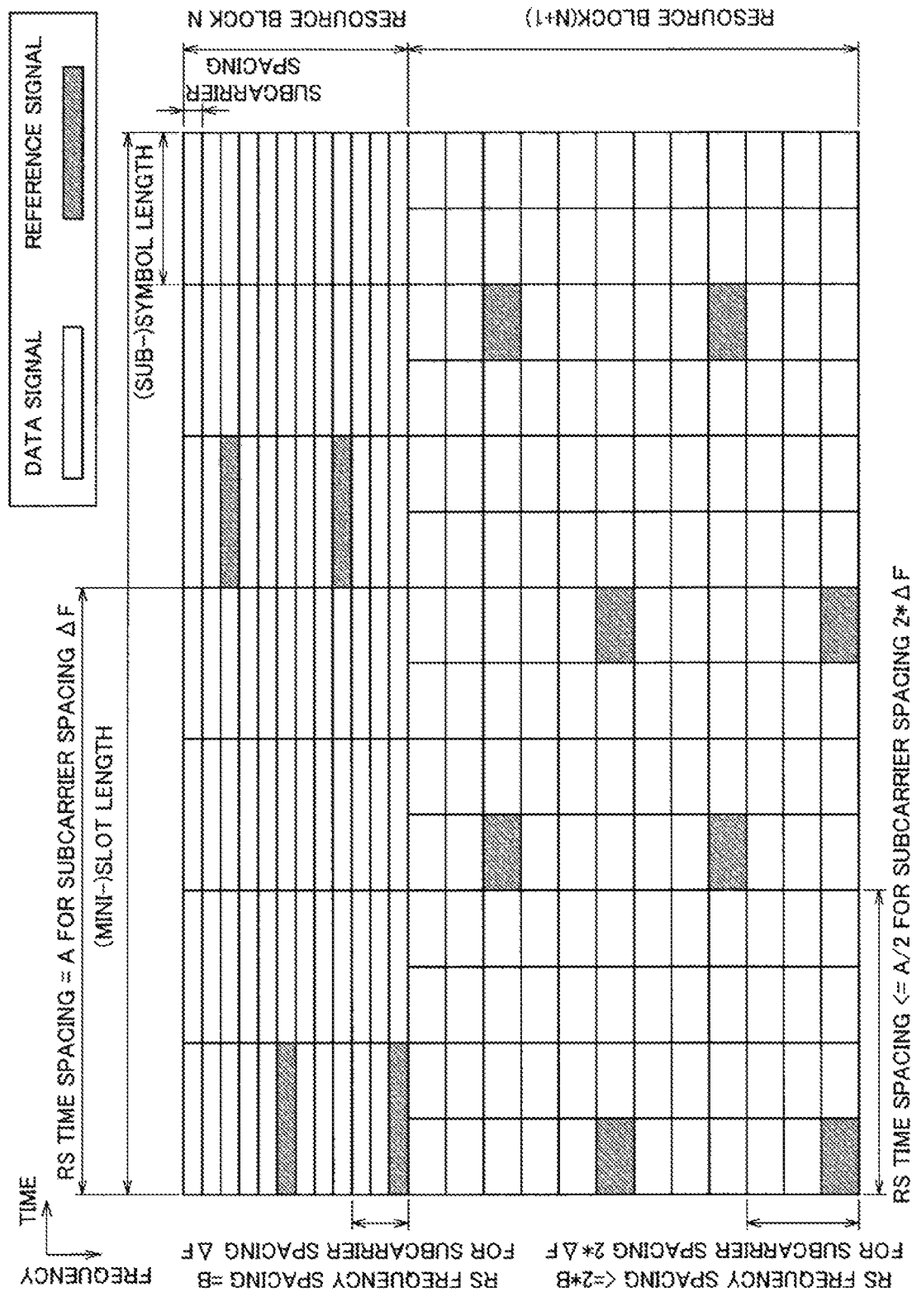
FIG. 16 is a diagram depicting a second deployment example of reference signals according to the present embodiment.

FIG. 16 is a diagram depicting a second deployment example of reference signals according to the present embodiment. In FIG. 16, different subcarrier spacings and different symbol lengths are set to the resource blocks. In this case, as depicted in FIG. 16, it is desirable to deploy reference signals so that a frequency spacing and a time spacing of the reference signals between predetermined resources satisfy predetermined conditions.

The frequency spacing of the reference signals is a minimum spacing between frequency resources in which the reference signals are deployed in a predetermined resource (in FIG. 16, resource including one resource block and one slot (or mini-slot)) within the unit resource (for example, component carrier). The time spacing of the reference signals is a minimum spacing between time resources in which the reference signals are deployed in a predetermined resource within the unit resource.

The predetermined conditions will be described hereinafter.

First, in a first resource and a second resource having different resource setting in the unit resource, it is desirable that a ratio of the frequency spacing of the reference signals deployed in the first resource to the frequency spacing of the reference signals deployed in the second resource is proportional to or substantially proportional to a ratio of the subcarrier spacing in the first resource to the subcarrier spacing in the second resource. For example, in a case of a relationship that the subcarrier spacing in the second resource is k times as large as the subcarrier spacing in the first resource, it is desirable that the frequency spacing of the reference signals deployed in the second resource is k times or k or less times as large as the frequency spacing of the reference signals deployed in the first resource. In the example depicted in FIG. 16, the subcarrier spacing in a resource block n+1 is approximately twice as large as the subcarrier spacing in a resource block n. In addition, the frequency spacing of the reference signal deployed in the resource block n+1 is approximately twice as large as the frequency spacing of the reference signal deployed in the resource block n. Such a deployment condition is also referred to as "first condition."

Second, in the first resource and the second resource having different resource setting in the unit resource, it is desirable that a ratio of the time spacing of the reference signals deployed in the first resource to the time spacing of the reference signals deployed in the second resource is proportional to or substantially proportional to a ratio of the symbol length in the first resource to the symbol length in the second resource. For example, in a case of a relationship that the symbol length in the second resource is 1/k times as large as the symbol length in the first resource, it is desirable that the time spacing of the reference signals deployed in the second resource is 1/k times or 1/k or less times as large as the time spacing of the reference signals deployed in the first resource. In the example depicted in FIG. 16, the symbol length in the resource block n+1 is approximately ½ times as large as the symbol length in the resource block n. In addition, the time spacing of the reference signals deployed in the resource block n+1 is approximately ½ times as large as the time spacing of the reference signal deployed in the resource block n. Such a deployment condition is also referred to as "second condition."

Third, in the first resource and the second resource having different resource setting in the unit resource, it is desirable that a ratio of the time spacing of the reference signals deployed in the first resource to the time spacing of the reference signals deployed in the second resource is inversely proportional to or substantially inversely proportional to a ratio of the subcarrier spacing in the first resource to the subcarrier spacing in the second resource. For example, in the case of the relationship that the subcarrier spacing in the second resource is k times as large as the subcarrier spacing in the first resource, it is desirable that the time spacing of the reference signals deployed in the second resource is 1/k times or 1/k or less times as large as the time spacing of the reference signals deployed in the first resource. In the example depicted in FIG. 16, the subcarrier spacing in the resource block n+1 is approximately twice as large as the subcarrier spacing in the resource block n. In addition, the time spacing of the reference signals deployed in the resource block n+1 is approximately ½ times as large as the time spacing of the reference signal deployed in the resource block n. Such a deployment condition is also referred to as "third condition."

In a case of satisfying the first to third conditions, the overhead of the reference signal per predetermined resource can be kept substantially constant irrespective of the communication parameter sets (for example, subcarrier spacing and symbol length) in the predetermined resource. Therefore, it is possible to commonly calculate a data amount by which data can be carried by a data signal part (for example, Transport Block Size, Number of Transport Blocks, Codeword Size, Number of Codewords, Code Block Size, or Number of Code Blocks per predetermined resource).

Figure 17:
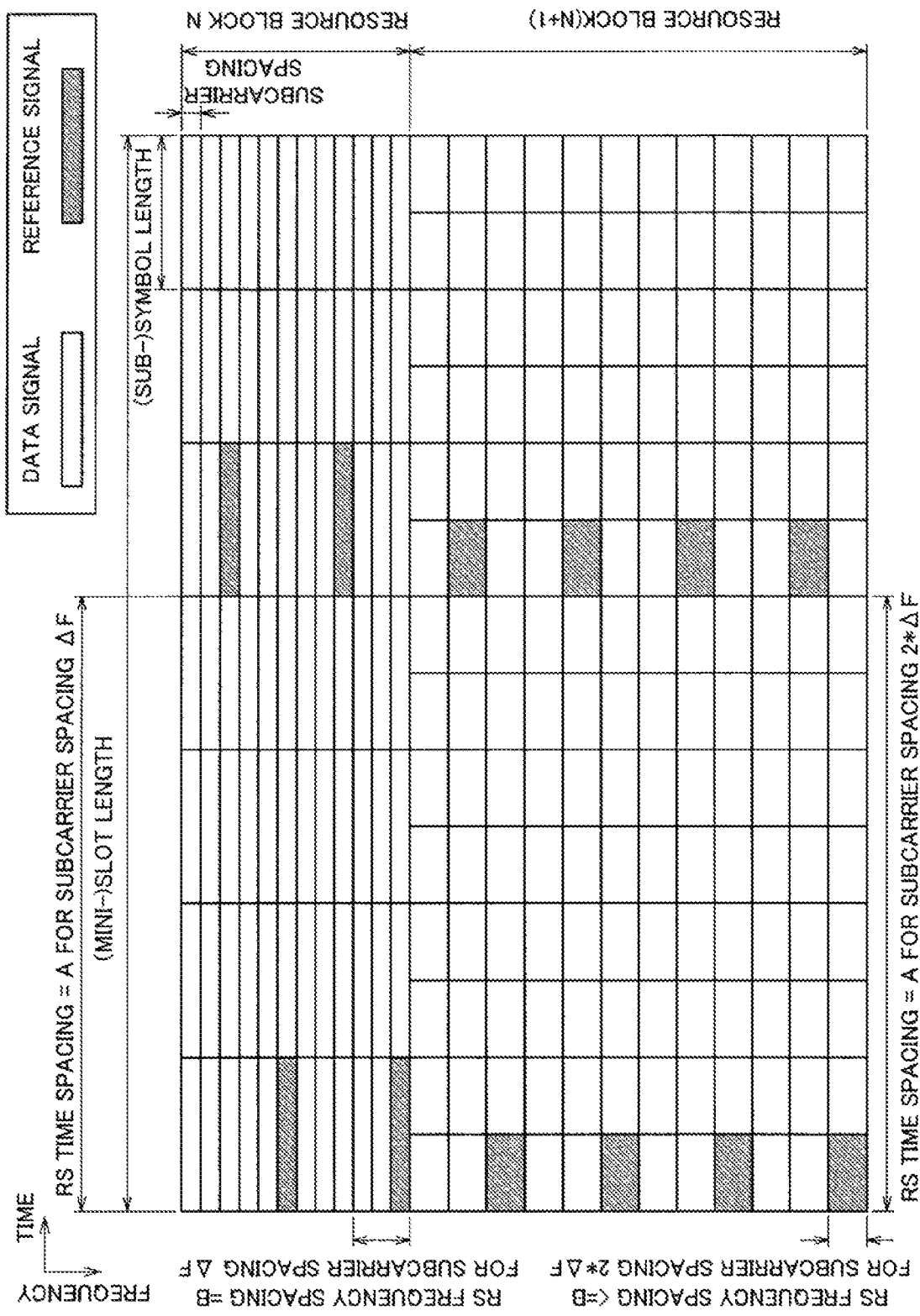
FIG. 17 is a diagram depicting a third deployment example of reference signals according to the present embodiment.

Furthermore, as depicted in FIG. 17, the reference signals may be deployed so that the frequency spacing and the time spacing of the reference signals between the predetermined resources satisfy a fourth condition.

FIG. 17 is a diagram depicting a third deployment example of reference signals according to the present embodiment. In FIG. 17, different subcarrier spacings and different symbol length are set to the resource blocks. In FIG. 17, in the first resource and the second resource having different resource setting in the unit resource, the frequency spacing and the time spacing of the reference signals deployed in the first resource are either equal to or substantially equal to the frequency spacing and the time spacing of the reference signals deployed in the second resource. More simply, the frequency spacing and the time spacing of the reference signals are set substantially constant irrespective of the subcarrier spacing and symbol length. Here, an indication that the frequency spacings of the reference signals are equal or substantially equal refers to an indication that the frequency spacings of the reference signals are equal or equal to or smaller in a case of a relationship that the subcarrier spacing in the second resource is k (k=2 in FIG. 17) times as large as the subcarrier spacing in the first resource. In addition, an indication that the time spacings of the reference signals are equal or substantially equal refers to an indication that the time spacings of the reference signals are equal or equal to or smaller in a case of a relationship that the symbol length in the second resource is 1/k (k=2 in FIG. 17) times as large as the symbol length in the first resource. Such a deployment condition is also referred to as "fourth condition."

In a case of satisfying the fourth condition, it is possible to keep constant estimation accuracy for channel estimation irrespective of the subcarrier spacing and the symbol length. In other words, even in a case of changing the subcarrier spacing in a frequency-selective fading channel, making substantially constant the frequency spacing of the reference signals enables the receiving apparatus to highly accurately estimate frequency-selective characteristics. Contrarily, in a case in which the frequency spacing of the reference signals increases, it is likely to be difficult to follow up the frequency-selectivity.

Figure 18:
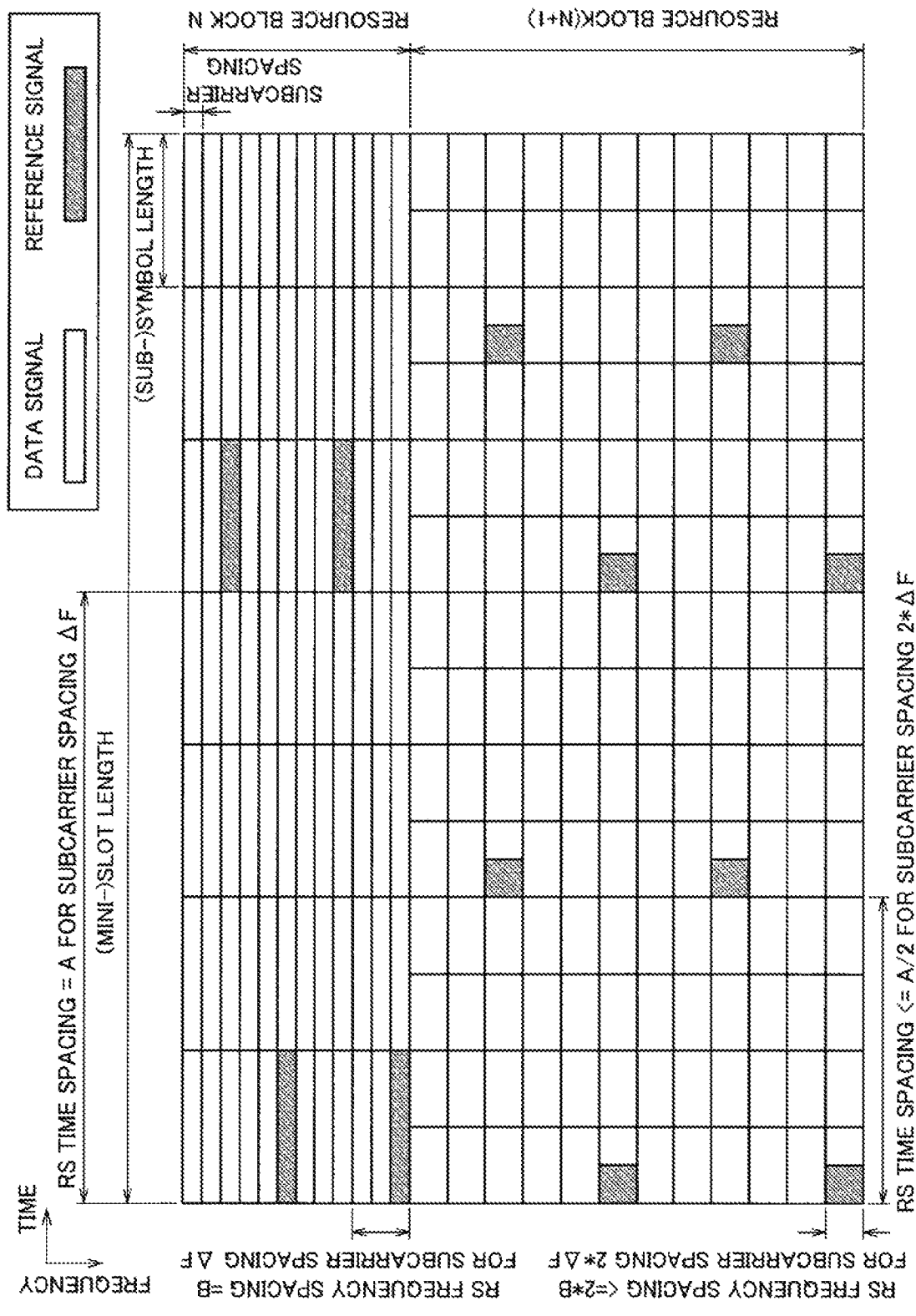
FIG. 18 is a diagram depicting a fourth deployment example of reference signals according to the present embodiment.

FIG. 18 is a diagram depicting a fourth deployment example of reference signals according to the present embodiment. FIG. 18 depicts the example of changing the symbol length of the reference signals from the symbol length of the data signals in each resource block in a case of changing the subcarrier spacing and the symbol length of the data signals between the resource blocks. In this case, it is advantageously possible to reduce the overhead of the reference signal and to improve effective frequency utilization efficiency. Furthermore, according to FIG. 18, the first, second, and third conditions are satisfied; thus, it is possible to commonly calculate the data amount described above.

Figure 19:
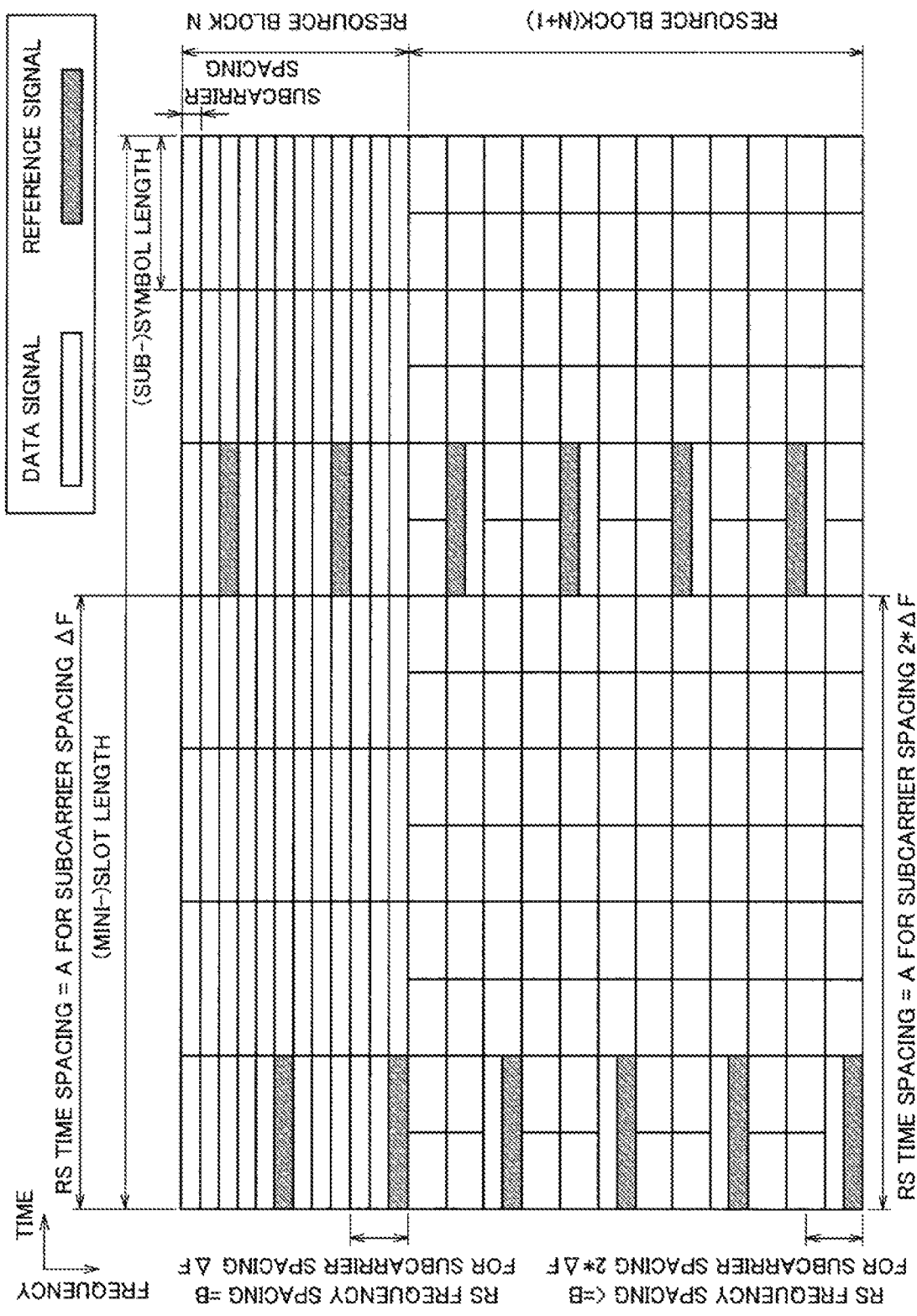
FIG. 19 is a diagram depicting a fifth deployment example of reference signals according to the present embodiment.

FIG. 19 is a diagram depicting a fifth deployment example of reference signals according to the present embodiment. FIG. 19 depicts the example of changing the subcarrier spacing of the reference signals from the subcarrier spacing of the data signals in each resource block in a case of changing the subcarrier spacing and the symbol length of the data signals between the resource blocks. In this case, it is advantageously possible to reduce the overhead of the reference signal and to improve the effective frequency utilization efficiency. Furthermore, according to FIG. 19, the fourth condition is satisfied; thus, it is possible to highly accurately estimate frequency-selective characteristics.

Figure 20:
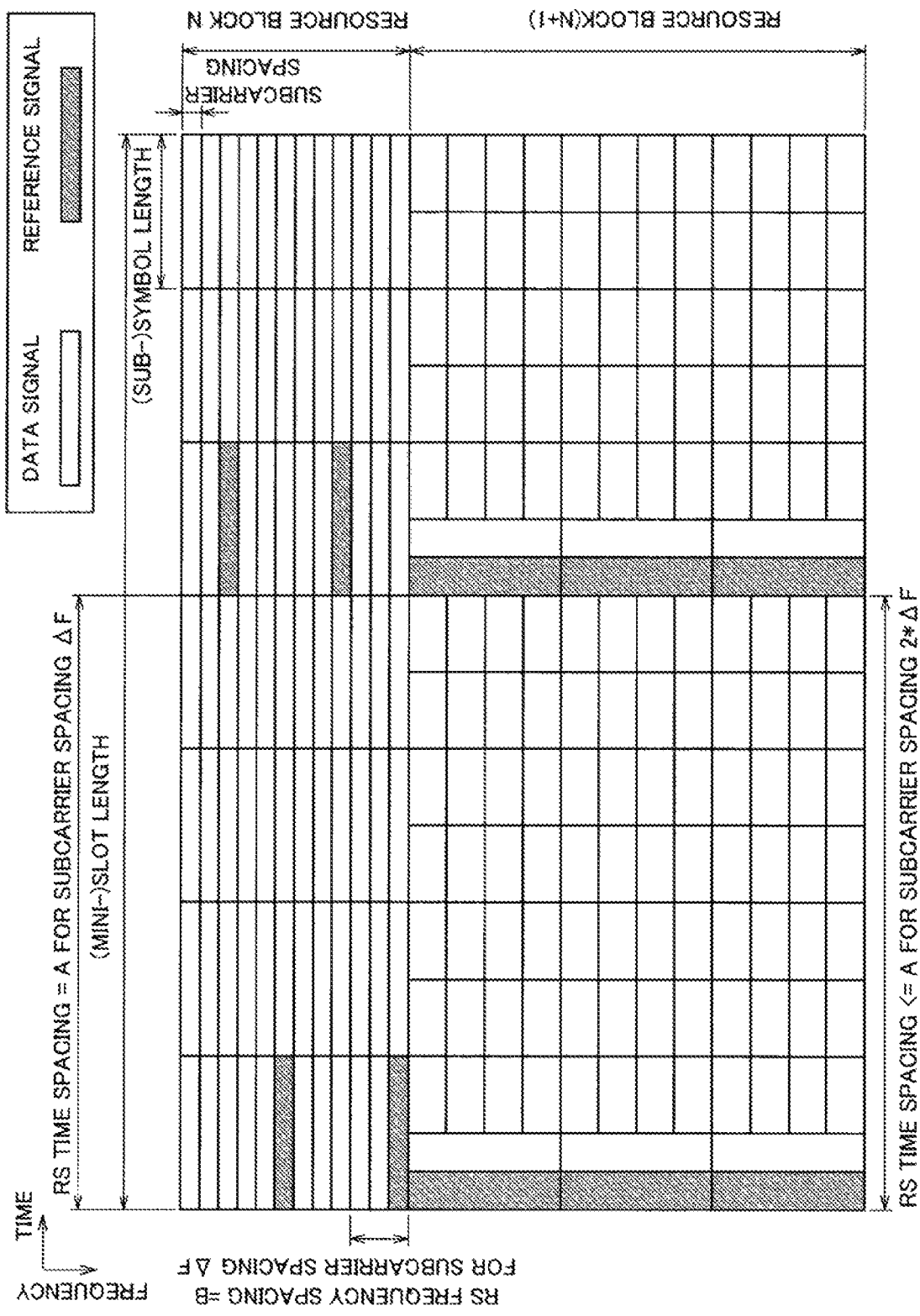
FIG. 20 is a diagram depicting a sixth deployment example of reference signals according to the present embodiment.

FIG. 20 is a diagram depicting a sixth deployment example of reference signals according to the present embodiment. FIG. 20 depicts the example of enhancing a density of the reference signals in a frequency direction in a case of changing the subcarrier spacing and the symbol length of the resources between the resource blocks. As depicted in FIG. 20, particularly in a case of changing the subcarrier spacing and the symbol length in such a manner as to shorten the symbol length of the data signals (that is, to enlarge the subcarrier spacing), it is considered that there is a requirement to reduce receiving process time while maintaining the channel estimation accuracy. In that case, increasing the density in the frequency direction while concentrating the reference signal onto a predetermined time resource makes it possible to meet such a requirement.

Figure 21:
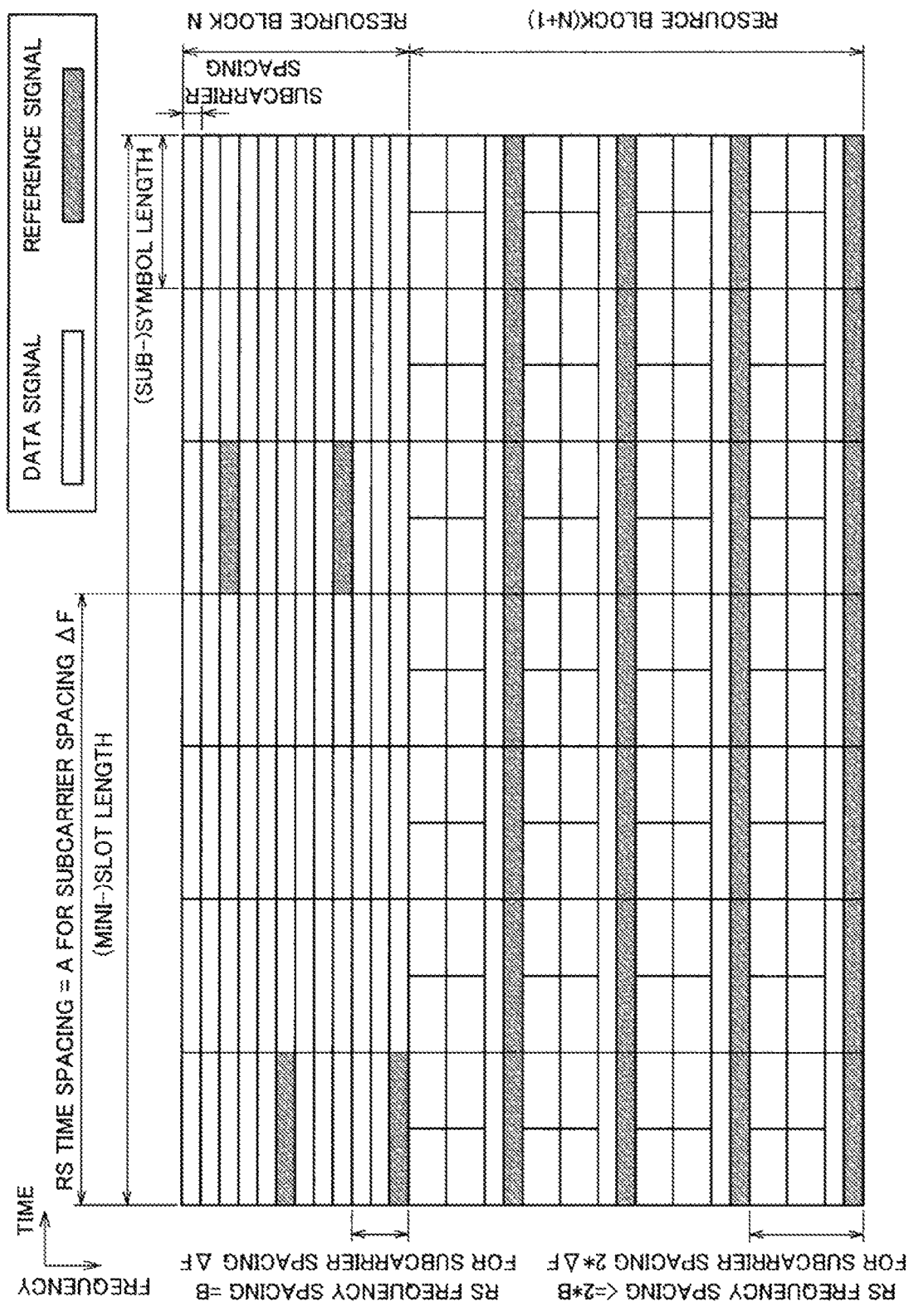
FIG. 21 is a diagram depicting a seventh deployment example of reference signals according to the present embodiment.

FIG. 21 is a diagram depicting a seventh deployment example of reference signals according to the present embodiment. FIG. 21 depicts the example of increasing a density of the reference signals in a time direction in the case of changing the subcarrier spacing and the symbol length of the resources between the resource blocks. As depicted in FIG. 21, particularly in a case of changing the subcarrier spacing and the symbol length in such a manner as to enlarge the subcarrier spacing of the data signals (that is, shorten the symbol length), there is a concern that there is a growing influence of deterioration due to accuracy of an RF circuit on frequency synchronization, phase noise, and the like. To address such a concern, increasing the density of the reference signals in the time direction makes it possible to track unevenness of the accuracy of the RF circuit.

Examples of deployment of reference signals have been described so far.

Now, in the case of the deployments depicted in FIGS. 18 to 21, part of the data signals within a predetermined resource have a different subcarrier spacing or a symbol length from that of the other data signals within the same predetermined resource due to an influence of the change in the subcarrier spacing or the symbol length of the reference signals. It is thereby possible to make effective use of the resources within the predetermined resource for the data signals. It is noted that such data signals are desirably adjacent to the reference signals in terms of time or frequency. Alternatively, this resource part may be handled as a null (no-signal) component. In that case, it is possible to simplify transmission and receiving processes despite a possible reduction in the effective frequency utilization efficiency.

Deployment of reference signals is controlled on the basis of the resource setting within the unit resource, for example, the setting of the subcarrier spacing and the symbol length in each resource block. This can be interpreted that the deployment of reference signals is controlled by waveforms. For example, the base station 100 may control the deployment of reference signals depending on whether to apply the OFDM or DFT-S-OFDM to the resource blocks.

3.5 Notification of Setting Information

The base station 100 notifies each terminal apparatus 200 of the setting information for use in the transmission process. The terminal apparatus 200 performs a receiving process on the basis of the notified setting information.

The setting information may contain information indicating communication parameters related to resources. For example, the setting information contains the subcarrier spacing, the number of subcarriers, the symbol length, and the number of symbols in each predetermined resource in the unit resource.

The setting information may contain information indicating the deployment of reference signals. Notifying the terminal apparatus 200 of the information indicating the deployment of reference signals enables the terminal apparatus 200 to recognize the deployment of reference signals and appropriately perform the received signal process. The information indicating the deployment of reference signals is information indicating a resource where each reference signal is to be deployed and possibly contain information indicating the subcarrier spacing and the symbol length of the resource.

The setting information may contain information indicating communication parameter sets used for each of the reference signal and the data signal. For example, the setting information contains information indicating the precoding factor, the filter, the filter factor, the oversampling factor, the waveform, the resource setting, and the transmission power (for example, a power ratio of the reference signal to the data signal) for use in each of the reference signal and the data signal. Notifying the terminal apparatus 200 of the information indicating the communication parameter sets applied to the reference signal and the data signal enables the terminal apparatus 200 to appropriately perform the receiving process for receiving the reference signal and the data signal.

The base station 100 can change over the resource setting, the deployment of reference signals, or the communication parameter sets applied to the reference signal or the data signal as appropriate. The base station 100 performs such changeover in response to, for example, the number of terminal apparatuses 200 within a cell, a traffic amount, or an interference, thereby making it possible to maintain communication efficiency. The base station 100 may notify each terminal apparatus 200 of the setting information either periodically or non-periodically. For example, the base station 100 notifies each terminal apparatus 200 of the setting information non-periodically in response to a change in the resource setting, the deployment of reference signals, or the communication parameter sets applied to each reference signal or each data signal. It is, however, desirable to notify the terminal apparatus 200 of the setting information before transmission and reception of the data signal.

The terminal apparatus 200 may be notified of the setting information and the setting information may be set by system information (SIB (System Information Block) or MIB (Master Information Block)) or Radio Resource Configuration (RRC) signaling. In this case, the setting is made either statically or quasi-statically; thus, a setting range is an entire unit resource or resources in a predetermined range.

The terminal apparatus 200 may be notified of the setting information and the setting information may be set by a control channel or control information (for example, DCI (Downlink Control Information)). In this case, the setting is made dynamically; thus, the setting range is per allocation of scheduling.

The resource setting, the deployment of reference signals, the communication parameter sets applied to the reference signal, and the communication parameter sets applied to the data signals can be also controlled with respect to terminal-to-terminal communication (D2D: Device-to-Device Communication, ProSe: Proximity Services). It is, therefore, desirable to share the setting information described above between the transmitting apparatus and the receiving apparatus. Thus, the base station 100 may notify each terminal apparatus 200 holding terminal-to-terminal communication of the setting information. In this case, it is desirable that the setting information is notified and set either statically or quasi-statically via the system information or the RRC signaling. On the other hand, the terminal apparatuses 200 holding sidelink communication may transmit or receive the setting information to and from each other. In this case, the terminal apparatus 200 transmitting the data signal notifies the terminal apparatus 200 receiving the data signal of the setting information. The setting information can be notified and be set via, for example, a sidelink control channel or control information (for example, SCI (Sidelink Control Information)).

3.6. Process Flow

An example of a flow of a communication process executed by the system 1 according to the present embodiment will be described with reference to FIGS. 22 to 24.

Figure 22:
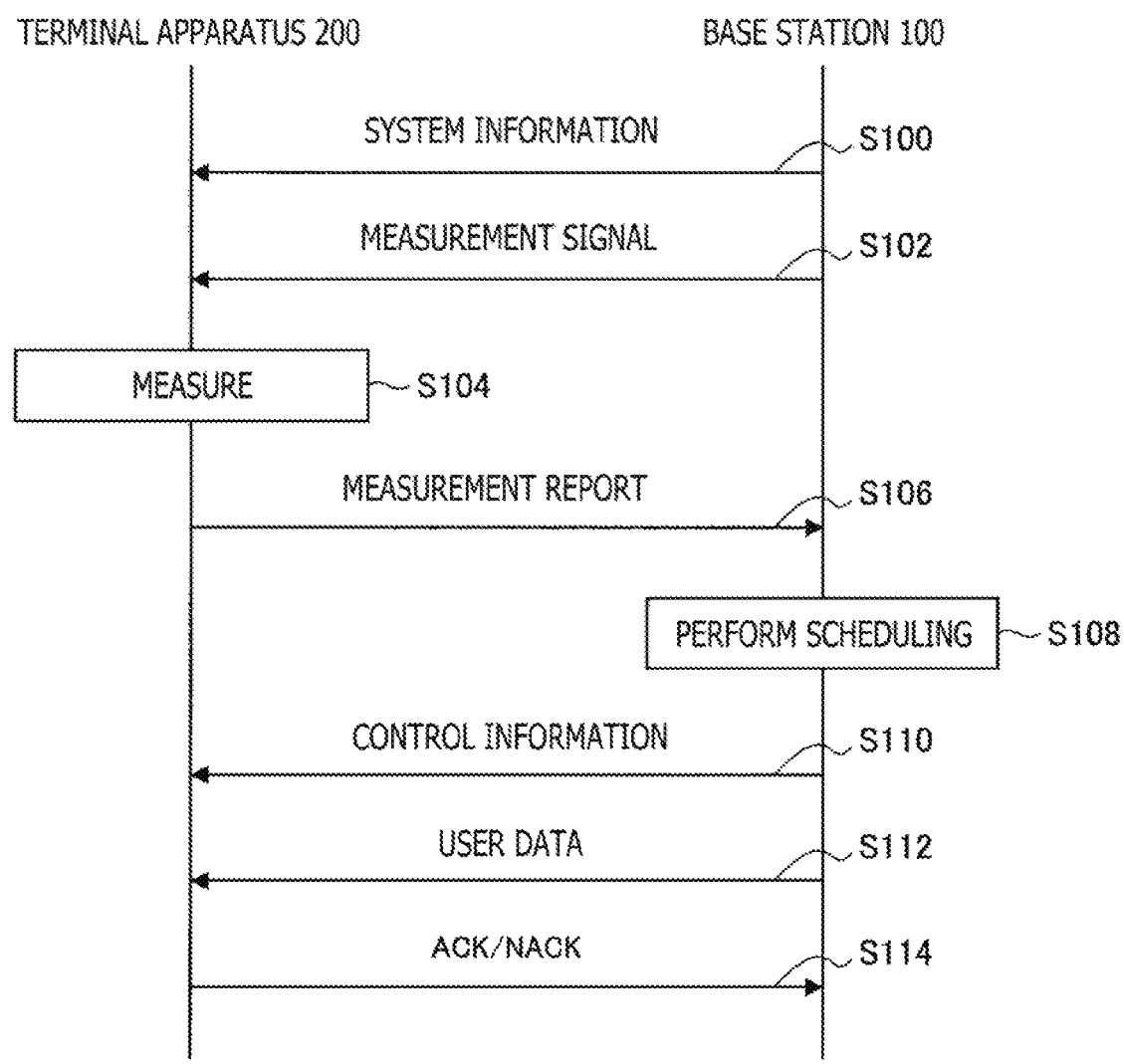
FIG. 22 is a sequence diagram depicting an example of a flow of a communication process executed in a system according to the present embodiment.

With reference first to FIG. 22, an example of a flow of a process related to downlink transmission of a data signal will be described.

FIG. 22 is a sequence diagram depicting an example of a flow of a communication process executed in the system 1 according to the present embodiment. The base station 100 and one terminal apparatus 200 are engaged with the present sequence. As depicted in FIG. 22, first, the base station 100 transmits system information to the terminal apparatus 200 (Step S100). The system information possibly contains part of or all of the setting information described above. The base station 100 transmits the system information to the terminal apparatus 200 via, for example, a PBCH (Physical Broadcast Channel) or a PDSCH (Physical Downlink Shared Channel). Next, the base station 100 transmits a measurement signal (for example, a CSI-RS (Channel State Information Reference Signal)) to the terminal apparatus 200 (Step S102). Next, the terminal apparatus 200 performs measurement on the basis of the measurement signal transmitted from the base station 100 (Step S104). Next, the terminal apparatus 200 transmits a measurement report containing information indicating a measurement result to the base station 100 (Step S106). The terminal apparatus 200 transmits the measurement report to the base station 100 via, for example, a PUCCH (Physical Uplink Control Channel) or a PUSCH (Physical Uplink Shared Channel). Next, the base station 100 performs scheduling on the basis of the measurement report (Step S108). This scheduling includes at least scheduling related to downlink transmission of the data signal. Next, the base station 100 transmits control information to the terminal apparatus 200 (Step S110). The control information possibly contains part of or all of the setting information described above in addition to information indicating a scheduling result. The base station 100 transmits the control information to the terminal apparatus 200 via, for example, a PDCCH (Physical Downlink Control Channel) or a PDSCH (Physical Downlink Shared Channel). Next, the base station 100 transmits user data to the terminal apparatus 200 on the basis of the setting information and the scheduling result (Step S112). More specifically, the base station 100 generates a data signal and a reference signal (DM-RS) by applying different communication parameter sets to the data signal and the reference signal on the basis of the setting information, and transmits the data signal and the reference signal to the terminal apparatus 200. The base station 100 transmits the data signal via, for example, the PDSCH or a PMCH (Physical Multicast Channel). The terminal apparatus 200 then receives the user data on the basis of the setting information and transmits a receiving response (ACK/NACK) to the base station 100 (Step S114). The terminal apparatus 200 transmits the receiving response to the base station 100 via, for example, the PUCCH or the PUSCH.

Figure 23:
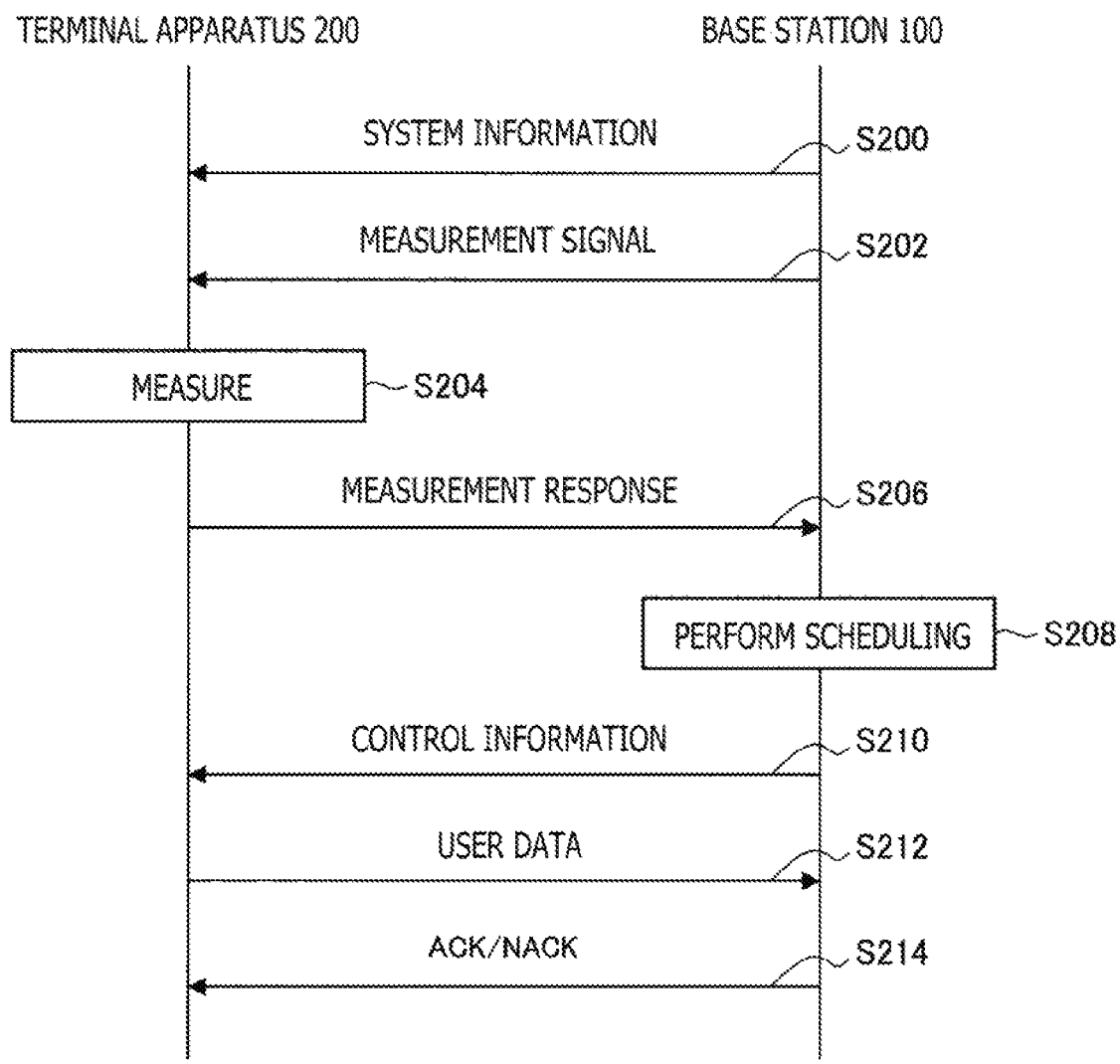
FIG. 23 is a sequence diagram depicting an example of a flow of a communication process executed in the system according to the present embodiment.

With reference next to FIG. 23, an example of a flow of a process related to uplink transmission of a data signal will be described.

FIG. 23 is a sequence diagram depicting an example of a flow of a communication process executed in the system 1 according to the present embodiment. The base station 100 and one terminal apparatus 200 are engaged with the present sequence. As depicted in FIG. 23, first, the base station 100 transmits system information to the terminal apparatus 200 (Step S200). The system information possibly contains part of or all of the setting information described above. The base station 100 transmits the system information to the terminal apparatus 200 via, for example, the PBCH or PDSCH. Next, the base station 100 transmits a measurement signal to the terminal apparatus 200 (Step S202). Next, the terminal apparatus 200 performs measurement on the basis of the measurement signal transmitted from the base station 100 (Step S204). Next, the terminal apparatus 200 transmits a measurement report containing information indicating a measurement result to the base station 100 (Step S206). The terminal apparatus 200 transmits the measurement report to the base station 100 via, for example, the PUCCH or the PUSCH. Next, the base station 100 performs scheduling on the basis of the measurement report (Step S208). This scheduling includes at least scheduling related to uplink transmission of the data signal. Next, the base station 100 transmits control information to the terminal apparatus 200 (Step S210). The control information possibly contains part of or all of the setting information described above in addition to information indicating a scheduling result. The base station 100 transmits the control information to the terminal apparatus 200 via, for example, the PDCCH or the PDSCH. Next, the terminal apparatus 200 transmits user data to the base station 100 on the basis of the setting information and the scheduling result (Step S212). More specifically, the base station 100 generates a data signal and a reference signal by applying different communication parameter sets to the data signal and the reference signal on the basis of the setting information, and transmits the data signal and the reference signal to the terminal apparatus 200. The data signal is transmitted via, for example, the PUSCH.

The base station 100 then receives the user data on the basis of the setting information and transmits a receiving response (ACK/NACK) to the terminal apparatus 200 (Step S214). The base station 100 transmits the receiving response to the terminal apparatus 200 via, for example, the PDCCH.

Figure 24:
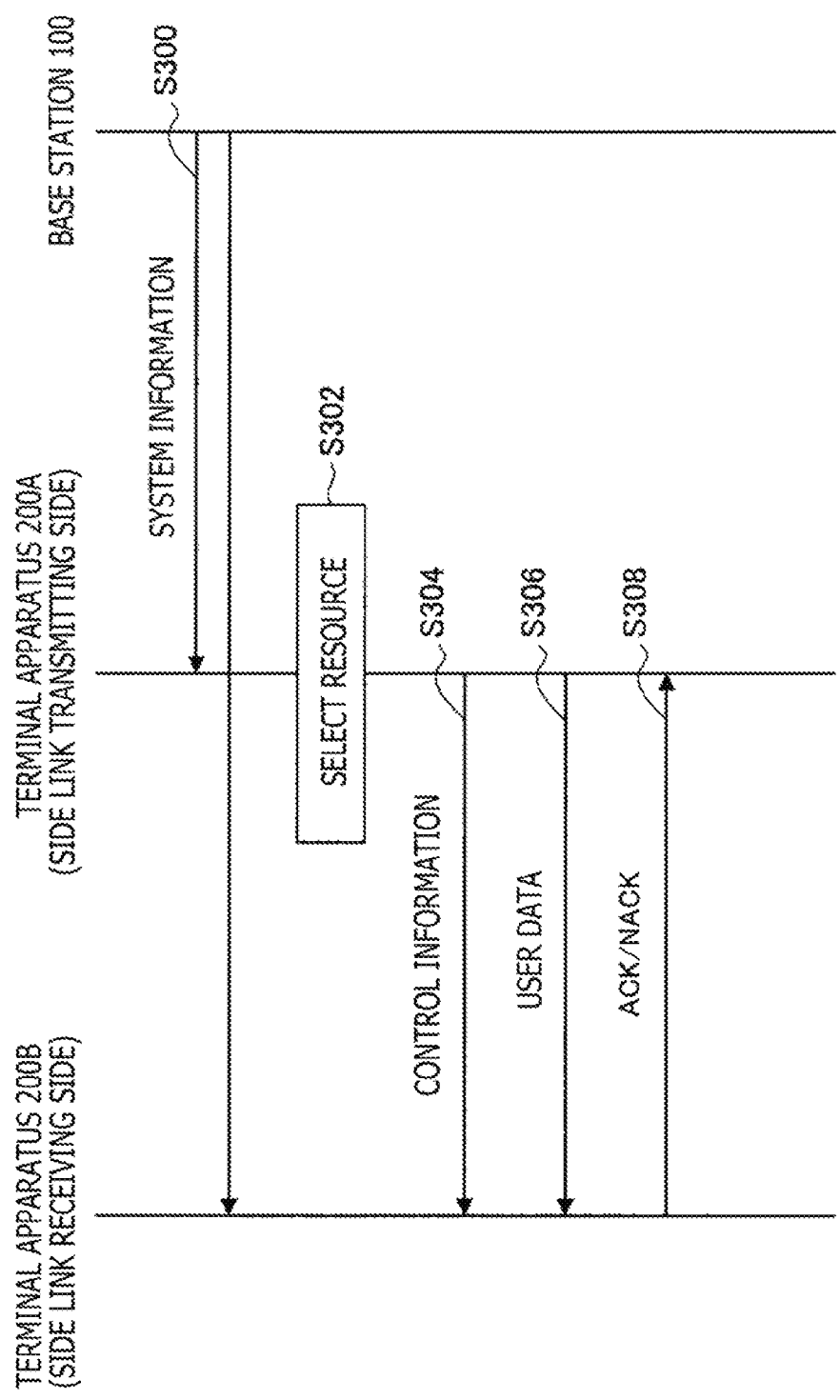
FIG. 24 is a sequence diagram depicting an example of a flow of a communication process executed in the system according to the present embodiment.

With reference next to FIG. 24, an example of a flow of a process related to sidelink transmission of a data signal will be described.

FIG. 24 is a sequence diagram depicting an example of a flow of a communication process executed in the system 1 according to the present embodiment. The base station 100 and terminal apparatuses 200A and 200B are engaged with the present sequence. The terminal apparatus 200A performs sidelink transmission, while the terminal apparatus 200B performs sidelink receiving. As depicted in FIG. 24, first, the base station 100 transmits system information to the terminal apparatuses 200A and 200B (Step S300). The system information possibly contains part of or all of the setting information described above. In addition, the system information contains information indicating allocation of a resource pool available in sidelink communication. The base station 100 transmits the system information to the terminal apparatuses 200A and 200B via, for example, the PBCH or PDSCH. Next, the terminal apparatus 200A selects a resource for use in the sidelink communication from the resource pool allocated thereto (Step S302). Next, the terminal apparatus 200A transmits control information to the terminal apparatus 200B (Step S304). The control information possibly contains information indicating a resource selection result and part of or all of the setting information described above. The terminal apparatus 200A transmits the control information to the terminal apparatus 200B via, for example, a PSCCH (Physical Sidelink Control Channel) or a PSSCH (Physical Sidelink Shared Channel). Next, the terminal apparatus 200A transmits user data to the terminal apparatus 200B on the basis of the setting information and the resource selection result (Step S306). More specifically, the terminal apparatus 200A generates a data signal and a reference signal by applying different communication parameter sets to the data signal and the reference signal on the basis of the setting information, and transmits the data signal and the reference signal to the terminal apparatus 200B. The data signal is transmitted via, for example, the PSSCH. The terminal apparatus 200B then receives the user data on the basis of the setting information and transmits a receiving response (ACK/NACK) to the terminal apparatus 200A (Step S308). The receiving response is transmitted via, for example, PSCCH or PSSCH.

4. SIMULATION RESULT

Advantages of the present technique was evaluated by a setting computing machine simulation. Simulation setting is as depicted in Table 6 below.

TABLE 6

| Simulation setting | | | |
|---|---|---|---|
| | Comparison 1 (conventional OFDM) | Comparison 2 (conventional GFDM) | Present technique |
| Digital modulation | QPSK, 16QAM, 64QAM | | |
| Demodulation scheme | MMSE | | |
| Error correction coding | Turbo Coding | | |
| Code Rate | 1/3 | | |
| Decoding algorithm | Log-MAP | | |
| Number of RBs | 56 | | |
| Number of subcarriers in 1 RB | 12 | 2 | 4 |
| Number of subsymbols in 1 RB | 1 | 6 | 1 (reference signal), 5 (data signal) |
| Upsampling rate | 1 | 2 | 1 (reference signal), 2 (data signal) |
| Subcarrier filtering | N/A | Raised cosine filter | |
| Roll-off factor for data symbols | N/A | | 0.1, 0.9 |
| Roll-off factor for reference signals | N/A | Same as data symbols | 0.1 |
| Reference signal pattern | First deployment example | Second deploying example | Fifth deployment example |
| Subcarrier spacing [MHz] | 15 | 90 | 15 (reference signal), 75 (data signal) |
| Sampling frequency [MHz] | 10 | | |
| Cannel mode | GSM-TU | | |

It is noted that Comparison 1 in the present simulation is a communication method using the OFDM for waveforms. Comparison 2 in the present simulation is a communication method using the GFDM for waveforms and using the same communication parameter set for the data signal and the reference signal. The present technique in the present simulation is a communication method using the GFDM for waveforms and using different communication parameter sets between the data signal and the reference signal. Specifically, in the present technique, the number of subsymbols, the sampling rate, and the subcarrier spacing vary between the reference signal and the data signal in one resource block.

Figure 25:
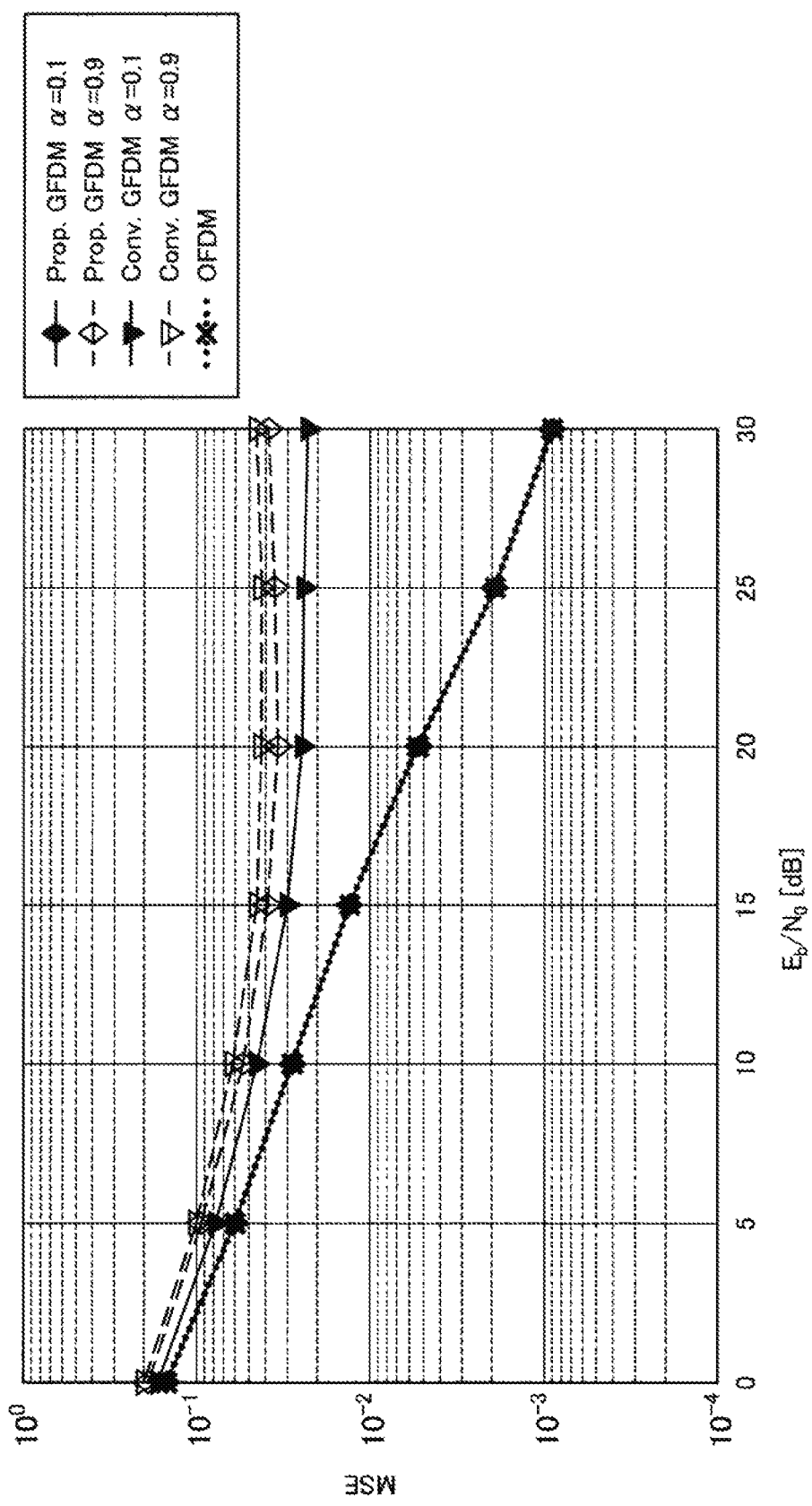
FIG. 25 is a diagram depicting a simulation result.

FIG. 25 is a diagram depicting a simulation result. Specifically, FIG. 25 depicts channel estimation error characteristics in a case of changing the roll-off rate of filtering. In FIG. 25, a horizontal axis indicates an SN ratio and a vertical axis indicates an MSE (Mean Square Error). In FIG. 25, "OFDM" corresponds to Comparison 1. In FIG. 25, "Conv. GFDM" corresponds to Comparison 2 and simulation results in a case in which the roll-off rate of filtering is α=0.1 or α=0.9 are depicted. In FIG. 25, "Prop. GFDM" corresponds to the present technique and simulation results in a case in which the roll-off rate of filtering is α=0.1 or α=0.9 are depicted.

It is understood from FIG. 25 that the present technique works effectively in the case in which the roll-off rate is 0.1 (that is, the roll-off rate is relatively low). While an error floor of a channel estimation error occurs even in a low noise environment (high S/N ratio environment) in Comparison 2, an MSE characteristic equivalent to Comparison 1, that is, equivalent to a case of no interference between subcarriers is achieved in the present technique. Furthermore, in the present technique, a lower MSE characteristic than that of Comparison 2 is achieved even in a case in which the roll-off rate is 0.9 (that is, relatively high). However, in the case of the roll-off rate of 0.9, an error floor of the MSE characteristic occurs similarly to Comparison 2. To avoid such an error floor in the present technique, it is desirable to reduce the roll-off rate down to a permissible range.

Figure 26:
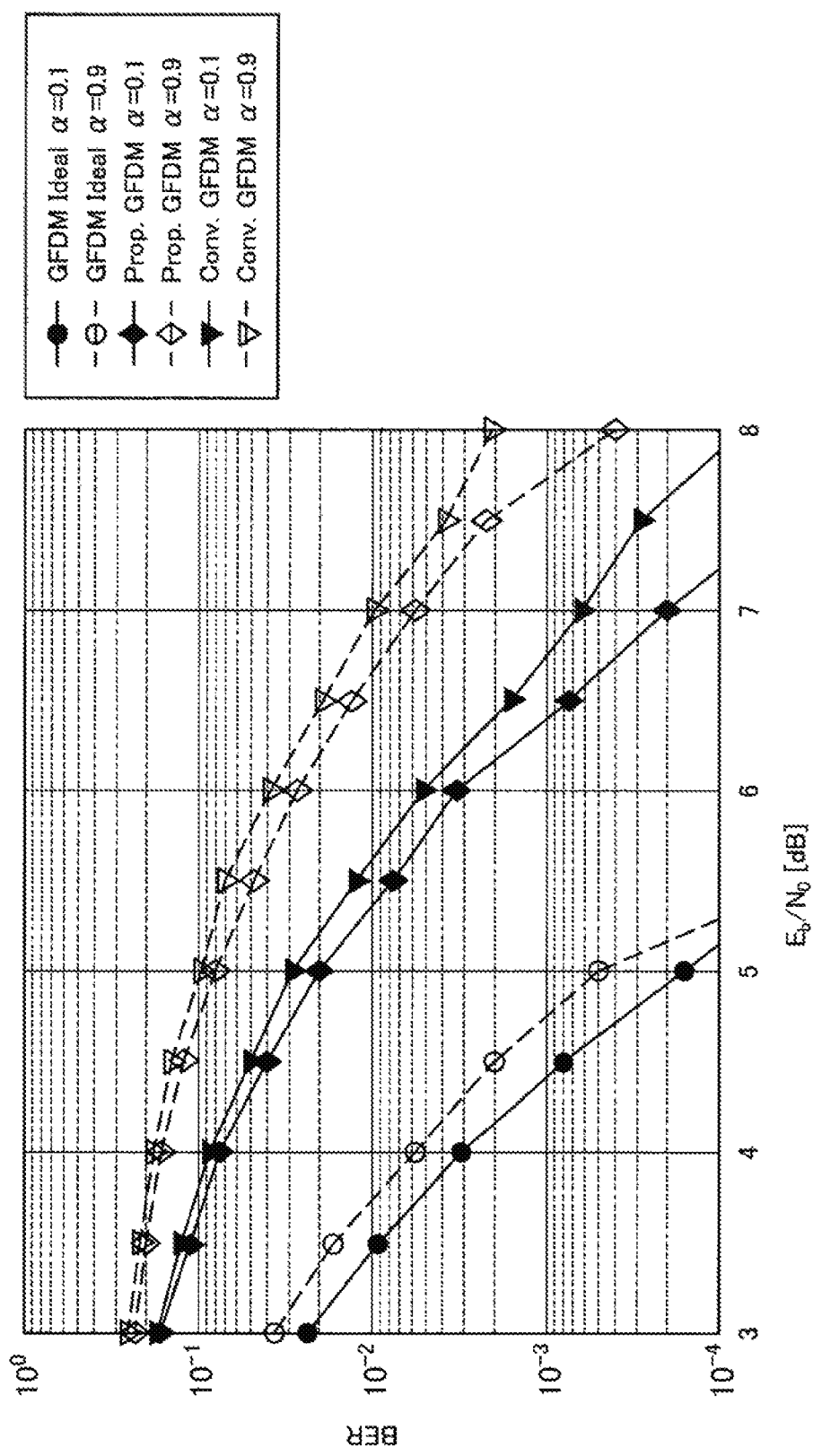
FIG. 26 is a diagram depicting a simulation result.
Figure 27:
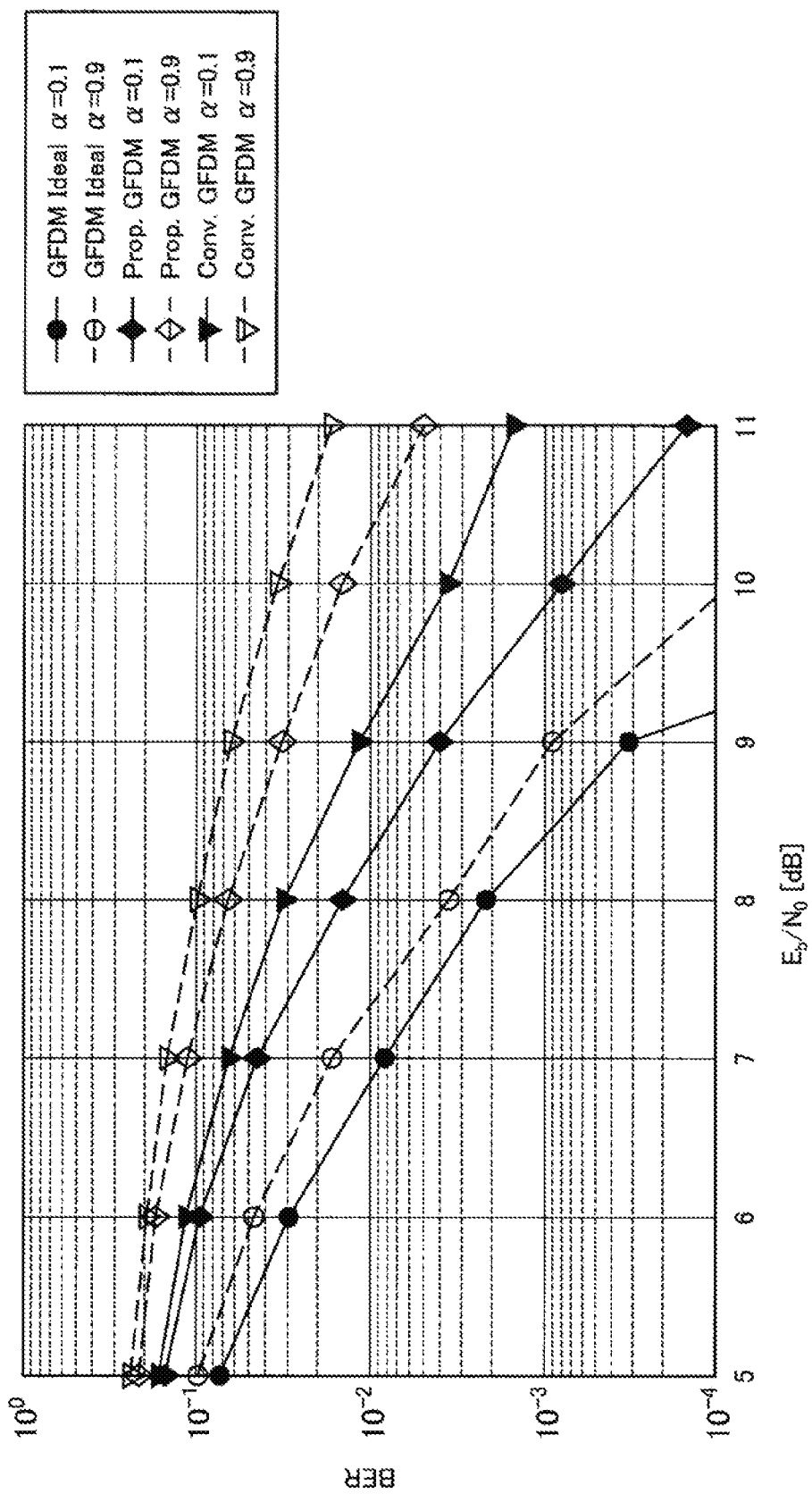
FIG. 27 is a diagram depicting a simulation result.
Figure 28:
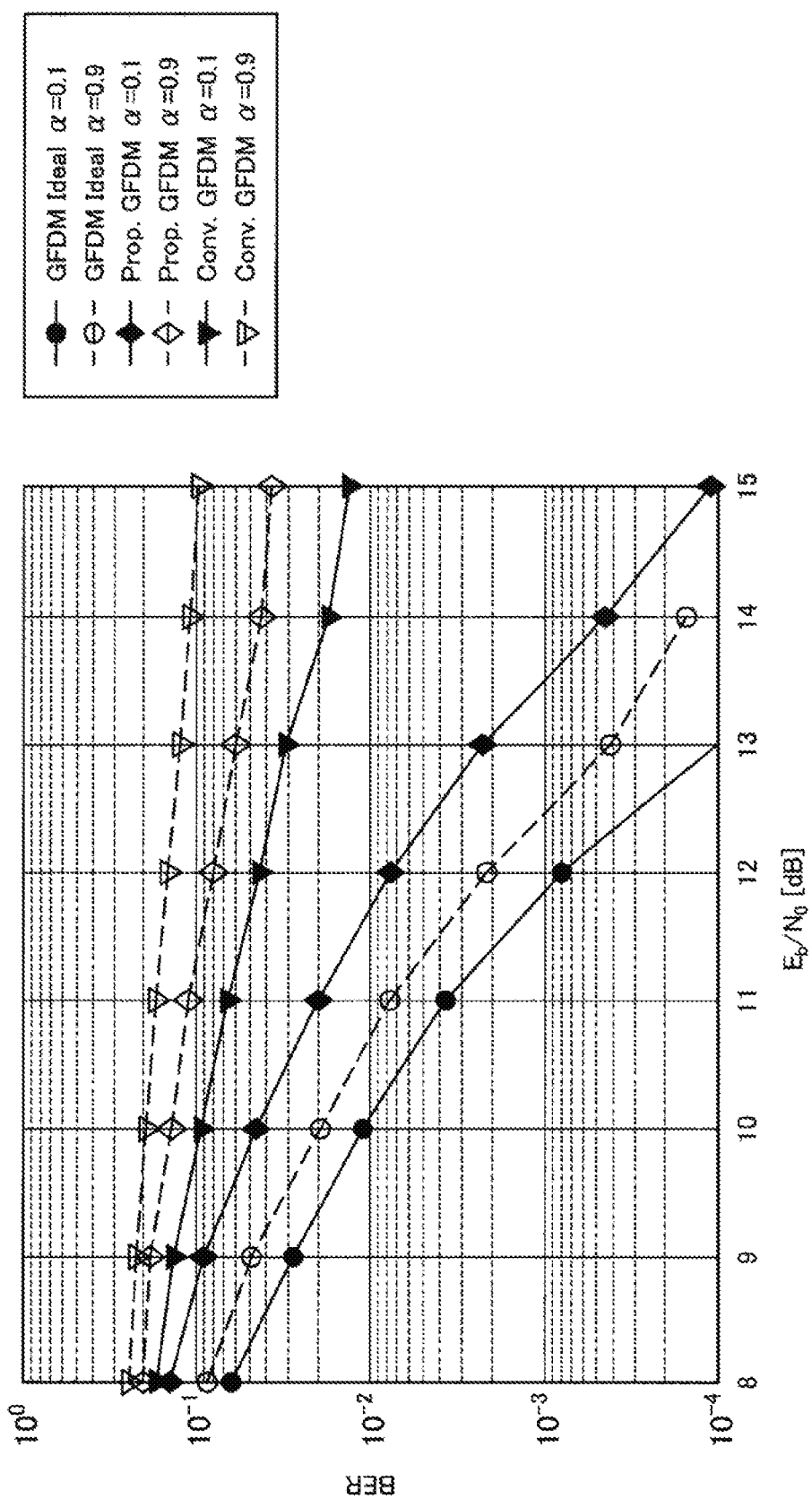
FIG. 28 is a diagram depicting a simulation result.

FIGS. 26 to 28 are diagrams depicting simulation results. More specifically, FIG. 26 depicts a bit error rate (BER) characteristic in a case in which a digital modulation scheme is QPSK and the roll-off rate of filtering is changed. FIG. 27 depicts a bit error rate characteristic in a case in which the digital modulation scheme is 16QAM and the roll-off rate of filtering is changed. FIG. 28 depicts a bit error rate characteristic in a case in which the digital modulation scheme is 64QAM and the roll-off rate of filtering is changed. In FIGS. 26 to 28, "Conv. GFDM" corresponds to Comparison 2 and simulation results in the case in which the roll-off rate of filtering is $\alpha=0.1$ or $\alpha=0.9$ are depicted. In FIGS. 26 to 28, "Prop. GFDM" corresponds to the present technique and simulation results in the case in which the roll-off rate of filtering is $\alpha=0.1$ or $\alpha=0.9$ are depicted. In FIGS. 26 to 28, "GFDM Ideal" indicate simulation results in a case in which channel estimation was realized in an ideal state and the roll-off rate of filtering is $\alpha=0.1$ or $\alpha=0.9$.

According to FIGS. 26 to 28, the present technique can achieve the better BER characteristic than that in Comparison 2 regardless of a modulation level (that is, a modulation multilevel number or a modulation order) of the digital modulation scheme. Furthermore, a difference in BER characteristic between the present technique and Comparison 2 becomes more conspicuous as the modulation level of the digital modulation scheme is higher. For example, in a case of comparison at the roll-off rate $\alpha=0.1$ and BER=0.01, a gain of the present technique is approximately 0.3 dB for QPSK, approximately 0.8 dB for 16QAM, and approximately 3.5 dB for 64QAM. Moreover, in the case of 64QAM, an error floor of the bit error characteristic occurs even at the roll-off rate $\alpha=0.1$ in Comparison 2, while such an error floor does not occur in the present technique.

5. APPLICATION EXAMPLES

The technology according to the present disclosure can be applied to various products. For example, the base station 100 may be realized as any type of an eNB (evolved Node B) such as a macro eNB or a small eNB. The small eNB may be an eNB, such as a pico eNB, a micro eNB, or a home (femto) eNB, that covers a cell smaller than a macrocell. Alternatively, the base station 100 may be realized a base station of another type such as a NodeB or a BTS (Base Transceiver Station). The base station 100 may include a main body (also referred to as "base station apparatus") that controls wireless communication and one or more RRHs (Remote Radio Heads) disposed in a location other than a location of the main body. Furthermore, any of various types of terminals, to be described later, may operate as the base station 100 by executing a base station function either temporarily or semipermanently.

Moreover, for example, the terminal apparatus 200 may be realized as a smart phone, a tablet PC (Personal Computer), a notebook PC, a mobile terminal such as a mobile game terminal, a portable/dongle mobile router, or a digital camera, or a vehicle-mounted terminal such as a car navigation system. Furthermore, the terminal apparatus 200 may be realized as a terminal (also referred to as "MTC (Machine Type Communication) terminal") holding M2M (Machine To Machine) communication. Further, the terminal apparatus 200 may be a wireless communication module (for example, an integrated circuit module configured with one die) mounted in any of these terminals.

5.1. Application Examples Related to Base Station

First Application Example

Figure 29:
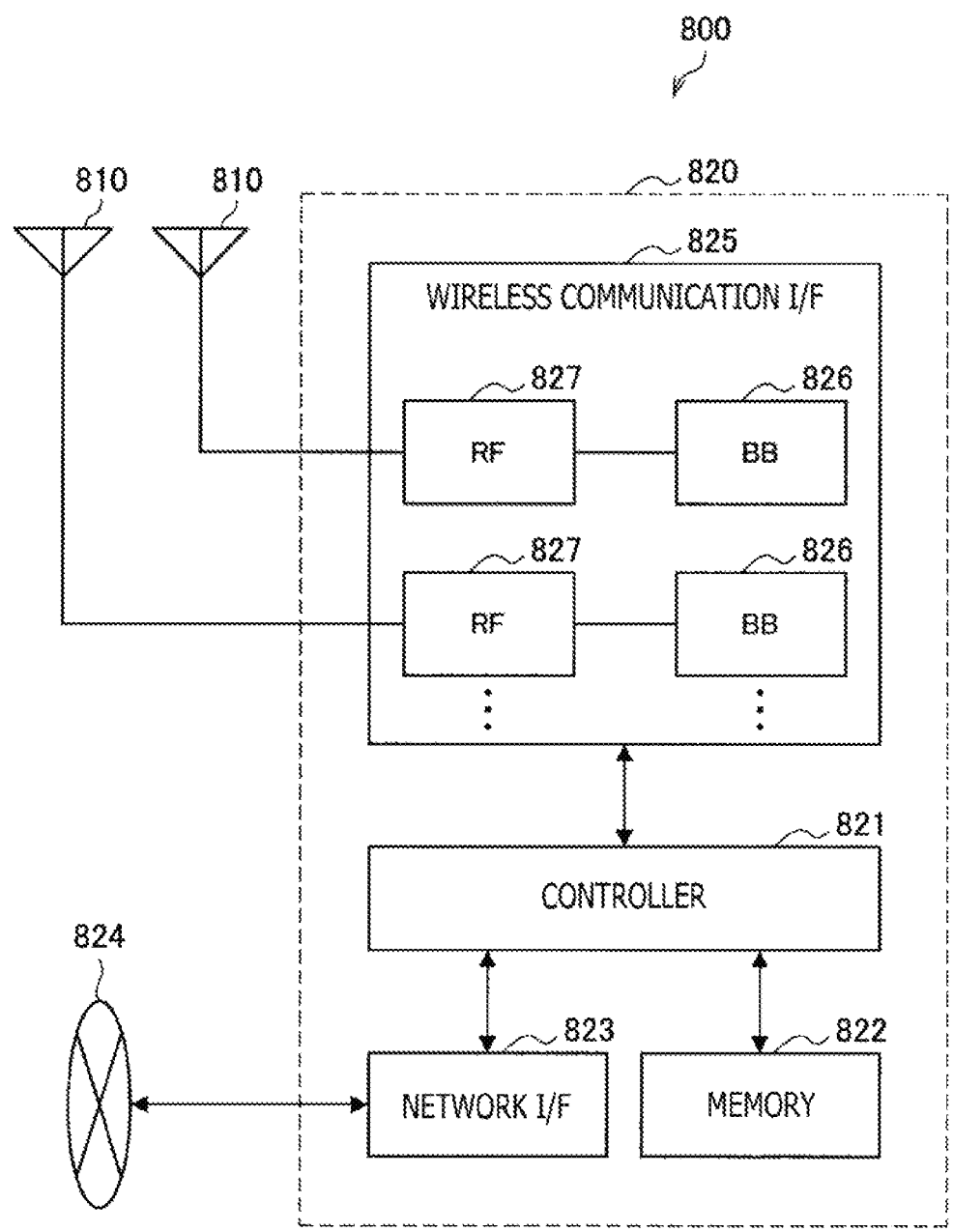
FIG. 29 is a block diagram depicting a first example of a schematic configuration of an eNB.

FIG. 29 is a block diagram depicting a first example of a schematic configuration of an eNB to which the technique according to the present disclosure can be applied. An eNB 800 has one or more antennas 810 and a base station apparatus 820. Each antenna 810 and the base station apparatus 820 can be connected to each other via an RF cable.

Each antenna 810 has one or a plurality of antenna elements (for example, a plurality of antenna elements that configure a MIMO antenna), and is used to transmit and receive radio signals from and by the base station apparatus 820. The eNB 800 has the plurality of antennas 810 as depicted in FIG. 29, and the plurality of antennas 810 may correspond to, for example, a plurality of frequency bands used by the eNB 800. While FIG. 29 depicts an example in which the eNB 800 has the plurality of antennas 810, the eNB 800 may have a single antenna 810.

The base station apparatus 820 includes a controller 821, a memory 822, a network interface 823, and a wireless communication interface 825.

The controller 821, which may be, for example, a CPU or a DSP, actuates various functions of an upper layer of the base station apparatus 820. For example, the controller 821 generates data packets from a data within a signal processed by the wireless communication interface 825, and transfers the generated packets via the network interface 823. The controller 821 may generate bundled packets by bundling data from a plurality of baseband processors and transfer the generated bundled packets. Moreover, the controller 821 may have a logical function to execute control such as Radio Resource Control, Radio Bearer Control, Mobility Management, Admission Control, or Scheduling. In addition, the control may be executed in cooperation with peripheral eNBs or core network nodes. The memory 822 includes a RAM and a ROM, and stores a program executed by the controller 821 and various control data (for example, a terminal list, transmission power data, and scheduling data).

The network interface 823 is a communication interface for connecting the base station apparatus 820 to a core network 824. The controller 821 may communicate with the core network node or another eNB via the network interface 823. In that case, the eNB 800 may be connected to the core network node or another eNB by a logical interface (for example, an S1 interface or an X2 interface). The network interface 823 may be a wired communication interface or a wireless communication interface for a wireless backhaul. In a case in which the network interface 823 is a wireless communication interface, the network interface 823 may use, for wireless communication, a higher frequency band than a frequency band used by the wireless communication interface 825.

The wireless communication interface 825 supports a certain cellular communication scheme such as LTE (Long Term Evolution) or LTE-A (LTE-Advanced), and provides wireless connection to a terminal located within a cell of the eNB 800 via the antenna 810. Typically, the wireless communication interface 825 can include baseband (BB) processors 826, RF circuits 827, and the like. The BB processors 826 may each perform, for example, encoding/decoding, modulation/demodulation, and multiplexing/ demultiplexing, and execute various signal processes of layers (for example, L1, MAC (Medium Access Control), RLC (Radio Link Control), and PDCP (Packet Data Convergence Protocol)). The BB processors 826 may each have part of or all of the logical functions described above as an alternative to the controller 821. The BB processors 826 may each be a module including a memory that stores a communication control program, a processor that executes the program, and an associated circuit, and functions of the BB processors 826 can be changed by updating the program. Furthermore, the module may be a card or a blade inserted into a slot of the base station apparatus 820, or may be a chip mounted in the card or the blade. On the other hand, the RF circuits 827 may each include a mixer, a filter, an amplifier, and the like, and each transmit and receive radio signals via the antenna 810.

As depicted in FIG. 29, the wireless communication interface 825 includes a plurality of BB processors 826, and the plurality of BB processors 826 may correspond to, for example, a plurality of frequency bands used by the eNB 800. Furthermore, as depicted in FIG. 29, the wireless communication interface 825 includes a plurality of RF circuits 827, and the plurality of RF circuits 827 may correspond to, for example, a plurality of antenna elements, respectively. While FIG. 29 depicts an example in which the wireless communication interface 825 includes the plurality of BB processors 826 and the plurality of RF circuits 827, the wireless communication interface 825 may include a single BB processor 826 or a single RF circuit 827.

In the eNB 800 depicted in FIG. 29, one or more constituent elements (notification section 151 and/or communication control section 153) included in the base station 100 described with reference to FIG. 5 and the like may be implemented in the wireless communication interface 825. Alternatively, at least part of these constituent elements may be implemented in the controller 821. As an example, the eNB 800 may mount a module including part of (for example, BB processor 826) or all of the wireless communication interface 825 and/or the controller 821, and the one or more constituent elements may be implemented in the module. In this case, the module may store a program for causing a processor to function as the one or more constituent elements (in other words, program for causing the processor to execute operations of the one or more constituent elements), and execute the program. As another example, a program for causing a processor to function as the one or more constituent elements may be installed in the eNB 800, and the wireless communication interface 825 (for example, the BB processor 826) and/or the controller 821 may execute the program. As described above, the eNB 800, the base station apparatus 820, or the module may be provided as an apparatus configured with the one or more constituent elements, and the program for causing the processor to function as the one or more constituent elements may be provided. In addition, a readable recording medium recording the program may be provided.

Furthermore, in the eNB 800 depicted in FIG. 29, the wireless communication section 120 described with reference to FIG. 5 may be implemented in the wireless communication interface 825 (for example, RF circuit 827). Moreover, the antenna section 110 may be implemented in the antenna 810. Further, the network communication section 130 may be implemented in the controller 821 and/or network interface 823. Furthermore, the storage section 140 may be implemented in the memory 822.

Second Application Example

Figure 30:
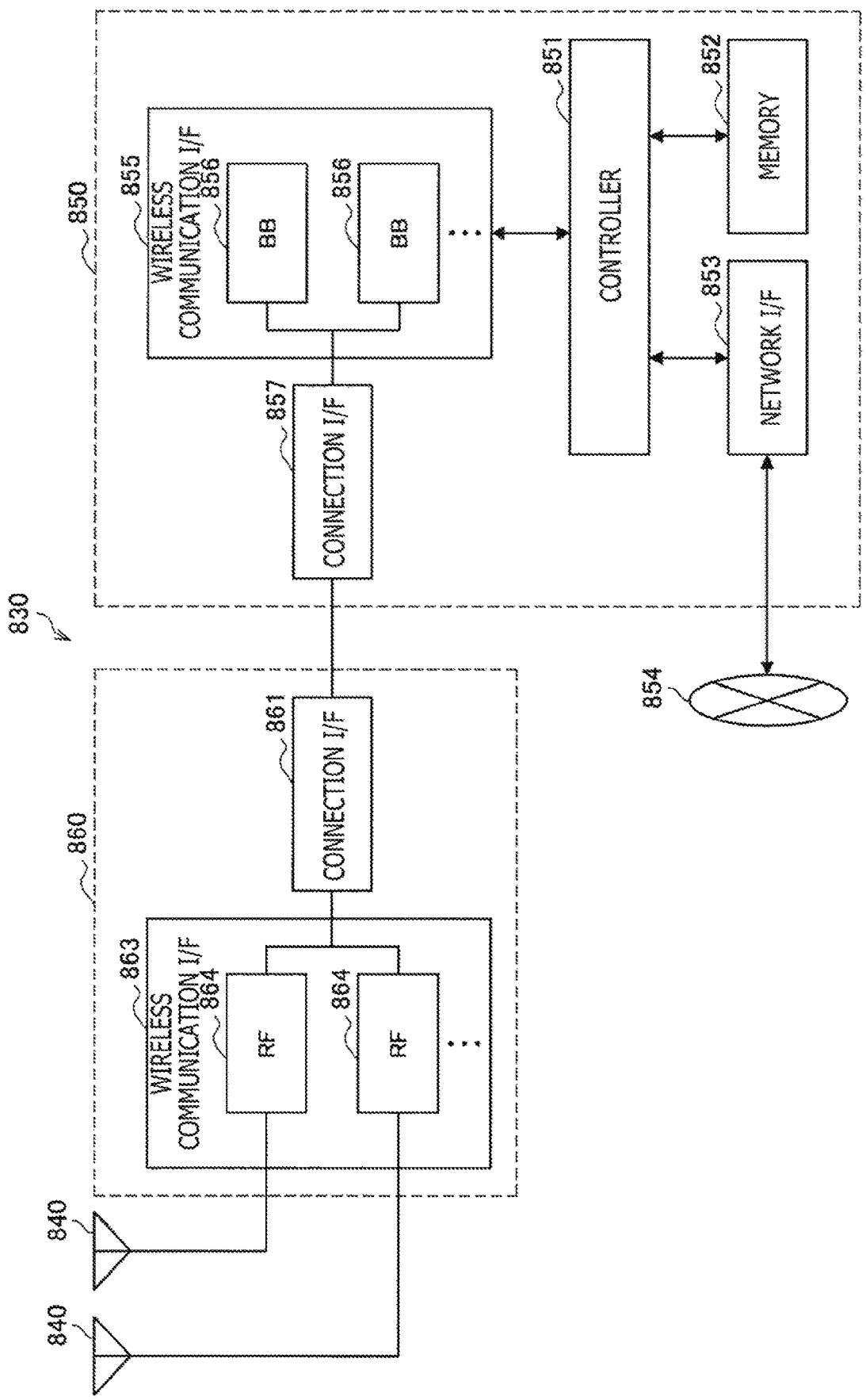
FIG. 30 is a block diagram depicting a second example of the schematic configuration of the eNB.

FIG. 30 is a block diagram depicting a second example of a schematic configuration of an eNB to which the technique according to the present disclosure can be applied. An eNB 830 has one or more antennas 840, a base station apparatus 850, and an RRH 860. Each antenna 840 and the RRH 860 can be connected to each other via an RF cable. In addition, the base station apparatus 850 and the RRH 860 can be connected to each other by a high-speed line such as an optical fiber cable.

Each antenna 840 has one or a plurality of antenna elements (for example, a plurality of antenna elements that configure a MIMO antenna), and is used to transmit and receive radio signals from and by the RRH 860. As depicted in FIG. 30, the eNB 830 has the plurality of antennas 840, and the plurality of antennas 840 may correspond to, for example, a plurality of frequency bands used by the eNB 830. While FIG. 30 depicts an example in which the eNB 830 has the plurality of antennas 840, the eNB 830 may have a single antenna 840.

The base station apparatus 850 includes a controller 851, a memory 852, a network interface 853, a wireless communication interface 855, and a connection interface 857. The controller 851, the memory 852, and the network interface 853 are similar to the controller 821, the memory 822, and the network interface 823 described with reference to FIG. 29.

The wireless communication interface 855 supports a certain cellular communication scheme such as LTE or LTE-Advanced, and provides wireless connection to a terminal located within a sector corresponding to the RRH 860 via the RRH 860 and the antenna 840. Typically, the wireless communication interface 855 can include a BB processors 856 and the like. The BB processors 856 are similar to the BB processors 826 described with reference to FIG. 29 except that the BB processors 856 are connected to RF circuits 864 in the RRH 860 via a connection interface 857. As depicted in FIG. 30, the wireless communication interface 855 includes a plurality of BB processors 856, and the plurality of BB processors 856 may correspond to, for example, a plurality of frequency bands used by the eNB 830. While FIG. 30 depicts an example in which the wireless communication interface 855 includes the plurality of BB processors 856, the wireless communication interface 855 may include a single BB processor 856.

The connection interface 857 is an interface for connecting the base station apparatus 850 (wireless communication interface 855) to the RRH 860. The connection interface 857 may be a communication module for communication on the high-speed line connecting the base station apparatus 850 (wireless communication interface 855) to the RRH 860.

Furthermore, the RRH 860 includes a connection interface 861 and a wireless communication interface 863.

The connection interface 861 is an interface for connecting the RRH 860 (wireless communication interface 863) to the base station apparatus 850. The connection interface 861 may be a communication module for communication on the high-speed line.

The wireless communication interface 863 transmits and receives radio signals via the antenna 840. Typically, the wireless communication interface 863 can include RF circuits 864 and the like. The RF circuits 864 may each include a mixer, a filter, an amplifier, and the like, and each transmit and receive radio signals via the antenna 840. As depicted in FIG. 30, the wireless communication interface 863 includes a plurality of RF circuits 864, and the plurality of RF circuits 864 may correspond to, for example, a plurality of antenna elements. While FIG. 30 depicts an example in which the wireless communication interface 863 includes the plurality of RF circuits 864, the wireless communication interface 863 may include a single RF circuit 864.

In the eNB 830 depicted in FIG. 30, one or more constituent elements (notification section 151 and/or communication control section 153) included in the base station 100 described with reference to FIG. 5 and the like may be implemented in the wireless communication interface 855 and/or the wireless communication interface 863. Alternatively, at least part of these constituent elements may be implemented in the controller 851. As an example, the eNB 830 may mount a module including part of (for example, BB processor 856) or all of the wireless communication interface 855 and/or the controller 851, and the one or more constituent elements may be implemented in the module. In this case, the module may store a program for causing a processor to function as the one or more constituent elements (in other words, program for causing the processor to execute operations of the one or more constituent elements), and execute the program. As another example, a program for causing a processor to function as the one or more constituent elements may be installed in the eNB 830, and the wireless communication interface 855 (for example, the BB processor 856) and/or the controller 851 may execute the program. As described above, the eNB 830, the base station apparatus 850, or the module may be provided as an apparatus configured with the one or more constituent elements, and the program for causing the processor to function as the one or more constituent elements may be provided. In addition, a readable recording medium recording the program may be provided.

Furthermore, in the eNB 830 depicted in FIG. 30, the wireless communication section 120 described with reference to FIG. 5, for example, may be implemented in the wireless communication interface 863 (for example, RF circuit 864). Moreover, the antenna section 110 may be implemented in the antenna 840. Further, the network communication section 130 may be implemented in the controller 851 and/or network interface 853. Furthermore, the storage section 140 may be implemented in the memory 852.

5.2. Application Example Related to Terminal Apparatus

First Application Example

Figure 31:
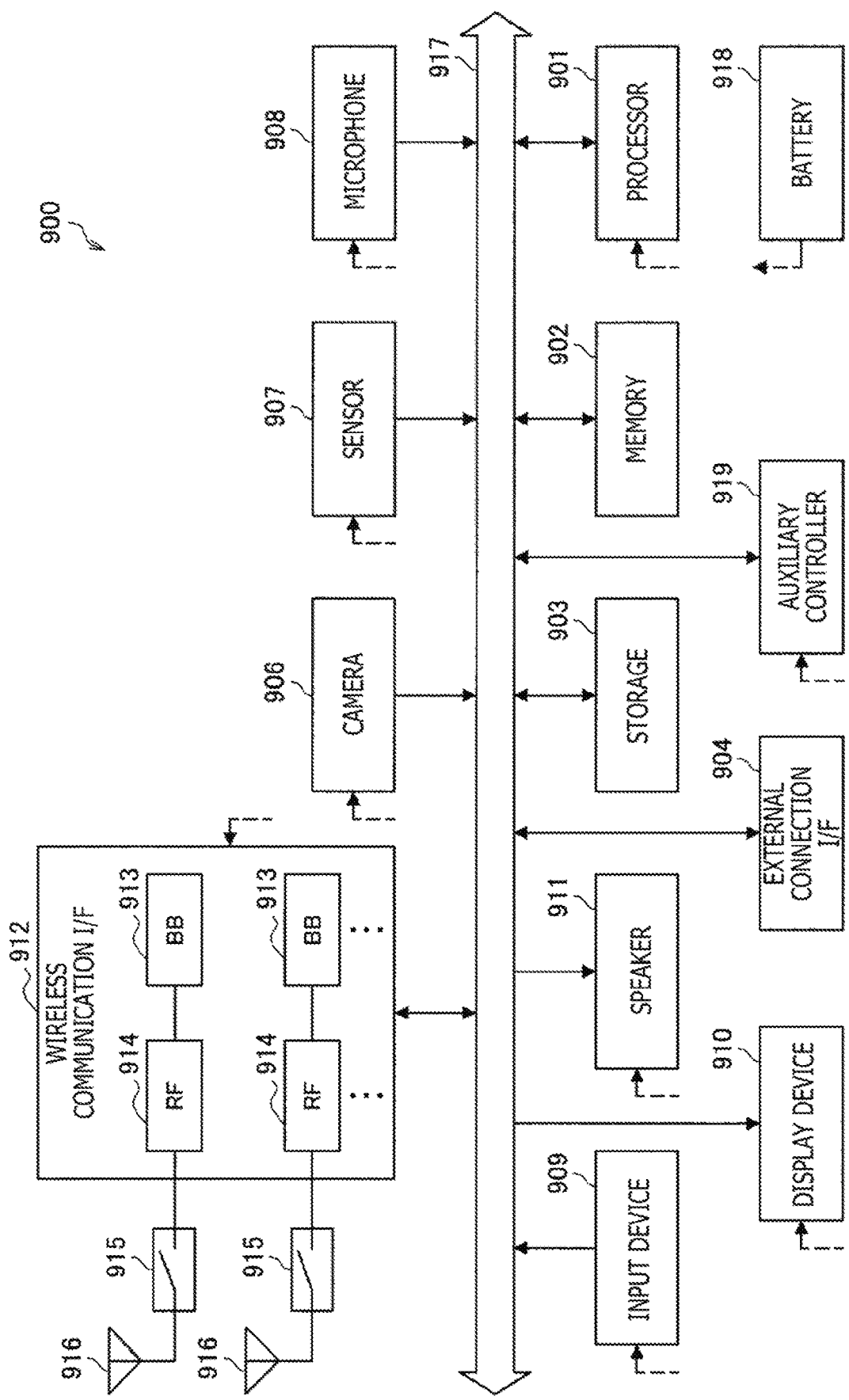
FIG. 31 is a block diagram depicting an example of a schematic configuration of a smart phone.

FIG. 31 is a block diagram depicting an example of a schematic configuration of a smart phone 900 to which the technique according to the present disclosure is applicable. The smart phone 900 includes a processor 901, a memory 902, a storage 903, an external connection interface 904, a camera 906, a sensor 907, a microphone 908, an input device 909, a display device 910, a speaker 911, a wireless communication interface 912, one or more antenna switches 915, one or more antennas 916, a bus 917, a battery 918, and an auxiliary controller 919.

The processor 901 may be, for example, a CPU or a SoC (System on Chip), and controls functions of an application layer and the other layers of the smart phone 900. The memory 902 includes a RAM and a ROM and stores a program executed by the processor 901 and data. The storage 903 can include a storage medium such as a semiconductor memory or a hard disk. The external connection interface 904 is an interface for connecting an external device such as a memory card or a USB (Universal Serial Bus) to the smart phone 900.

The camera 906 has an imaging element, for example, a CCD (Charge Coupled Device) or a CMOS (Complementary Metal Oxide Semiconductor), and generates a captured image. The sensor 907 can include a sensor group which has, for example, a positioning sensor, a gyro sensor, a geomagnetic sensor, and an acceleration sensor. The microphone 908 converts a sound input to the smart phone 900 into an audio signal. The input device 909 includes, for example, a touch sensor that detects a touch onto a screen of the display device 910, a keypad, a keyboard, a button, or a switch, and receives an operation from a user or an input of information from the user. The display device 910 has a screen such as a liquid crystal display (LCD) or an organic light emitting diode (OLED) display, and displays an output image from the smart phone 900. The speaker 911 converts the audio signal output from the smart phone 900 into a sound.

The wireless communication interface 912 supports a certain cellular communication scheme such as LTE or LTE-Advanced, and executes wireless communication. Typically, the wireless communication interface 912 can include BB processors 913, RF circuits 914, and the like. The BB processors 913 may each perform, for example, encoding/decoding, modulation/demodulation, and multiplexing/demultiplexing, and execute various signal processes for wireless communication. On the other hand, the RF circuits 914 may each include a mixer, a filter, an amplifier, and the like, and each transmit and receive radio signals via the antenna 916. The wireless communication interface 912 may be a one chip module onto which the BB processors 913 and the RF circuits 914 are integrated. As depicted in FIG. 31, the wireless communication interface 912 may include a plurality of BB processors 913 and a plurality of RF circuits 914. While FIG. 31 depicts an example in which the wireless communication interface 912 includes the plurality of BB processors 913 and the plurality of RF circuits 914, the wireless communication interface 912 may include a single BB processor 913 or a single RF circuit 914.

Furthermore, the wireless communication interface 912 may support the other types of wireless communication scheme such as a near field wireless communication scheme, a close proximity wireless communication scheme, or a wireless LAN (Local Area Network) scheme in addition to the cellular communication scheme; in that case, the wireless communication interface 912 may include the BB processor 913 and the RF circuit 914 for each wireless communication scheme.

Each of the antenna switches 915 changes over a connection destination of the antenna 916 over among a plurality of circuits (for example, circuits for different wireless communication schemes) included in the wireless communication interface 912.

Each antenna 916 has one or a plurality of antenna elements (for example, a plurality of antenna elements that configure a MIMO antenna), and is used to transmit and receive radio signals from and by the wireless communication interface 912. As depicted in FIG. 31, the smart phone 900 may have the plurality of antennas 916. While FIG. 31 depicts an example in which the smart phone 900 has the plurality of antennas 916, the smart phone 900 may have a single antenna 916.

Furthermore, the smart phone 900 may be configured with the antenna 916 for each wireless communication scheme. In that case, the antenna switches 915 may be omitted from the configuration of the smart phone 900.

The bus 917 mutually connects the processor 901, the memory 902, the storage 903, the external connection interface 904, the camera 906, the sensor 907, the microphone 908, the input device 909, the display device 910, the speaker 911, the wireless communication interface 912, and the auxiliary controller 919. The battery 918 supplies electric power to blocks in the smart phone 900 depicted in FIG. 31 via a power feeding line partially indicated by broken lines in FIG. 31. The auxiliary controller 919 actuates minimum functions of the smart phone 900 in, for example, a sleep mode.

In the smart phone 900 depicted in FIG. 31, one or more constituent elements (acquisition section 241 and/or communication control section 243) included in the terminal apparatus 200 described with reference to FIG. 6 and the like may be implemented in the wireless communication interface 912. Alternatively, at least part of these constituent elements may be implemented in the processor 901 or the auxiliary controller 919. As an example, the smart phone 900 may mount a module including part of (for example, BB processor 913) or all of the wireless communication interface 912, the processor 901, and/or the auxiliary controller 919, and the one or more constituent elements may be implemented in the module. In this case, the module may store a program for causing a processor to function as the one or more constituent elements (in other words, program for causing the processor to execute operations of the one or more constituent elements), and execute the program. As another example, a program for causing a processor to function as the one or more constituent elements may be installed in the smart phone 900, and the wireless communication interface 912 (for example, the BB processor 913), the processor 901, and/or the auxiliary controller 919 may execute the program. As described above, the smart phone 900 or the module may be provided as an apparatus configured with the one or more constituent elements, and the program for causing the processor to function as the one or more constituent elements may be provided. In addition, a readable recording medium recording the program may be provided.

Furthermore, in the smart phone 900 depicted in FIG. 31, the wireless communication section 220 described with reference to FIG. 6, for example, may be implemented in the wireless communication interface 912 (for example, RF circuit 914). Moreover, the antenna section 210 may be implemented in the antenna 916. Furthermore, the storage section 230 may be implemented in the memory 902.

Second Application Example

FIG. 32 is a block diagram depicting an example of a schematic configuration of a car navigation system 920 to which the technique according to the present disclosure is applicable. The car navigation system 920 includes a processor 921, a memory 922, a GPS (Global positioning system) module 924, a sensor 925, a data interface 926, a content player 927, a storage medium interface 928, an input device 929, a display device 930, a speaker 931, a wireless communication interface 933, one or more antenna switches 936, one or more antennas 937, and a battery 938.

The processor 921 may be, for example, a CPU or an SoC, and controls a navigation function and other functions of the car navigation system 920. The memory 922 includes a RAM and a ROM and stores a program executed by the processor 921 and data.

The GPS module 924 measures a position (for example, a longitude, a latitude, and an altitude) of the car navigation system 920 using a GPS signal received from a GPS satellite. The sensor 925 can include a sensor group which has, for example, a gyro sensor, a geomagnetic sensor, and an air pressure sensor. The data interface 926 is connected to, for example, a vehicle-mounted network 941 via a terminal that is not depicted, and acquires data generated by a vehicle side such as a vehicle speed.

The content player 927 reproduces a content stored in a storage medium (for example, CD or DVD) inserted into the storage medium interface 928. The input device 929 includes, for example, a touch sensor that detects a touch onto a screen of the display device 930, a button, or a switch, and receives an operation from a user or an input of information from the user. The display device 930 has a screen such as an LCD or an OLED display, and displays the navigation function or an image of the reproduced content. The speaker 931 outputs the navigation function or a sound of the reproduced content.

The wireless communication interface 933 supports a certain cellular communication scheme such as LTE or LTE-Advanced, and executes wireless communication. Typically, the wireless communication interface 933 can include BB processors 934, RF circuits 935, and the like. The BB processors 934 may each perform, for example, encoding/decoding, modulation/demodulation, and multiplexing/demultiplexing, and execute various signal processes for wireless communication. On the other hand, the RF circuits 935 may each include a mixer, a filter, an amplifier, and the like, and each transmit and receive radio signals via the antenna 937. The wireless communication interface 933 may be a one chip module onto which the BB processors 934 and the RF circuits 935 are integrated. As depicted in FIG. 32, the wireless communication interface 933 may include a plurality of BB processors 934 and a plurality of RF circuits 935. While FIG. 32 depicts an example in which the wireless communication interface 933 includes the plurality of BB processors 934 and the plurality of RF circuits 935, the wireless communication interface 933 may include a single BB processor 934 or a single RF circuit 935.

Furthermore, the wireless communication interface 933 may support the other types of wireless communication scheme such as the near field wireless communication scheme, the close proximity wireless communication scheme, or the wireless LAN scheme in addition to the cellular communication scheme; in that case, the wireless communication interface 933 may include the BB processor 934 and the RF circuit 935 for each wireless communication scheme.

Each of the antenna switches 936 changes over a connection destination of the antenna 937 over among a plurality of circuits (for example, circuits for different wireless communication schemes) included in the wireless communication interface 933.

Each antenna 937 has one or a plurality of antenna elements (for example, a plurality of antenna elements that configure a MIMO antenna), and is used to transmit and receive radio signals from and by the wireless communication interface 933. As depicted in FIG. 32, the car navigation system 920 may have the plurality of antennas 937. While FIG. 32 depicts an example in which the car navigation system 920 has the plurality of antennas 937, the car navigation system 920 may have a single antenna 937.

Furthermore, the car navigation system 920 may be configured with the antenna 937 for each wireless communication scheme. In that case, the antenna switches 936 may be omitted from the configuration of the car navigation system 920.

The battery 938 supplies electric power to blocks in the car navigation system 920 depicted in FIG. 32 via a power feeding line partially indicated by broken lines in FIG. 32. Moreover, the battery 938 stores electric power fed from the vehicle side.

In the car navigation system 920 depicted in FIG. 32, one or more constituent elements (acquisition section 241 and/or communication control section 243) included in the terminal apparatus 200 described with reference to FIG. 6 and the like may be implemented in the wireless communication interface 933. Alternatively, at least part of these constituent elements may be implemented in the processor 921. As an example, the car navigation system 920 may mount a module including part of (for example, BB processor 934) or all of the wireless communication interface 933 and/or the processor 921, and the one or more constituent elements may be implemented in the module. In this case, the module may store a program for causing a processor to function as the one or more constituent elements (in other words, program for causing the processor to execute operations of the one or more constituent elements), and execute the program. As another example, a program for causing a processor to function as the one or more constituent elements may be installed in the car navigation system 920, and the wireless communication interface 933 (for example, the BB processor 934) and/or the processor 921 may execute the program. As described above, the car navigation system 920 or the module may be provided as an apparatus configured with the one or more constituent elements, and the program for causing the processor to function as the one or more constituent elements may be provided. In addition, a readable recording medium recording the program may be provided.

Furthermore, in the car navigation system 920 depicted in FIG. 32, the wireless communication section 220 described with reference to FIG. 6, for example, may be implemented in the wireless communication interface 933 (for example, RF circuit 935). Moreover, the antenna section 210 may be implemented in the antenna 937. Furthermore, the storage section 230 may be implemented in the memory 922.

Moreover, the technique according to the present disclosure may be realized as a vehicle-mounted system (or vehicle) 940 that includes one or more blocks in the car navigation system 920 described above, the vehicle-mounted network 941, and a vehicle-side module 942. The vehicle-side module 942 generates vehicle-side data such as a vehicle speed, an engine speed, failure information, and the like, and outputs the generated data to the vehicle-mounted network 941.

6. CONCLUSION

One embodiment of the present disclosure has been described so far in detail with reference to FIGS. 1 to 32. As described above, the transmitting apparatus according to the present embodiment can hold communication using a plurality of communication parameter sets in a unit resource, and transmits a data signal and a reference signal generated using the parameter sets different between the data signal and the reference signal to the receiving apparatus. Even in a case in which the subcarrier spacing or the symbol length are variably set in the unit resource and the orthogonality of resources is lost, it is possible to enhance the interference resistance of the reference signal by making the applied communication parameter sets different between the data signal and the reference signal. It is thereby possible to keep high the channel estimation accuracy and suppress deteriorations in the demodulation accuracy and the decoding accuracy for the received signal.

While the preferred embodiment of the present disclosure has been described in detail with reference to the accompanying drawings, the technical scope of the present disclosure is not limited to these examples. It is obvious that persons having ordinary skill in the art to which the present disclosure pertains can conceive of various change examples or modification examples within the scope of the technical concept set forth in the claims, and it is understood that these examples naturally belong to the technical scope of the present disclosure.

While the case in which the transmitting apparatus is the base station 100 and the receiving apparatus is each terminal apparatus 200 and the case in which both the transmitting apparatus and the receiving apparatus are the terminal apparatuses 200 have been described in the embodiment, the present technique is not limited to such examples. For example, the transmitting apparatus may be the terminal apparatus 200 and the receiving apparatus may be the base station 100. In that case, the terminal apparatus 200, for example, receives setting information to be used in uplink transmission from the base station 100 and performs a transmission process using the communication parameter sets different between the data signal and the reference signal on the basis of such setting information. On the other hand, the base station 100 performs the receiving process for receiving the data signal and the reference signal transmitted from the terminal apparatus 200 on the basis of the setting information.

Furthermore, the processes described using the flowcharts and the sequence diagrams in the present specification are not necessarily executed in order depicted in the drawings. Several processing steps may be executed in parallel. Furthermore, an additional processing step may be adopted and part of the processing steps may be omitted.

Moreover, the advantages described in the present specification are given as an example only, and the advantages are not limited to those described in the present specification. In other words, the technique according to the present disclosure can exhibit advantages obvious to persons having ordinary skill in the art from the present specification in addition to or as an alternative to the advantages described above.

It is noted that the following configurations fall within a technical scope of the present disclosure.

(1) A transmitting apparatus holding communication using a plurality of communication parameter sets in a unit resource, including:

a processing section that transmits a data signal and a reference signal generated using the communication parameter sets different between the data signal and the reference signal to a receiving apparatus.

(2) The transmitting apparatus according to (1), in which the communication parameter sets include a communication parameter related to at least any of precoding, filtering, oversampling, a waveform, resource setting, or transmission power.

(3) The transmitting apparatus according to (2), in which the processing section uses filters different in form between the data signal and the reference signal or uses filters of the same form and having different filter factors between the data signal and the reference signal.

(4) The transmitting apparatus according to (3), in which the processing section applies a band limiting filter to the data signal, and applies a transmitting side interference cancellation filter to the reference signal.

(5) The transmitting apparatus according to (3), in which the processing section performs filtering on the data signal and omits filtering on the reference signal.

(6) The transmitting apparatus according to (5), in which the processing section performs oversampling on the data signal and omits oversampling on the reference signal.

(7) The transmitting apparatus according to any one of (2) to (6), in which the processing section uses a non-orthogonal waveform for the data signal and uses an orthogonal waveform for the reference signal.

(8) The transmitting apparatus according to any one of (2) to (7), in which the processing section makes at least either a subcarrier spacing or a symbol length different between the data signal and the reference signal.

(9) The transmitting apparatus according to any one of (2) to (8), in which the processing section makes transmission power different between the data signal and the reference signal.

(10) The transmitting apparatus according to any one of (1) to (9), in which the processing section notifies the receiving apparatus of information indicating the communication parameter sets used for each of the data signal and the reference signal.

(11) The transmitting apparatus according to any one of (1) to (10), in which in a first resource and a second resource having different resource setting in the unit resource, a ratio of a frequency spacing of reference signals deployed in the first resource to a frequency spacing of reference signals deployed in the second resource is proportional to or substantially proportional to a ratio of a subcarrier spacing in the first resource to a subcarrier spacing in the second resource.

(12) The transmitting apparatus according to any one of (1) to (11), in which in a first resource and a second resource having different resource setting in the unit resource, a ratio of a time spacing of reference signals deployed in the first resource to a time spacing of reference signals deployed in the second resource is proportional to or substantially proportional to a ratio of a symbol length in the first resource to a symbol length in the second resource.

(13) The transmitting apparatus according to any one of (1) to (12), in which in a first resource and a second resource having different resource setting in the unit resource, a ratio of a time spacing of reference signals deployed in the first resource to a time spacing of reference signals deployed in the second resource is inversely proportional to or substantially inversely proportional to a ratio of a subcarrier spacing in the first resource to a subcarrier spacing in the second resource.

(14) The transmitting apparatus according to any one of (1) to (10), in which in a first resource and a second resource having different resource setting in the unit resource, a frequency spacing and a time spacing of reference signals deployed in the first resource are either equal to or substantially equal to a frequency spacing and a time spacing of reference signals deployed in the second resource.

(15) The transmitting apparatus according to any one of (11) to (14), in which the processing section notifies the receiving apparatus of information indicating deployment of the reference signals.

(16) A receiving apparatus holding communication using a plurality of communication parameter sets in a unit resource, including:
a processing section that performs a receiving process for receiving a data signal and a reference signal generated using the communication parameter sets different between the data signal and the reference signal.

(17) A method executed by a transmitting apparatus holding communication using a plurality of communication parameter sets in a unit resource, including:
transmitting a data signal and a reference signal generated using the communication parameter sets different between the data signal and the reference signal to a receiving apparatus.

(18) A method executed by a receiving apparatus holding communication using a plurality of communication parameter sets in a unit resource, including:
performing a receiving process for receiving a data signal and a reference signal generated using the communication parameter sets different between the data signal and the reference signal.

(19) A recording medium recording a program for causing a computer to:
hold communication using a plurality of communication parameter sets in a unit resource; and
function as a processing section that transmits a data signal and a reference signal generated using the communication parameter sets different between the data signal and the reference signal to a receiving apparatus.

(20) A recording medium recording a program for causing a computer to:
hold communication using a plurality of communication parameter sets in a unit resource; and
function as a processing section that performs a receiving process for receiving a data signal and a reference signal generated using the communication parameter sets different between the data signal and the reference signal.

REFERENCE SIGNS LIST

1 System
10 Cell
100 Base station
110 Antenna section
120 Wireless communication section
130 Network communication section
140 Storage section
150 Processing section
151 Notification section
153 Communication control section
180 Bandwidth
200 Terminal apparatus
210 Antenna section
220 Wireless communication section
230 Storage section
240 Processing section
241 Acquisition section
243 Communication control section

The invention claimed is:
1. A transmitting apparatus, comprising:
a processing section configured to:
hold communication between the transmitting apparatus and a receiving apparatus based on a plurality of communication parameter sets in a unit resource;
generate a data signal and a reference signal based on the plurality of communication parameter sets, wherein the plurality of communication parameter sets is different between the data signal and the reference signal;

set at least one of a subcarrier spacing or a symbol length different between the data signal and the reference signal within the unit resource; and transmit the data signal and the reference signal to the receiving apparatus based on the set at least one of the subcarrier spacing and the symbol length.

2. The transmitting apparatus according to claim 1, wherein the plurality of communication parameter sets include a communication parameter related to at least one of precoding, filtering, oversampling, a waveform, resource setting, or transmission power.

3. The transmitting apparatus according to claim 2, wherein the processing section is further configured to use one of first filters different in form between the data signal and the reference signal or second filters of a same form and having different filter factors between the data signal and the reference signal.

4. The transmitting apparatus according to claim 3, wherein the processing section is further configured to apply a band limiting filter to the data signal and a transmitting side interference cancellation filter to the reference signal.

5. The transmitting apparatus according to claim 3, wherein the processing section is further configured to:
perform filtering process on the data signal; and
omit the filtering process on the reference signal.

6. The transmitting apparatus according to claim 5, wherein the processing section is further configured to:
perform oversampling process on the data signal; and
omit the oversampling process on the reference signal.

7. The transmitting apparatus according to claim 2, wherein the processing section is further configured to:
use a non-orthogonal waveform for the data signal; and
use an orthogonal waveform for the reference signal.

8. The transmitting apparatus according to claim 2, wherein the processing section is further configured to set transmission power different between the data signal and the reference signal.

9. The transmitting apparatus according to claim 1, wherein the processing section is further configured to notify the receiving apparatus of information that indicates the plurality of communication parameter sets used for each of the data signal and the reference signal.

10. The transmitting apparatus according to claim 1, wherein
in a first resource and a second resource having different resource setting in the unit resource, a ratio of a first frequency spacing of reference signals deployed in the first resource to a second frequency spacing of reference signals deployed in the second resource is proportional to or substantially proportional to a ratio of a first subcarrier spacing in the first resource to a second subcarrier spacing in the second resource.

11. The transmitting apparatus according to claim 10, wherein the processing section is further configured to notify the receiving apparatus of information that indicates deployment of the reference signals.

12. The transmitting apparatus according to claim 1, wherein
in a first resource and a second resource having different resource setting in the unit resource, a ratio of a first time spacing of reference signals deployed in the first resource to a second time spacing of reference signals deployed in the second resource is proportional to or substantially proportional to a ratio of a first symbol length in the first resource to a second symbol length in the second resource.

13. The transmitting apparatus according to claim 1, wherein
in a first resource and a second resource having different resource setting in the unit resource, a ratio of a first time spacing of reference signals deployed in the first resource to a second time spacing of reference signals deployed in the second resource is inversely proportional to or substantially inversely proportional to a ratio of a first subcarrier spacing in the first resource to a second subcarrier spacing in the second resource.

14. The transmitting apparatus according to claim 1, wherein
in a first resource and a second resource having different resource setting in the unit resource, a first frequency spacing and a first time spacing of reference signals deployed in the first resource are either equal to or substantially equal to a second frequency spacing and a second time spacing of reference signals deployed in the second resource.

15. A receiving apparatus, comprising:
a processing section configured to:
hold communication between a transmitting apparatus and the receiving apparatus based on a plurality of communication parameter sets in a unit resource; and
receive a data signal and a reference signal from the transmitting apparatus, wherein
the data signal and the reference signal are generated based on the plurality of communication parameter sets different between the data signal and the reference signal, and
at least one of a subcarrier spacing or a symbol length is set different between the data signal and the reference signal within the unit resource.

16. A method, comprising:
in a transmitting apparatus,
holding communication between the transmitting apparatus and a receiving apparatus based on a plurality of communication parameter sets in a unit resource;
generating a data signal and a reference signal based on the plurality of communication parameter sets, wherein the plurality of communication parameter sets is different between the data signal and the reference signal;
setting at least one of a subcarrier spacing or a symbol length different between the data signal and the reference signal within the unit resource; and
transmitting the data signal and the reference signal to the receiving apparatus based on the set at least one of the subcarrier spacing and the symbol length.

17. A method, comprising:
in a receiving apparatus,
holding communication between a transmitting apparatus and the receiving apparatus based on a plurality of communication parameter sets in a unit resource; and
receiving a data signal and a reference signal from the transmitting apparatus, wherein
the data signal and the reference signal are generated based on the plurality of communication parameter sets different between the data signal and the reference signal, and
at least one of a subcarrier spacing or a symbol length is set different between the data signal and the reference signal within the unit resource.

18. A non-transitory computer-readable medium having stored thereon, computer-executable instructions which, when executed by a transmitting apparatus, cause the transmitting apparatus to execute operations, the operations comprising:

holding communication between the transmitting apparatus and a receiving apparatus based on a plurality of communication parameter sets in a unit resource;

generating a data signal and a reference signal based on the plurality of communication parameter sets, wherein the plurality of communication parameter sets is different between the data signal and the reference signal;

setting at least one of a subcarrier spacing or a symbol length different between the data signal and the reference signal within the unit resource; and transmitting the data signal and the reference signal to the receiving apparatus.

19. A non-transitory computer-readable medium having stored thereon, computer-executable instructions which, when executed by a receiving apparatus, cause the receiving apparatus to execute operations, the operations comprising:

holding communication between a transmitting apparatus and the receiving apparatus based on a plurality of communication parameter sets in a unit resource; and receiving a data signal and a reference signal from the transmitting apparatus, wherein the data signal and the reference signal are generated based on the plurality of communication parameter sets different between the data signal and the reference signal, and at least one of a subcarrier spacing or a symbol length is set different between the data signal and the reference signal within the unit resource.

* * * * *